(12) United States Patent
Fulton et al.

(10) Patent No.: US 11,318,410 B2
(45) Date of Patent: May 3, 2022

(54) FLOW MODULATION SYSTEMS, APPARATUS, AND METHODS FOR CYCLICAL SWING ADSORPTION

(71) Applicant: ExxonMobil Upstream Research Company, Spring, TX (US)

(72) Inventors: John W. Fulton, Annandale, NJ (US); William N. Yunker, Bolingbrook, IL (US); Tracy A. Fowler, Magnolia, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 195 days.

(21) Appl. No.: 16/709,510

(22) Filed: Dec. 10, 2019

(65) Prior Publication Data
US 2020/0197856 A1 Jun. 25, 2020

Related U.S. Application Data

(60) Provisional application No. 62/783,766, filed on Dec. 21, 2018.

(51) Int. Cl.
*B01D 53/047* (2006.01)
*B01D 53/04* (2006.01)

(52) U.S. Cl.
CPC ..... *B01D 53/0473* (2013.01); *B01D 53/0446* (2013.01); *B01D 53/0454* (2013.01);
(Continued)

(58) Field of Classification Search
CPC .. B01D 53/04; B01D 53/047; B01D 53/0446; B01D 53/0454; B01D 53/0462;
(Continued)

(56) References Cited

U.S. PATENT DOCUMENTS 1,868,138 A 7/1932 Fisk
2,646,391 A 7/1953 Houdry
(Continued)

FOREIGN PATENT DOCUMENTS

EP 0257493 2/1988
EP 0426937 5/1991
(Continued)

OTHER PUBLICATIONS

Cheung, O. et al., (2013) "Adsorption kinetics for CO2 on highly selective zeolites NaKA and nano-NaKA," *Appl Energ*, 112, pp. 1326-1336.
(Continued)

*Primary Examiner* — Frank M Lawrence, Jr.
(74) *Attorney, Agent, or Firm* — ExxonMobil Upstream Research Company—Law Department

(57) ABSTRACT

Methods, systems, and apparatus are provided for modulating fluid flow in a cyclical swing adsorption system that includes multiple adsorption bed vessels that are in fluid communication. When opening a valve to transition an adsorption bed vessel into a blowdown stage or a re-pressurization stage of a cyclical swing adsorption process, the valve is partially lifted from a closed position prior to being fully lifted. The valve includes a flow restriction aid positioned to restrict flow through the valve when the valve is in the partially lifted position.

27 Claims, 25 Drawing Sheets

(52) U.S. Cl.
CPC .... *B01D 53/0462* (2013.01); *B01D 2253/108* (2013.01); *B01D 2259/402* (2013.01); *B01D 2259/40003* (2013.01)

(58) Field of Classification Search
CPC .......... B01D 53/0473; B01D 2253/102; B01D 2253/108; B01D 2253/116; B01D 2256/245; B01D 2257/304; B01D 2257/504; B01D 2259/402; B01D 2259/40003; Y02C 20/40
See application file for complete search history.

(56) References Cited

U.S. PATENT DOCUMENTS

| | | |
|---|---|---|
| 3,103,425 A | 9/1963 | Meyer |
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,559,065 A | 12/1985 | Null et al. |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,169,414 A | 12/1992 | Panzica et al. |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,503,782 A | 4/1996 | Dyrud et al. |
| 5,547,641 A | 8/1996 | Smith et al. |
| 5,565,018 A | 10/1996 | Baksh et al. |
| 5,647,891 A | 7/1997 | Blizzard et al. |
| 5,669,962 A | 9/1997 | Dunne |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,827,577 A | 10/1998 | Spencer |
| 5,882,380 A | 3/1999 | Sircar |
| 5,906,673 A | 5/1999 | Reinhold, III et al. |
| 5,908,480 A | 6/1999 | Ban |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,951,744 A | 9/1999 | Rohrbach et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |

(56) References Cited

U.S. PATENT DOCUMENTS

| | | |
|---|---|---|
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,936,561 B2 | 8/2005 | Marques et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,560,154 B2 | 7/2009 | Katoh |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,741,243 B2 | 6/2014 | Gadkaree et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |

(56) References Cited

U.S. PATENT DOCUMENTS

| | | |
|---|---|---|
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,932,386 B2 | 1/2015 | Bouvier et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,713,787 B2 | 7/2017 | Owens et al. |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 10,882,002 B2 | 1/2021 | Vittenet |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2006/0236867 A1 | 10/2006 | Neary |
| 2007/0084241 A1 | 4/2007 | Kretchmer et al. |
| 2007/0084344 A1 | 4/2007 | Moriya et al. |
| 2007/0187029 A1 | 8/2007 | Axtell et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0236389 A1 | 10/2008 | Leedy et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0132548 A1 | 6/2010 | Dunne et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0149640 A1 | 6/2011 | Furuta et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0118755 A1 | 5/2012 | Dadvand et al. |
| 2012/0118758 A1 | 5/2012 | Ellis et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0227583 A1 | 9/2012 | Monereau et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |

(56) References Cited

U.S. PATENT DOCUMENTS

| | | | |
|---|---|---|---|
| 2013/0225898 A1 | 8/2013 | Sundaram et al. | |
| 2013/0327216 A1 | 12/2013 | Deckman et al. | |
| 2013/0340619 A1* | 12/2013 | Tammera | B01D 53/047 96/121 |
| 2014/0013955 A1 | 1/2014 | Tammera et al. | |
| 2014/0060326 A1 | 3/2014 | Sundaram et al. | |
| 2014/0157984 A1 | 6/2014 | Deckman et al. | |
| 2014/0157986 A1 | 6/2014 | Ravikovitch et al. | |
| 2014/0174291 A1 | 6/2014 | Gupta et al. | |
| 2014/0208797 A1 | 7/2014 | Kelley et al. | |
| 2014/0216254 A1 | 8/2014 | Tammera et al. | |
| 2015/0013377 A1 | 1/2015 | Oelfke | |
| 2015/0068397 A1 | 3/2015 | Boulet et al. | |
| 2015/0010483 A1 | 4/2015 | Perry et al. | |
| 2015/0101483 A1 | 4/2015 | Perry et al. | |
| 2015/0196870 A1 | 7/2015 | Albright et al. | |
| 2015/0328578 A1 | 11/2015 | Deckman et al. | |
| 2015/0361102 A1 | 12/2015 | Inubshi et al. | |
| 2016/0016865 A1 | 1/2016 | Dolan | |
| 2016/0023155 A1 | 1/2016 | Ramkumar et al. | |
| 2016/0129433 A1 | 5/2016 | Tammera et al. | |
| 2016/0166972 A1 | 6/2016 | Owens et al. | |
| 2016/0236135 A1 | 8/2016 | Tammera et al. | |
| 2016/0332105 A1 | 11/2016 | Tammera et al. | |
| 2016/0332106 A1 | 11/2016 | Tammera et al. | |
| 2017/0056814 A1 | 3/2017 | Marshall et al. | |
| 2017/0113173 A1 | 4/2017 | Fowler et al. | |
| 2017/0113175 A1 | 4/2017 | Fowler et al. | |
| 2017/0136405 A1 | 5/2017 | Ravikovitch et al. | |
| 2017/0266604 A1 | 9/2017 | Tammera et al. | |
| 2017/0282114 A1 | 10/2017 | Owens et al. | |
| 2017/0341011 A1 | 11/2017 | Nagavarapu et al. | |
| 2017/0341012 A1 | 11/2017 | Nagavarapu et al. | |
| 2018/0001301 A1 | 1/2018 | Brody et al. | |
| 2018/0056229 A1 | 3/2018 | Denton et al. | |
| 2018/0056235 A1 | 3/2018 | Wang et al. | |
| 2018/0169565 A1 | 6/2018 | Brody et al. | |
| 2018/0169617 A1 | 6/2018 | Brody et al. | |
| 2018/0339263 A1 | 11/2018 | Dehaas et al. | |
| 2019/0224613 A1 | 7/2019 | Nagavarapu et al. | |
| 2019/0262764 A1 | 8/2019 | Johnson | |
| 2019/0262765 A1 | 8/2019 | Barnes et al. | |
| 2020/0197856 A1 | 6/2020 | Fulton et al. | |
| 2021/0102638 A1* | 4/2021 | Fulton | B01D 53/047 |

FOREIGN PATENT DOCUMENTS

| | | |
|---|---|---|
| EP | 0904827 | 3/1999 |
| EP | 0953374 | 3/1999 |
| EP | 1110593 | 6/2001 |
| EP | 1674555 | 6/2006 |
| EP | 2754488 | 7/2014 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | H05-037318 U | 5/1993 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| JP | 2011-083726 | 4/2011 |
| JP | 2013-244469 A | 12/2013 |
| JP | 2016-121414 | 7/2016 |
| KR | 101349424 | 1/2014 |
| RU | 2329094 | 12/2006 |
| RU | 2547115 C2 | 4/2015 |
| WO | WO2002/024309 | 3/2002 |
| WO | WO2002/073728 | 9/2002 |
| WO | WO 03/04438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

Cygan, R. T. et al., (2004) "Molecular Models of Hydroxide, Oxyhydroxide, and Clay Phases and the Development of a General Force Field", *J Phys Chem B*, vol. 108, pp. 1255-1266.

Deem, M. W. et al., (2009) "Computational Discovery of New Zeolite-Like Materials", *J Phys Chem C*, 113, pp. 21353-21360.

Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.

Dubbeldam, D., et al., (2013) "On the inner workings of Monte Carlo codes" *Molecular Simulation*, vol. 39, Nos. 14-15, pp. 1253-1292.

Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.

Earl, D. J. et al., (2005) "Parallel tempering: Theory, applications, and new perspectives," *Phys Chem Chem Phys*, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," *Brochure*, 4 Pgs.

Fang, H., et al., (2012) "Prediction of CO2 Adsorption Properties in Zeolites Using Force Fields Derived from Periodic Dispersion-Corrected DFT Calculations," J Phys Chem C, 116, ACS Publications, pp. 10692-10701.

Fang, H. et al. (2013) "First principles derived, transferable force fields for CO2 adsorption in Na-exchanged cationic zeolites," Phys Chem Chem Phys, vol. 15, pp. 12882-12894.

Fang, H. et al. (2014) "Recent Developments in First-Principles Force Fields for Molecules in Nanoporous Materials", Journal of Materials Chemistry A, 2014, vol. 2, pp. 274-291.

Fang, H. et al. (2016) "Identification of High-$CO_2$-Capacity Cationic Zeolites by Accurate Computational Screening", American Chemical Society, Chemistry of Materials, 2016, vol. 28, pp. 3887-3896.

Farooq, S. et al. (1990) "Continuous Countercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Foster, M.D., et al. "A geometric solution to the largest-free-sphere problem in zeolite frameworks", *Microporous and Mesoporous Materials*, vol. 90, pp. 32-38.

Frenkel, D. et al., (2002) "Understanding Molecular Simulation: From Algorithms to Applications", 2nd ed., *Academic Press*, pp. 292-301.

Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.

Garcia-Sanchez, A., et al. (2009) "Transferable Force Field for Carbon Dioxide Adsorption in Zeolites", J. Phys. Chem. C 2009, vol. 113, pp. 8814-8820.

GE Oil & Gas (2007) "Dry Gas Seal Retrofit," Florence, Italy, www.ge.com/oilandgas, 3 pgs.

Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.

(56) References Cited

OTHER PUBLICATIONS

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.
Hopper, B. et al. (2008) "World's First 10,000 psi Sour Gas Injection Compressor," *Proceedings of the 37th Turbomachinery Symposium*, pp. 73-95.
Jain, S., et al. (2003) "Heuristic design of pressure swing adsorption: a preliminary study", *Separation and Purification Technology*, vol. 33, pp. 25-43.
Jaramillo, E. et al. (2004) "Adsorption of Small Molecules in LTA Zeolites, 1. $NH_3$, $CO_2$, and $H_2O$ in Zeolite 4A", J. Phys. Chem. B 2004, vol. 108, pp. 20155-20159.
Kim J et al. (2012) "Predicting Large CO2 Adsorption in Aluminosilicate Zeolites for Postcombustion Carbon Dioxide Capture", *J. Am. Chem. Soc.*, vol. 134, pp. 18940-18940.
Kärger, J., et al. (2012) "Diffusion in Nanoporous Materials", Whiley-VCH publisher, vol. 1, Chapter 16, pp. 483-501.
Kikkinides, E. S et al. (1995) "Natural Gas Desulfurization by Adsorption: Feasibility and Multiplicity of Cyclic Steady States," *Ind. Eng. Chem. Res.* V. 34, pp. 255-262.
Lin, L., et al. (2012) "In silico screening of carbon-capture materials", *Nature Materials*, vol. 1, pp. 633-641.
Liu, Q. et al., (2010) "NaKA sorbents with high $CO_2$-over-$N_2$ selectivity and high capacity to adsorb $CO_2$," *Chem Commun.*, vol. 46, pp. 4502-4504.
Loewenstein, W., (1954) "The Distribution of Aluminum in the Tetra-Hedra of Silicates and Aluminates" Am Mineral, 92-96.
Maurin et al. (2005) "Adsorption Mechanism of Carbon Dioxide in Faujasites: Grand Canonical Monte Carlo Simulations and Microcalorimetry Measurements", J. Phys. Chem. B 2005, vol. 109, pp. 16084-16091.
Neimark, A. V. et al., (1997) "Calibration of Pore Volume in Adsorption Experiments and Theoretical Models", *Langmuir*, vol. 13, pp. 5148-5160.
Palomino, M., et al. (2009) "New Insights on CO2-Methane Separation Using LTA Zeolites with Different Si/Al Ratios and a First Comparison with MOFs", Langmar, vol. 26(3), pp. 1910-1917.
Patcas, F.C. et al. (2007) "CO Oxidation Over Structured Carriers: A Comparison of Ceramic Forms, Honeycombs and Beads", *Chem Engineering Science*, v. 62, pp. 3984-3990.
Peng, D. Y., et al., (1976) "A New Two-Constant Equation of State", *Ind Eng Chem Fundam*, vol. 15, pp. 59-64.
Pham, T. D. et al., (2013) "Carbon Dioxide and Nitrogen Adsorption on Cation-Exchanged SSZ-13 Zeolites", Langmuir, vol. 29, pp. 832-839.
Pophale, R., et al., (2011) "A database of new zeolite-like materials", *Phys Chem Chem Phys*, vol. 13(27), pp. 1412.
Potoff, J. J. et al., (2001) "Vapor-Liquid Equilibria of Mixtures Containing Alkanes, Carbon Dioxide, and Nitrogen", AIChE J, vol. 47(7), pp. 1676-1682.
Rameshni, Mahin "Strategies for Sour Gas Field Developments," *Worley Parsons—Brochure*, 20 pp.
Reyes, S. C. et al. (1997) "Frequency Modulation 2407-12Methods for Diffusion and Adsorption Measurements in Porous Solids," *J. Phys. Chem. B.* v101, pp. 614-622.
Rezaei, F. et al. (2009) "Optimum Structured Adsorbents for Gas Separation Process", *Chem. Engineering Science*, v. 64, pp. 5182-5191.
Richardson, J.T. et al. (2000) "Properties of Ceramic Foam Catalyst Supports: Pressure Dop", *Applied Catalysis A: General* v. 204, pp. 19-32.
Robinson, D. B., et al., (1985) "The development of the Peng-Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.
Stahley, J. S. (2003) "Design, Operation, and Maintenance Considerations for Improved Dry Gas Seal Reliability in Centrifugal Compressors," *Dresser-Rand, Tech. Paper* 134, 15 pages.
Santos, M. S (2011) "New Cycle configuration to enhance performance of kinetic PSA processes" Chemical Engineering Science 66, pp. 1590-1599.
Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.
Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.
Suzuki, M. (1985) "Continuous-Countercurrent-Flow Approximation for Dynamic Steady State Profile of Pressure Swing Adsorption" *AIChE Symp. Ser.* v81 (242) pp. 67-73.
Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.
Walton, K. S. et al., (2006) "CO2 adsorption in Y and X zeolites modified by alkali metal cation exchange," *Microporous and Mesoporous Mat*, vol. 91, pp. 78-84.
Willems, T. F. et al., (2012) "Algorithms and tools for high-throughput geometry-based analysis of crystalline porous materials" *Microporous Mesoporous Mat*, vol. 149, pp. 134-141.
Zukal, A., et al., (2009) "Isosteric heats of adsorption of carbon dioxide on zeolite MCM-22 modified by alkali metal cations", *Adsorption*, vol. 15, pp. 264-270.
Lin, L., et al. (2012) "In silica screening of carbon-capture materials", *Nature Materials*, vol. 1, pp. 633-641.
Lowenstein, W., (1954) "The Distribution of Aluminum in the Tetra-Hedra of Silicates and Aluminates" Am Mineral, 92-96.
Neimark, A. V. et al., (1997) "Calibration of Pore vol. in Adsorption Experiments and Theoretical Models", *Langmuir*, vol. 13, pp. 5148-5160.
Pophale, R., et al., (2011) "A database of new zeolite-like materials", *Phys Chem Chem Phys*, vol. 13(27), pp. 12407-12412.
Reyes, S. C. et al. (1997) "Frequency Modulation Methods for Diffusion and Adsorption Measurements in Porous Solids," *J. Phys. Chem. B.* v101, pp. 614-622.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M et al., (2014) "Designing A Commercial Scale Pressure Swing Adsorber For Hydrogen Purification" *Petroleum & Coal*, vol. 56(5), pp. 552-561.
Baerlocher, C. et al., (2017) International Zeolite Association's "Database of Zeolite Structures," available at http://www.iza-structure.org/databases/, downloaded Jun. 15, 2018, 1 page.
Burtch, N.C. et al., (2015) "Molecular-level Insight into Unusual Low Pressure CO2 Affinity in Pillared Metal-Organic Frameworks," *J Am Chem Soc*, 135, pp. 7172-7180.
Beauvais, C. et al., (2004) "Distribution of Sodium Cations in Faujasite-Type Zeolite: A Canonical Parallel Tempering Simulation Study," *J Phys Chem B*, 108, pp. 399-404.
Fang, H., et al., (2012) "Prediction of CO2 Adsorption Properties in Zeolites Using Force Fields Derived from Periodic Dispersion-Corrected DFT Calculations," *J Phys Chem C*, 10692, 116, ACS Publications.
Agrafiotis, C. et al., "The effect of particle size on the adhesion properties of oxide washcoats on cordierite honeycombs," Journal of Materials Science Letters, 1999, vol. 18, pp. 1421-1424.
Bernad, S. I. (2012) "Numberical Model for Cavitational Flow in Hydraulic Poppet Valves" *Modelling and Simulation in Engineering*, vol. 2012, Article ID 742162, 10 pages.

\* cited by examiner

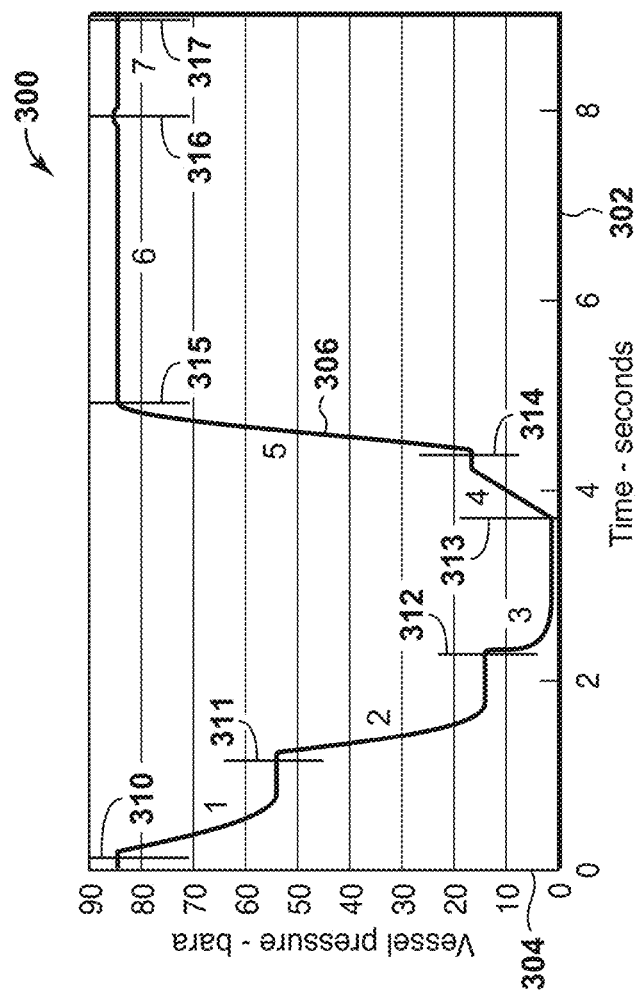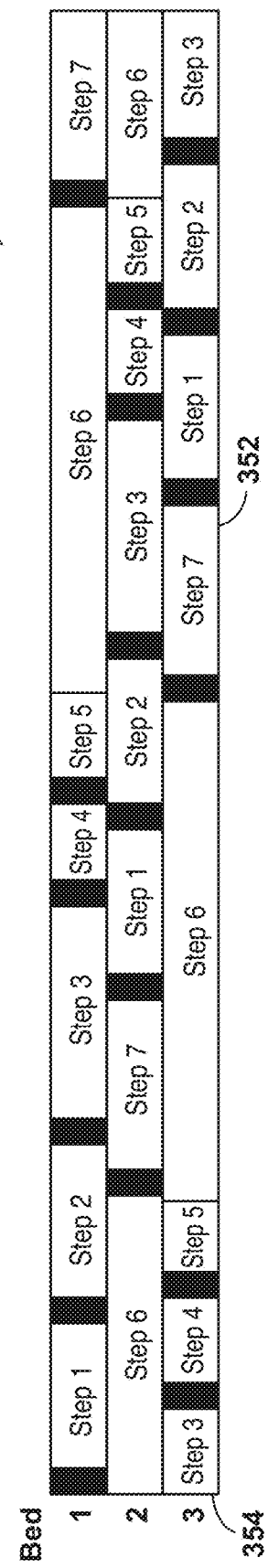
FIG. 3A
FIG. 3B

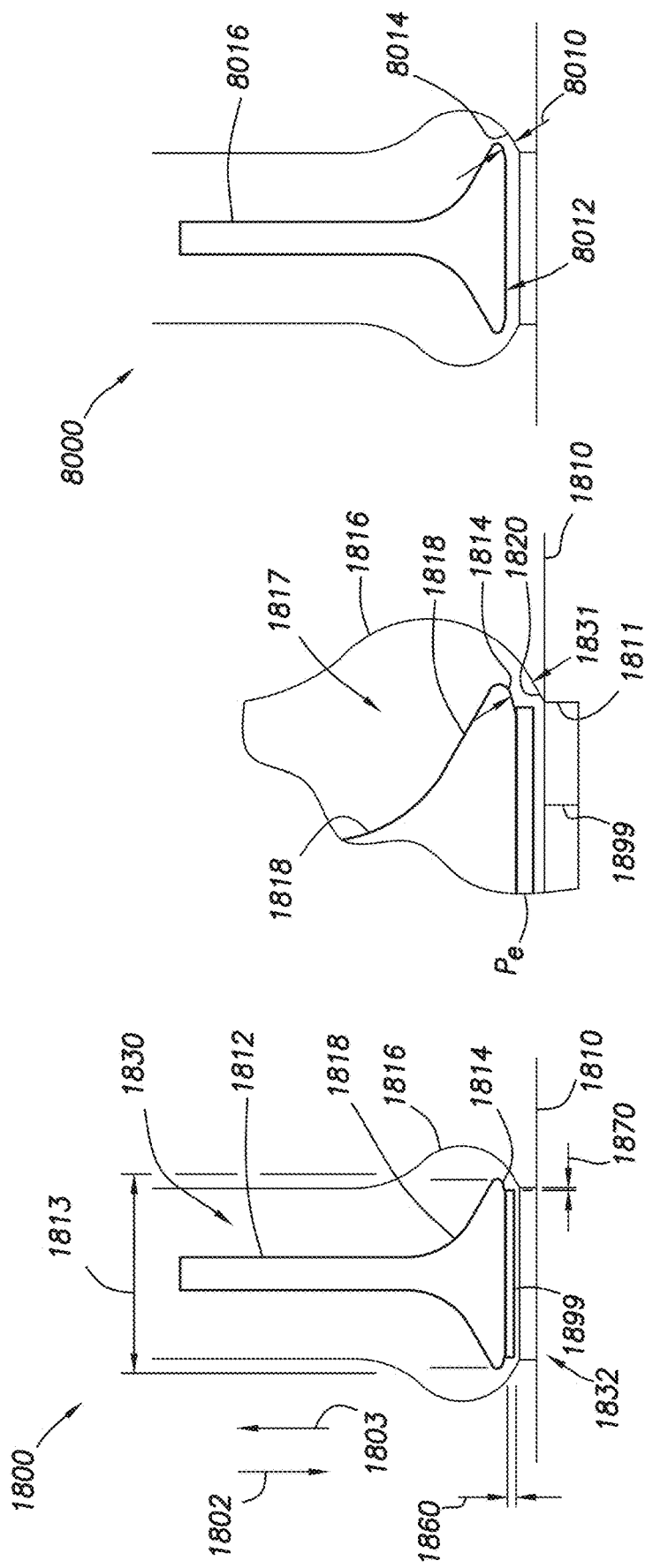

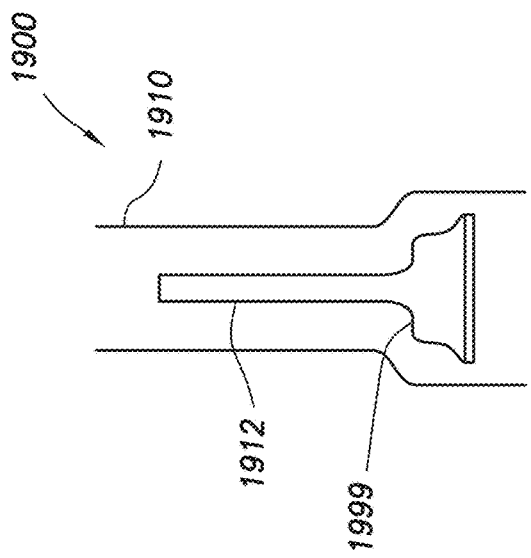
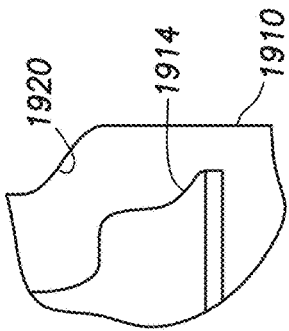
FIG. 9E
FIG. 9F
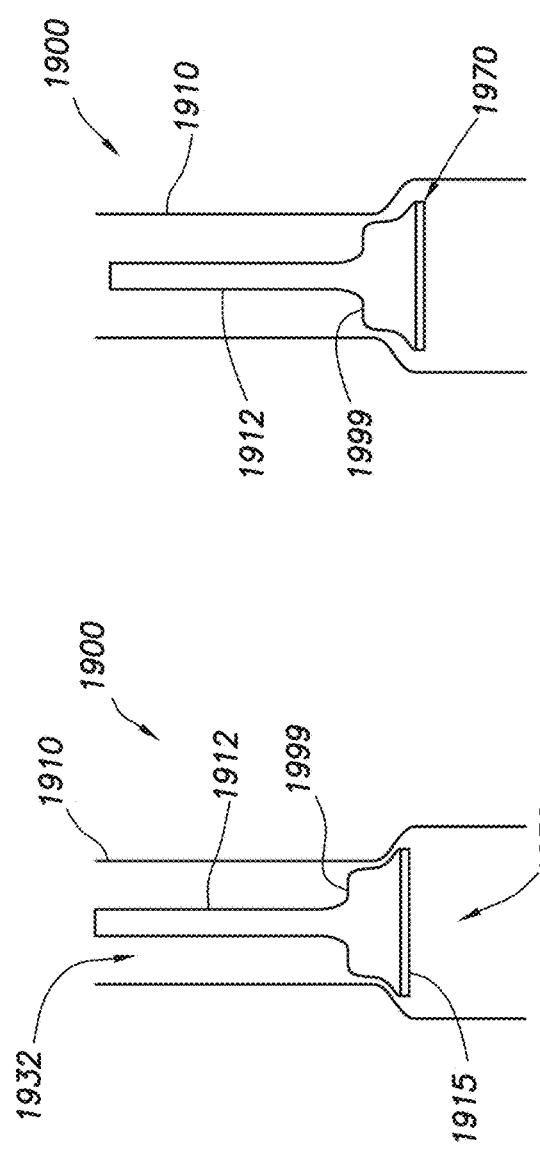
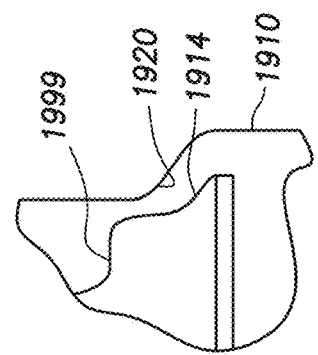
FIG. 9C
FIG. 9D
FIG. 9A
FIG. 9B

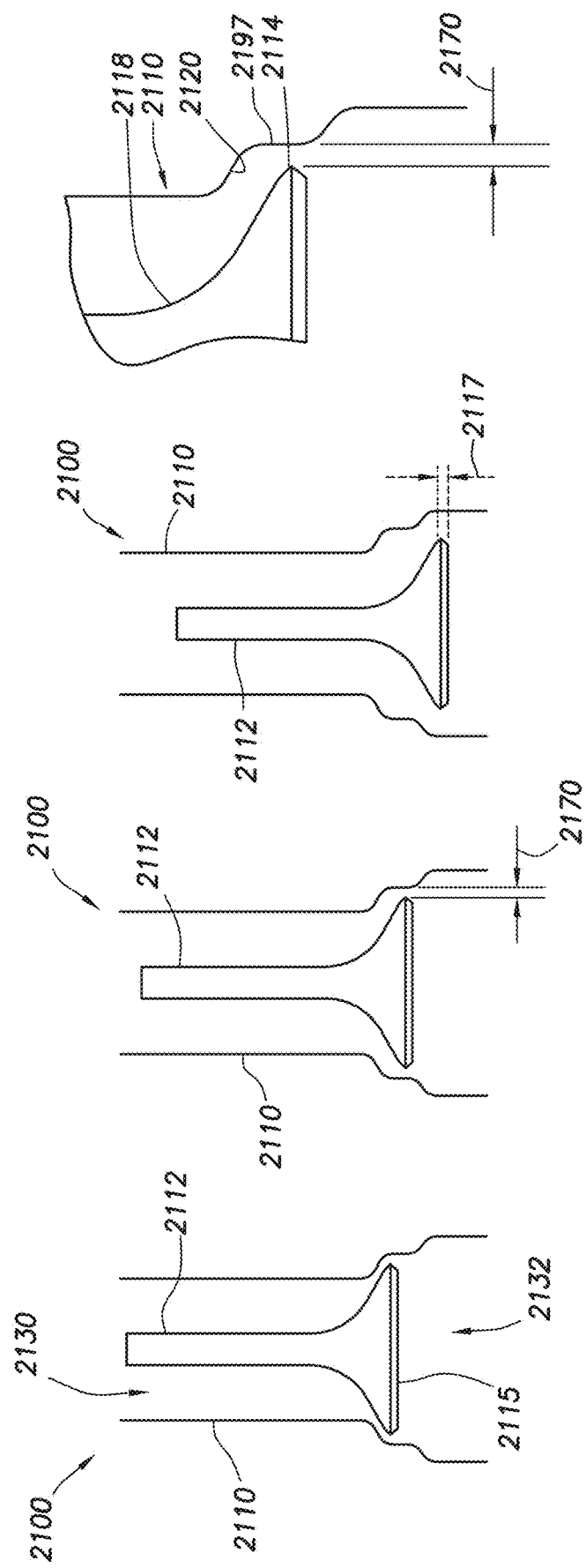

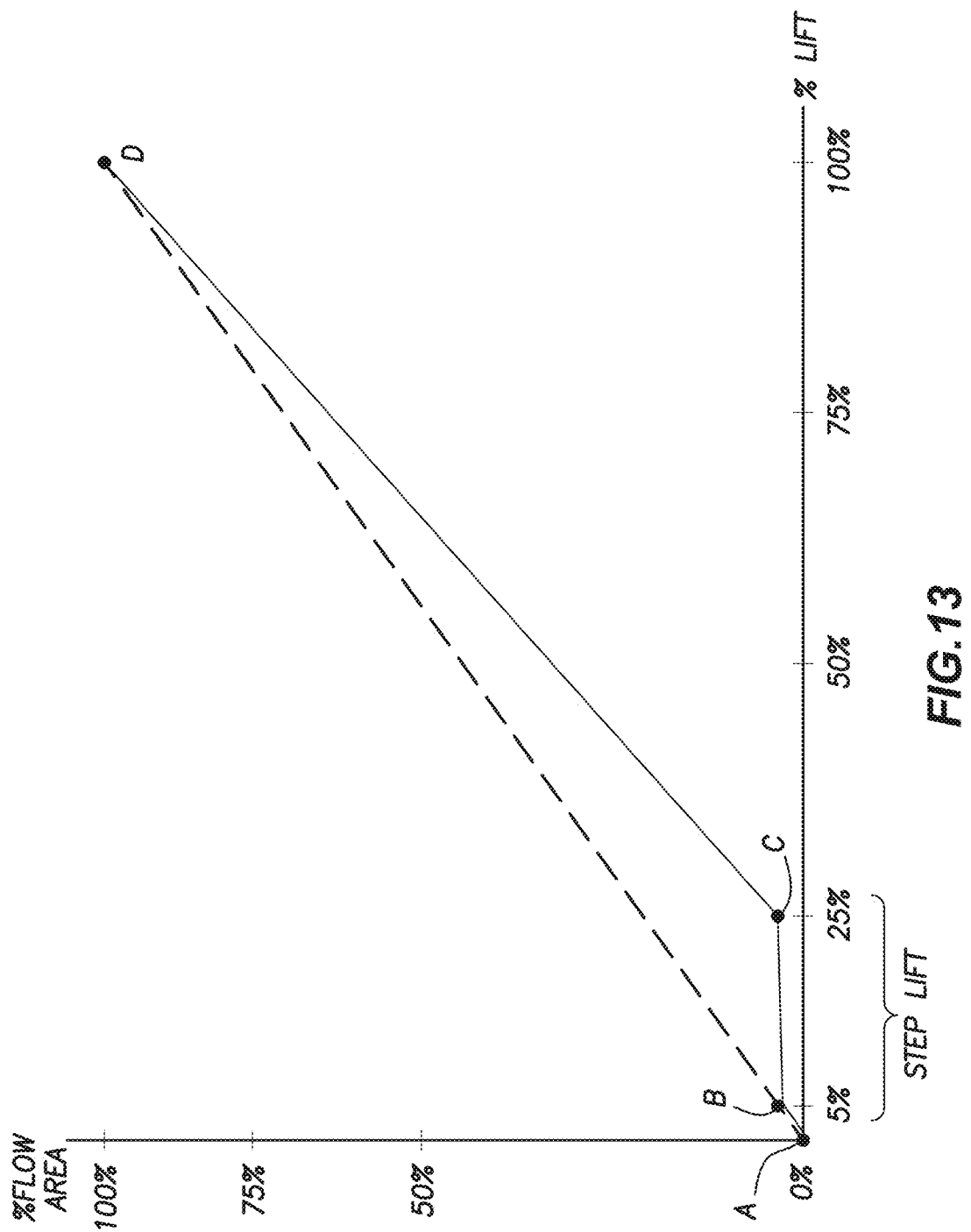

FLOW MODULATION SYSTEMS, APPARATUS, AND METHODS FOR CYCLICAL SWING ADSORPTION

CROSS REFERENCE TO RELATED APPLICATION

This application claims the priority benefit of U.S. Provisional Application No. 62/783,766 filed Dec. 21, 2018, the disclosure of which is incorporated herein by reference in its entirety.

FIELD

The present disclosure relates generally to cyclical swing adsorption processes (e.g., pressure swing adsorption processes) and to systems and apparatus for cyclical swing adsorption, including apparatus, systems, and methods of modulating fluid flow during swing adsorption processes.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), as well as combinations of these processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of gas adsorbed. When the pressure is reduced, the adsorbed component is released, or desorbed from the adsorbent material.

PSA processes may be used to separate gases of a gas mixture because different gases tend to fill the micropore of the adsorbent material to different extents. If a gas mixture, such as natural gas, is passed under pressure through a vessel containing an adsorbent material that is more selective toward carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. The adsorbent material is then typically purged and re-pressurized. Then, the adsorbent material is ready for another adsorption cycle.

TSA processes rely on the phenomenon that gases at lower temperatures are more readily adsorbed within the pore structure or free volume of an adsorbent material compared to gases at higher temperatures. That is, when the temperature of the adsorbent material is increased, the adsorbed gas is released, or desorbed. By cyclically swinging the temperature of an adsorbent material (e.g., an adsorbent bed), TSA processes can be used to separate gases in a mixture when used with an adsorbent material that is selective for one or more of the components of a gas mixture.

To accommodate larger-scale, continuous or long-running swing adsorption processes, multiple adsorbent bed assemblies are coupled together as a continuously operable, fluid flow system, wherein a network of conduit and valves are utilized to manage the flow of fluid streams in, out, and between the adsorbent bed assemblies. Furthermore, in such systems and processes, each of the individual bed assemblies is operated, or cycled, through its own swing adsorption processes preferably in continuous or long-running fashion. A complete cycle, through adsorption and desorption, can vary from seconds to minutes as a gaseous feed stream is passed through an adsorbent bed assembly. Operation of the system efficiently and productively requires, therefore, orchestrating the cycles of the various adsorbent bed assemblies such that each absorbent assembly is operated with minimal or no interruption, and the system continuously outputs a production stream at optimal levels. This generally means continuously passing the gaseous feed stream at near steady rate and delivering a product stream at near steady, maximum rates. In any event, operation of the multi-bed swing adsorption system and process presents flow management challenges.

For example, various steps in the process require displacing a gas volume or gas stream to an adsorbent bed using a subsequent gaseous stream. With the two streams sometimes at different working pressures, the initiation of this displacement may cause disturbances in the system, particularly in the feed and product flows, but also in the purge flows. The severity of the disturbance depends largely on the magnitude of the pressure differential. Grouping of different adsorbent bed assemblies with a common manifold or header can mitigate potential issues, but, often, such infrastructure falls short of preventing or effectively muting the system disturbance or the related residual effects.

To illustrate, an RCPSA process involves rapid acting valves capable of achieving tight sealing and reduced dead volume. A swing adsorption process that involves large pressure swings (e.g., 85 to 1.2 BARA) and short cycle times (e.g., less than 100 seconds per vessel, less than 60 seconds per vessel, less than 20 seconds per vessel, or less than 10 seconds per vessel) may exhibit pulsation in the headers of the system. For some flow service duties, the pulsation can interfere with the flow rate through the adsorbent beds, from end to end (i.e., where a valve is open on both ends of a vessel at once) or in adjacent vessels (e.g., where the valve opening times of adjacent vessels in the system overlap). For pressure swing adsorption processes the blow-down and re-pressurization steps in particular can cause pulsations as the gas rushes into or out of the vessel. Further, such pulsations cause unwanted mechanical vibrations in the system, which may shorten the life of various components within the system.

Methods of reducing these flow disturbances are described in U.S. Patent Application Publication No. 2016/0023155, entitled "APPARATUS AND SYSTEM HAVING A VALVE ASSEMBLY AND SWING ADSORPTION PROCESSES RELATED THERETO" (hereinafter the '155 Publication). The disclosure of the '155 Publication provides background and reference for the concepts, methods, apparatus, and systems described herein. Accordingly, the entirety of U.S. Patent Application Publication No. 2016/0023155 is incorporated herein by reference and made a part of the present disclosure. Notably, these methods require addition of hardware in the systems.

There remains a need for new and/or improved techniques, methods, systems, or apparatus suitable for mitigating flow disturbances during swing adsorption processes, such as those mentioned above, during certain steps or stages of swing adsorption processes. Preferably, such remedies will involve minimal additional hardware or modification to present systems and processes, and minimal impact on production. Improvement in effectiveness and consistency are, of course, sought. In this respect, it would also be desirable to implement remedies that more directly addresses the source of the disturbance, or which, are implemented more proximately to the physical or operational source of the disturbance.

SUMMARY

One aspect of the present disclosure includes a cyclical swing adsorption process for removing contaminants from a gaseous feed stream. The process includes operating a system having at least two adsorption bed vessels that share a common inlet header and are in fluid communication. The absorbent bed vessels are operated simultaneously, with each vessel being cyclically operable through swing adsorption process cycles to produce a product steam from the feed stream. During simultaneous operation of the at least two adsorption bed vessels through the respective adsorption process cycles, the process includes transitioning a first adsorption bed vessel of the at least two adsorption bed vessels from a first stage in the adsorption process cycle to a second stage in the adsorption process cycle. In the first stage, the first adsorption bed vessel is fluidly isolated from the second adsorption bed vessel and the common inlet header by at least one inlet valve installation that is in a closed position and operating under a working pressure difference of $P_0-P_1$, while the gaseous feed stream is directed to the second adsorption bed vessel from the common inlet header. The transitioning includes opening the inlet valve installation of the first adsorption bed vessel to direct at least a portion of the feed stream from the common inlet header into the first adsorption bed vessel. Before the opening of the valve, a system pressure, $P_0$, upstream of the inlet valve installation of the first adsorption bed vessel is more than the working pressure, $P_1$ (e.g., 50% more or 100% more). The opening of the inlet valve installation of the first adsorption bed vessel includes lifting the inlet valve installation from a closed position to a partially lifted position, and then further lifting the inlet valve installation from the partially lifted position to a more open position, where the feed stream continues to be directed to the first adsorption bed vessel prior to completion of the second.

Another aspect of the present disclosure includes a method, in a cyclical swing adsorption process, of modulating introduction of fluid flow into a first absorbent bed vessel. The first absorbent bed vessel is a portion of an adsorption process system including at least two adsorption bed vessels sharing a common inlet header and configured in fluid communication. The method includes, during transitioning of the first adsorbent bed vessel from a first stage in a swing adsorption cycle to a second stage in the cycle, opening an inlet valve installation into the first adsorption bed vessel to direct a feed stream from the common inlet header into the first adsorbent bed vessel. Prior to the opening of the inlet valve installation, a system pressure, $P_0$, upstream of the inlet valve installation is more than a working pressure, $P_1$, of the system (e.g., at least 50% or at least 100% more). The transition occurs while a second adsorbent bed vessel is simultaneously operating in an adsorption stage of the cycle. The opening of the inlet valve installation includes lifting the inlet valve installation through a lift range from a closed position to a second, partially open position. In lifting through the lift range, the inlet valve installation passes through at least an initial lift range where an available flow area through the inlet valve installation, in response to the percent lift of the inlet valve installation, is characterized by an initial slope, and a second subsequent lift range where the available flow area through the inlet valve installation, in response to the percent lift of the inlet valve installation, is characterized by a reduced slope.

Another aspect of the present disclosure includes a valve installation in a system for simultaneously operating at least two absorbent bed vessels through respective cycles of a cyclical swing adsorption process for removing contaminants from a gaseous feed stream. The two adsorption bed vessels share a common inlet header and are configured in fluid communication. The valve installation includes a valve for introducing fluid flow into one of the vessels. The valve installation includes a valve body having a flow through orifice and defining, at least partly, a fluid bore for communicating fluid flow through the valve. A valve stem supporting a disk is movably coupled in the fluid bore through a valve lift range of from 0% lift to 100% lift. A seat is situated to receive the disk to seal the orifice at a valve position corresponding to 0% lift. The disk is movable to disengage from the seat and to a second lift position to reveal an available flow area through which fluid flow passes from one side of the valve to another side of the valve. The valve installation is characterized by a flow area response to valve lift over a range of valve lift. The valve installation includes a flow restriction aid disposed to define a restricted flow area over a discrete lift range of the valve. The restricted flow area is less than a restricted flow area defined, at least partly, by the disk over the discrete lift range.

BRIEF DESCRIPTION OF THE FIGURES

FIGS. 3A and 3B illustrate a swing adsorption process;

FIGS. 8A and 8B depict a poppet valve having a plug as a flow restriction aid;

FIG. 8C depicts a poppet valve without a flow restriction aid;

FIGS. 9A and 9B depict a conventional acting poppet valve with a restricted area in the closed position;

FIGS. 9C and 9D depict the valve of FIGS. 9A and 9B in a step lifted position;

FIGS. 9E and 9F depict the valve of FIGS. 9A and 9B in a fully open position;

FIGS. 11A-11C depict a conventional acting poppet with an annulus restriction in the closed position, step lifted position, and fully open position, respectively;

FIG. 11D depicts a detail view of the valve in FIG. 11B;

FIG. 13 is a graph of percentage of valve flow area versus percentage of valve lift;

DETAILED DESCRIPTION

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Swing Adsorption

Figure 1A:
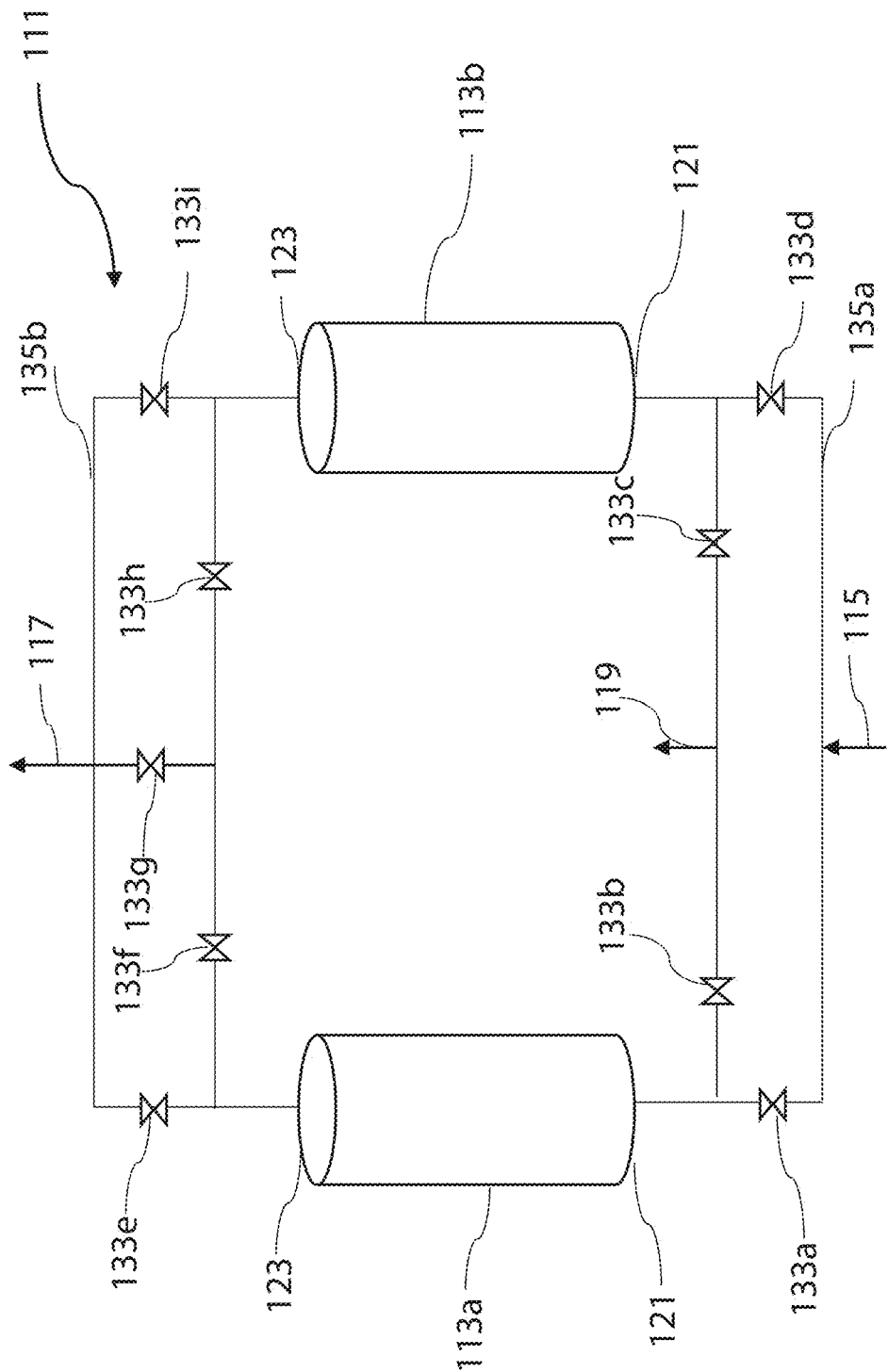
FIGS. 1A and 1B are simplified schematics showing two adsorbent beds and illustrating a basic system and process for swing adsorption, according to the present disclosure.

Aspects of the present disclosure include methods, apparatus, and systems that are suited for modulating flow in or during multi-absorbent bed swing adsorption processes and in systems for accommodating such processes. The simplified schematic of FIG. 1A represents such a system and process. The basic swing adsorption system 111 includes at least two absorbent bed assemblies 113a and 113b that are configured in fluid communication utilizing a piping network equipped with an arrangement of directional valves interconnecting the two beds. The system 111 is operable as a closed fluid system and includes an inlet 115 that directs a gaseous feed stream to one or both of the beds, and an outlet 117 for outputting a product stream passed through one or both of the beds. The system 111 also includes an exhaust outlet 119 for exhausting a separated, perhaps "enriched", stream from the adsorbent beds.

As shown, vessels 113a and 113b are further configured in parallel and each vessel has a first end 121 and a second end 123. A gaseous stream is passed through the vessels 113a and 113b from end to end in various steps or stages of the process. Valve assemblies 133a-133i (also referred to as valves) at each end of the adsorbent beds, and, further, comment inlet and outlet manifolds or headers 135a and 135b common to both vessels 113a and 113b, allow the vessels 113a and 113b to communicate with each other and to connect to high and low-pressure sources, which effect changes of pressure across the vessels 113a and 113b and changes in flow and flow direction across the vessels 113a and 113b. The piping system (i.e., manifolds or headers 135a and 135b and valve installations 133a-133i) allows for management of the flow into, out of, and in between the vessels 113a and 113b, and across the vessels 113a and 113b in either direction. Preferably, the system utilizes reciprocating valve assemblies (e.g., poppet valve assemblies) which, through simple movement in the fluid bore of the valve, can provide precision control and timing of fluid and vapor flows in the system.

In the pressure swing adsorption process, the two vessels 113a and 113b are operated simultaneously, with each bed preferably operated through identical swing adsorption process cycles. FIG. 1A reflects a PSA operation where the two vessels 113a and 113b are one half-cycle out of phase (i.e., 180 degrees out of phase), with vessel 113a operating in adsorption mode and vessel 113b operating in regeneration mode. In adsorption mode, a gaseous feed stream enters one end of vessel 113a at pressure and passes through the vessel, contaminants in the passing stream are adsorbed in the adsorbent bed therein, and a product stream, from which the contaminant has been separated, exits the vessel 113a on the opposite end. In regeneration mode, the pressure in vessel 113b normalizes via rapid depressurization and the adsorbed components are typically vented, such as to another unit operation, through valve 133c. In a subsequent re-pressurization mode, valves 133c and 133i are closed and valve 133d is open. The gaseous feed stream is then directed through vessel 113b through valve 133d and is used to bring the bed back to working pressure, after which valve 133i is opened.

As discussed previously, flow disturbances can be caused by and occur upon a transition of the vessels entering into the re-pressurization stage. The degree of disturbance will be partly dependent on the change in flow rate and fluid velocities across the valve that controls input of feed into the vessel, and thus, the pressure differential across the valve during opening of the valve, as well as the rate of opening of the valve. In one aspect of the present disclosure, a swing absorbent process (and system) is provided which incorporates a step lift method in operating one or more of valves 133a-133i during initiation of the aforementioned transitions, or any other valve in the system effecting such transitions. In another aspect, a valve installation is provided having structural features which facilitates implementation of the step lift opening and the transition events (e.g., a flow restriction aid or flow restrictor).

The methods disclosed herein may be applied to, for example, rapid cycle pressure swing adsorption (RCPSA) and rapid cycle partial pressure swing adsorption (RCPPSA), which may be combined with other swing adsorption processes, such as pressure/temperature swing adsorption processes. Some exemplary kinetic swing adsorption processes are described in U.S. Patent Application Publication Nos. 2008/0282892, 2008/0282887, 2008/0282886, 2008/0282885, and 2008/0282884, which are each herein incorporated by reference in their entirety.

RCPSA processes generate flow disturbances caused by pressure differences during certain transitions within a vessel (adsorbent bed unit). For example, when a vessel in an RCPSA system transitions from a high-pressure stage, such as an adsorption stage, to a low-pressure stage, such as a regeneration stage, by blowing-down (BD) through a purge valve, flow disturbances (e.g., pulsations) may be caused by the pressure differential across the purge valve. Also, when a vessel in an RCPSA system transitions from a low-pressure stage, such as a purge stage, to a high-pressure stage, such as an adsorption stage, which includes re-pressurization (RP), flow disturbances may be caused by the pressure differential across the feed valve. Typically, several such vessels are manifolded together to allow for a continuous flow from all vessels. The various stages or steps within the multiple, manifolded vessels are overlapped to maintain continuous flow in the overall system. In such systems, the flow disturbances caused by transition within one vessel to a purge stage, which includes BD, or an adsorption stage, which includes the RP operation, this results in flow disturbances in other vessels within the system, which interrupts the steady flow through these other vessels. Such flow disturbances may interfere with the adsorption process, such as by interrupting the steady flow within vessels in the system that are operating within the adsorption stage, which may result in mal-distribution of the flow through the adsorbent material. Such flow disturbances may also result in vibrations throughout the system (e.g., within manifold piping), and stress on system components, including the internal components of the vessels.

During transition of a vessel into the BD stage or RP stage, the flow rate into or out of the transitioning vessel may briefly be larger than the steady-state flow rate throughout the system, depending on the pressure differential between the steps or stages within the vessel involved in the transition, and depending on the opening speed of the valve flow area for the vessel undergoing transition into BD or RP stage. The systems and process, according to the present disclosure, provide flow control means or steps for improving control of the flow into the vessels during these events, thereby eliminating or mitigating the source of the aforementioned disturbances. In one aspect, the swing adsorbent process employs a step lift to initiate valve opening at the aforementioned transition event. In another aspect, the system is equipped with a valve installation that accommodates the step lift and facilitates control of the change in flow in the adsorbent bed during these transition events.

Exemplary swing adsorption systems are described in United States Patent Application Publication Nos. 2011/0291051; 2013/0327216; and 2013/0061755, and in Intl. Application Publication Nos. 2011/149640; 2012/118755; and 2012/118758, which are each herein incorporated by reference in their entirety. In such systems, the configuration may include one or more adsorbent beds, each undergoing different steps in an adsorption cycle that may include an adsorption step, one or more depressurization/desorption steps, one or more blow-down steps, one or more purge steps, and one or more re-pressurization steps. The adsorbent beds and various conduits along the flow path have to be swept or otherwise managed to facilitate flow of fluids through the system. The flow control techniques disclosed in the present disclosure may be applied to such systems.

U.S. Patent Publication No. 2016/0023155 (the '155 Publication) discusses certain techniques for mitigating the flow disturbances in the swing adsorbent process and system to which the systems and methods of the present disclosure are also applicable. The systems and methods of the present disclosure may, in fact, be applied in conjunction with the techniques proposed in this previous disclosure.

The techniques disclosed in the '155 Publication are directed to addressing the same type of disturbances addressed by techniques of the present disclosure and, particularly, reducing pulsation of flow of fluids through the system during or as a result of such disturbances. As discussed therein, the opening and closing of the valves may not be as problematic for slower cycle operations, but pulsation is problematic for a rapid cycle swing adsorption processes and associated systems. The techniques of the '155 Publication include introduction of a pulse flow control mechanism in the system, preferably in a common header or manifold in the multi-bed swing adsorbent system. In one application, the pulse flow control mechanism may include one or more pulse flow controllers (PFCs) in fluid communication with the poppet valve assemblies of the adsorbent bed assemblies. The PFC may be based upon the sub-sonic compressible-flow equation, which may involve calculating the flow area to produce the instantaneous mass flow at each instant in time. To manage the flow, the pressure feeding the PFC is higher than the feed pressure in the feed manifold, which should be substantially constant. As an example, if the conduit is an inlet stream, the PFC valve may be disposed upstream of the inlet header feeding the adsorbent beds in the system, while for product streams, the PFC valve may be disposed downstream of the outlet from the adsorbent bed assemblies.

The techniques may utilize poppet-type valves that are controlled by a computer to adjust the timing of the opening or closing of the PFC valve. For example, as the required valve motion can be calculated a priori, a simple feed-forward control scheme may be employed with the system. However, as the PFC does not have an unlimited frequency response, control mechanisms may include adjustments to control parameters, such as gain magnitude and phase, plus a zero to match the constant lift step. These adjustments may be used to compensate for deviations. For example, the constant lift step through the feed valve may directly influence the performance of rapid swing adsorption processes, such as RCPSA processes. If the calculated lift profile has small errors, it may be corrected by a dithering control scheme to correct the gain.

Further, the techniques in the '155 Publication may utilize a master controller or computer system to adjust the timing of the opening or closing of the valves to coordinate between different adsorbent bed assemblies to compensate for the flow through the poppet valves and the associated lift time for the poppet valves. That is, the computer system may use the global cycle time to adjust the opening or closing of valves. Also, the mass flow may be included in the operation of the valves.

In another application, the pulse flow control mechanism may include a configuration where the feed header is separated into a primary feed header and a re-pressurization feed header. For example, the feed stream may include a re-pressurization feed header that provides a first portion of the feed stream to the adsorbent bed assemblies during re-pressurization steps and a primary feed header that provides a second portion of the feed stream to the adsorbent bed assemblies during the adsorption step.

To manage the flow of the feed stream between the primary feed header and the re-pressurization feed header, the system may include a pulsation dampener. The pulsation dampener may include a pulsation bottle and a choke tube. The pulsation dampener may be disposed in the flow path between the primary feed header and the re-pressurization feed header to suppress any resulting pressure pulsation in the upstream conduits or manifolds. The pulsation dampener may also operate as an acoustic filter.

In other configurations, a combination of these pulse flow control mechanism may be utilized. For example, the feed header may include a PFC and also include a primary feed header and a re-pressurization feed header. In another example, PFCs may be used on various product headers as the pulse flow control mechanism for the respective headers, while the primary feed header and the re-pressurization feed header may be utilized as the pulse flow control mechanism for the feed header.

Maintaining pressure at a substantially constant pressure may vary for each of the respective manifolds with each manifold having a different target pressure. That is, for a swing adsorption process, for example, as shown and described in reference to Table 1 of the '155 Publication, incorporated herein by reference (incorporated Table 1), various pressures may be within a tolerance around a target pressure for that manifold.

The configurations proposed in the '155 Publication involve the feed rate to each bed being at the preferred value for the adsorption dynamics. That is, the pressure is maintained constant, but the feed rate varies and preferred operation is to maintain feed rate at a preferred rate at specific times in the cycle. This aspect addresses the lift mass flow problem. Further, the feed rate to each of the adsorbent beds during the adsorption step should be substantially constant, without pulsation effects, which disturb the flow through the adsorbent vessel. That is, the in-rush feed rate is isolated to the re-pressurization feed header and does not overlap and/or disturb the steady feed flow. As such, this aspect addresses the rush flow problem, which is described further below. Also, the in-rush feed rate, which produces pulsating flow, may be prevented from interfering with the primary feed flow by a pulsation bottle which acts as a low-pass filter.

The systems, method, and techniques of the present disclosure may be further understood with reference to FIGS. 1C, 2, 3A, 3B, 4A-4C, 5A, 5B, and 6 below, which are reproduced from the incorporated '155 Publication, and correspond with FIGS. 1, 2, 3A, 3B, 4A-4C, 6A, 6B, and 7 as set for the in the '155 Publication, respectively. Certain descriptions accompanying these Figures are also reproduced here to facilitate description of the present systems and methods, and to highlight their unique contributions to the art.

Figure 1B:
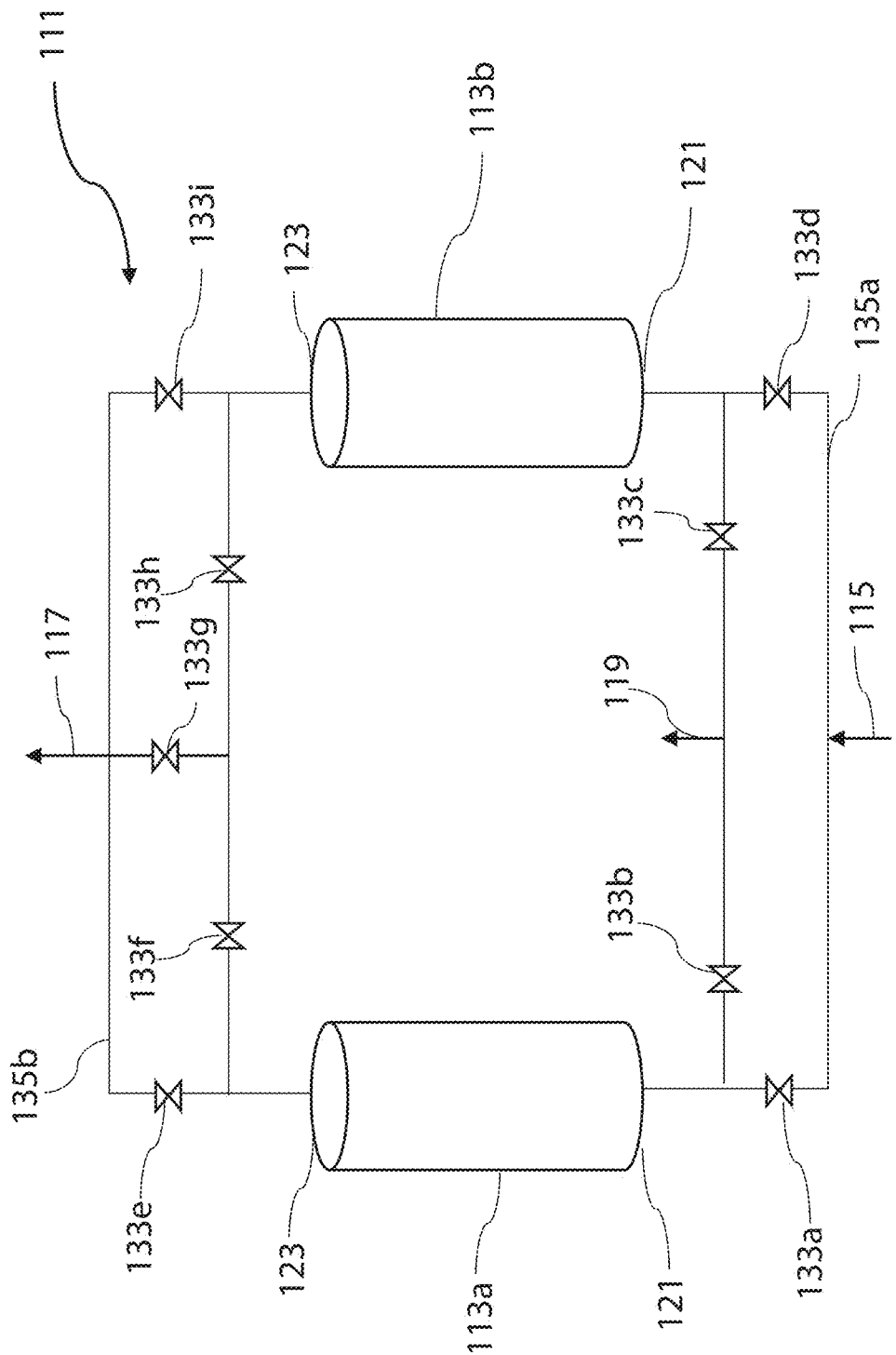
Figure 1C:
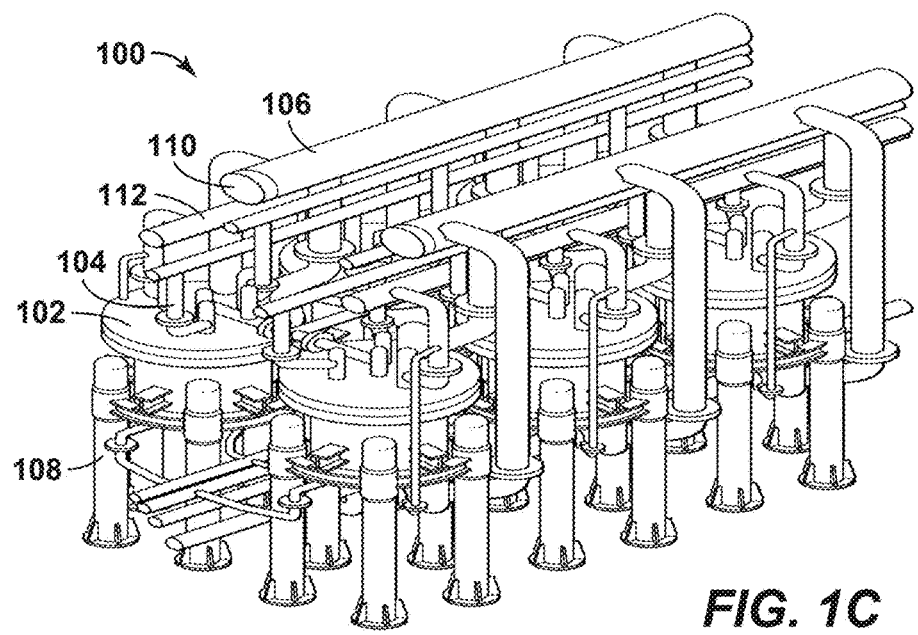
FIG. 1C is a three-dimensional diagram of a swing adsorption system similar to as described in FIGS. 1A and 1B, with six adsorbent bed units and interconnecting piping.

To start, FIG. 1C is provided as a three-dimensional diagram of another swing adsorption system 100 suitable for use of the present system, methods, and techniques, as well as those introduced in the '155 Publication. The system 100 has six adsorbent bed units and interconnecting piping. This configuration broadly relates to adsorbent bed units that can be deployed in a symmetrical orientation as shown, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from gas feed streams. For example, the adsorbent bed unit 102 may include various conduits (e.g., conduit 104) for managing the flow of fluids through, to or from the adsorbent bed within the adsorbent bed unit 102. These conduits from the adsorbent bed units may be coupled to a manifold (e.g., manifold 106) to distribute the flow to, from or between components. The adsorbent bed may separate one or more contaminants from the gaseous feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the process.

As an example, which is discussed further below in FIG. 2, the adsorbent bed unit 102 may include a housing, which may further include a head portion and other body portions, that forms a substantially gas impermeable partition, an adsorbent bed disposed within the housing and a plurality of poppet valves providing flow paths through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in fluid or flow communication with a different conduit associated with different streams. The poppet valves may provide fluid communication between the adsorbent bed and one of the respective conduits, manifold or header. The term "in direct flow communication" or "in direct fluid communication" means in direct flow communication without intervening valves or other closure means for obstructing flow. As may be appreciated, other variations may also be envisioned within the scope of the present techniques. In the present disclosure, reference is sometimes made to "valve installations" which may refer to the valve body and the valve components, as well as the portion of the housing or the piping in which the valve body is supported including any portion functioning as an interface or seat to the valve disk element or equal flow sealing or flow modulating component.

In this swing adsorption system 100, the pulse flow control mechanism may include various configurations to manage the pulsation in the system. For example, the manifold 106 may include a pulse flow controller (PFC), such as PFC 110, that is disposed upstream of the adsorbent bed units, such as adsorbent bed unit 102, and is in fluid communication with the various adsorbent bed units. In this configuration, the feed stream may flow from a source location, such as a pipeline or storage tank, through the PFC 110 and to the adsorbent bed units. The PFC 110 may operate to lessen pulsation in the system for the respective streams.

In an alternative or additional configuration, the pulse flow control mechanism may include a primary feed header, such as manifold 106, and a re-pressurization feed header, such as manifold 112. In this configuration, a first portion of the feed stream may flow from a source location, such as a pipeline or storage tank, through a feed pulsation dampener (not shown) to the manifold 112, which is the re-pressurization feed header. Then, a second portion of the feed stream may flow through the manifold 106, which is primary feed header to the adsorbent bed units. The separate streams with the feed pulsation dampener may lessen pulsation in the feed header. These various configurations of the pulse flow control mechanism may be utilized to reduce the pulsation from swing adsorption processes, such as the RCPSA process.

Figure 2:
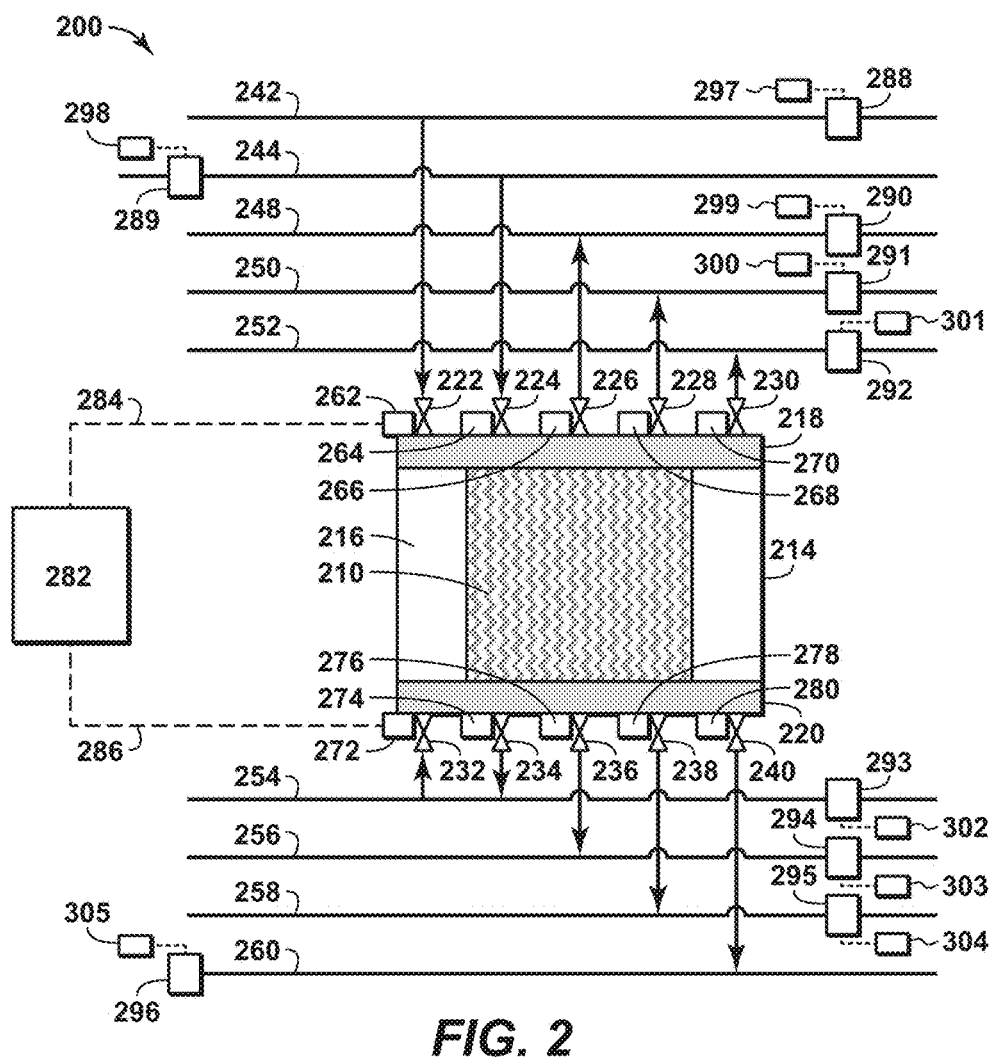
FIG. 2 is a diagram of a portion of an adsorbent bed unit having associated valve assemblies and manifolds.

FIG. 2 is a diagram 200 of a portion of an adsorbent bed unit having valve assemblies and manifolds. The portion of the adsorbent bed unit 200, which may be a portion of the adsorbent bed unit 102 of FIG. 1C, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are composed substantially of open flow path volume. Such open flow path volume in adsorbent bed unit contains gas that has to be managed for the various steps.

The upper head 218 and lower head 220 contain openings in which valve structures can be inserted, such as poppet valve assemblies 222 to 240, respectively. The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow paths through the inlet manifolds 242 and 244 and the outlet manifolds 248, 250 and 252, while the lower head 220 contains various openings (not show) to provide flow paths through the inlet manifold 254 and the outlet manifolds 256, 258 and 260. Disposed in fluid communication with the respective manifolds 242 to 260 are the poppet valve assemblies 222 to 240. The poppet valve assemblies 222 to 240 may include a disk element connected to a stem element which can be positioned within a bushing or valve guide. The stem element may be connected to an actuating means, such as actuating means 262 to 280, which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller or larger diameter than those for outlet manifolds, depending on the feed and purge mass flow rates, the valve type, reverse or conventional, or the pressures and temperatures.

Further, each of the inlet manifolds 242, 244 and 254 and the outlet manifolds 248, 250, 252, 256, 258 and 260 may include a pulse flow controller, such as pulse flow controllers 288 to 296. The pulse flow controllers 288 to 296 may be disposed adjacent the inlet manifolds 242, 244 and 254 and the outlet manifolds 248, 250, 252, 256, 258 and 260. In addition, pulsation bottles 297-305 may also be utilized adjacent the inlet manifolds and outlet manifolds, which may include an acoustic filter, to suppress any resulting pressure pulsation in the conduits or manifolds.

The adsorbent bed unit 200 may also include an operation controller 282 that is utilized to manage the operation of the poppet valve assemblies 222 to 240 via the respective actuating means 262 to 280. The operation controller 282 may communicate with the actuating means 262 to 280 via communication lines. For simplicity, this diagram only includes communication lines 284 and 286, which are illustrated as dashed lines. As may be appreciated, the communication lines may include individual communication lines or a shared communication line based on different configurations, which are discussed further below.

FIGS. 3A to 3B illustrate an exemplary rapid cycle swing adsorption (RCPSA) process in accordance with an application. As an example, FIG. 3A is a graph 300 of the adsorbent bed pressures 304 versus time 302 during a complete cycle of the RCPSA process. For this example, the feed composition is 10 volume percent (vol. %) $CO_2$ with 100 parts per million (ppm) $H_2S$ with water to saturation levels. To be efficient, the RCPSA process involves rapid acting valves capable of tight sealing and offering minimum dead volume. Accordingly, the graph 300 is explained with reference to the adsorption bed unit 200 of FIG. 2, which also cites reference numerals from FIG. 2.

In this graph 300, the various steps in the process are performed and result in a response 306 associated with the adsorption bed 210. For the response 306, the adsorbent bed undergoes various steps, which are indicated as steps 1 to 7 (represented along the response 306 by the lines 310 to 317), which include pressures in the range from 85 bara (bar absolute) to about 1 bara. In this process, step 1 is a depressurization step (represented between lines 310 and 311), step 2 is a second depressurization step (represented between lines 311 and 312), step 3 is a third depressurization step (represented between lines 312 and 313), step 4 is a feed re-pressurization step (represented between lines 313 and 314), step 5 is a feed re-pressurization step (represented between lines 314 and 315), step 6 is an adsorption step (represented between lines 315 and 316) and step 7 is a purge step (represented between lines 316 and 317).

To perform these steps with reference to the adsorbent bed unit 200, the different poppet valve assemblies 222 to 240 have to be operated in a specific sequence to manage the flow of fluids through the adsorption bed 210. For example, in step 1, poppet valve assemblies 230 and 236 may be open to vent the adsorbent bed 210 to the manifolds 252 and 256 to a pressure of 54 Bara, while the other valves are closed. For step 2, poppet valve assemblies 228 and 238 may be open to vent the adsorbent bed 210 to the manifolds 250 and 258 to a pressure of 14 bara, while the other valves are closed. For step 3, poppet valve assemblies 226 and 240 may be open to vent the adsorbent bed 210 to the manifolds 248 and 260 to a pressure of 1.2 bara, while the other valves are closed. For step 4, poppet valve 232 may be open to re-pressurize the adsorbent bed 210 with product gas from manifold 254 to 18 bara, while the other valves are closed. Then, for step 5, poppet valve assembly 222 may be open to re-pressurize the adsorbent bed 210 with feed gas from the manifold 242 to a pressure of 85 bara, while the other valves are closed. The opening of the poppet valve assembly 222 provides sufficient flow into the volume of the adsorbent bed 210 to increase the pressure from the end of Step 4 to the beginning of Step 6. In this example shown in FIG. 3A, the corresponding pressures are about 17 bara to about 85 bara, respectively. For step 6, poppet valve assemblies 222 and 234 may be open for an adsorption step in the adsorbent bed 210 associated with the fluid in manifolds 242 and 254 at a pressure of 85 bara, while the other valves are closed. Finally, for step 7, poppet valve assemblies 224 and 234 may be open to purge the adsorbent bed 210 associated with the fluid in manifolds 242 and 254 at a pressure of 85 bara, while the other valves are closed.

To obtain a steady feed and product flows, multiple adsorbent bed units may be configured to operate from a shared manifold for the respective steps. As an example, FIG. 3B is an exemplary schedule 350 of the performance of an RCPSA process for three adsorbent bed units. The schedule 350 shows the step each bed is performing along in a chart that references the bed 354 versus time 352. The step numbers in this figure correspond to the step numbers described in FIG. 3A. As this example involves large pressure swings (e.g., in a range of about 85 bara to about 1.2 bara) along with a short cycle time (e.g., about 9 seconds), pulsation may occur in the manifolds or headers (the terms may be used interchangeable), such as manifolds 242 to 260. For some flow service duties, the pulsation can interfere with the required flow rate through the adsorbent matrix of the absorbent bed within an adsorption bed unit (e.g., where a valve is open on both ends at once) or in adjacent units (e.g., where the valve opening times overlap). Accordingly, the pulsations in the flow rate are described further below in FIGS. 4A to 4C.

Figure 4A:
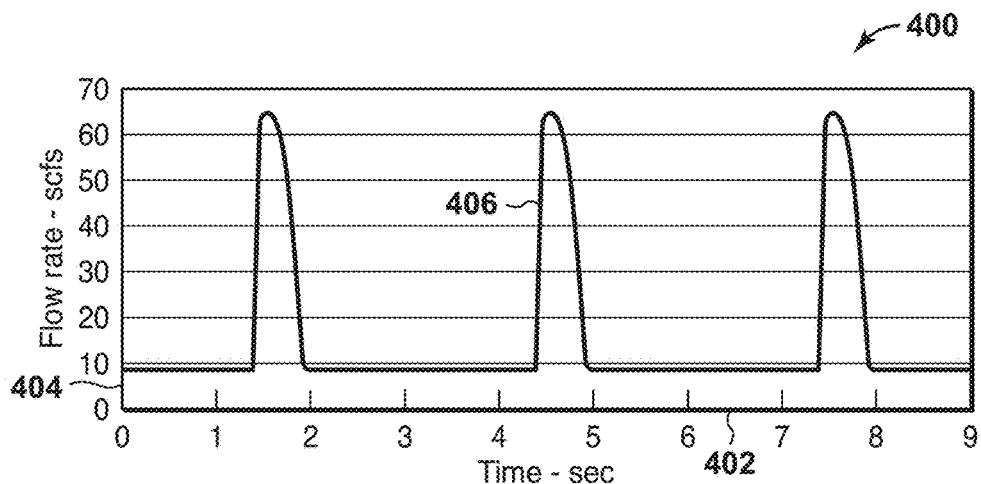
FIGS. 4A to 4C are graphs of flow rate versus time during a cycle of the RCPSA process.
Figure 4B:
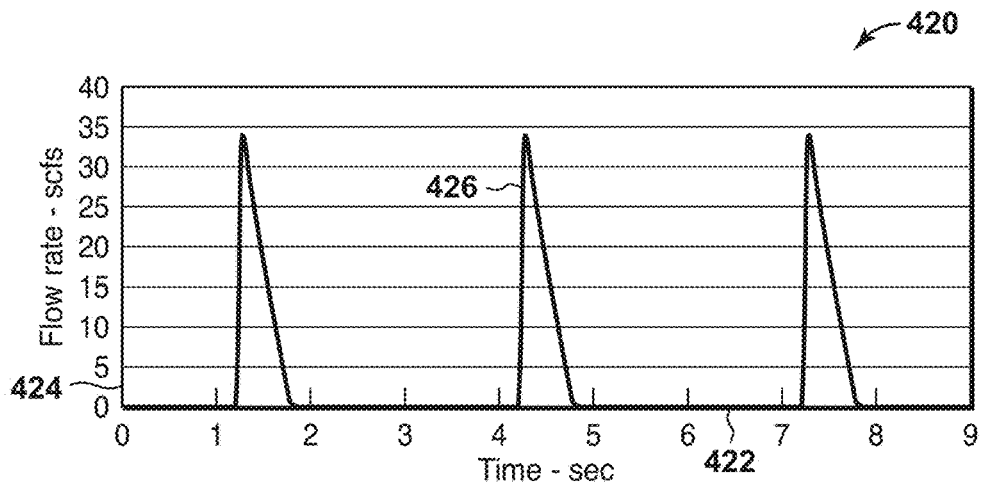
Figure 4C:
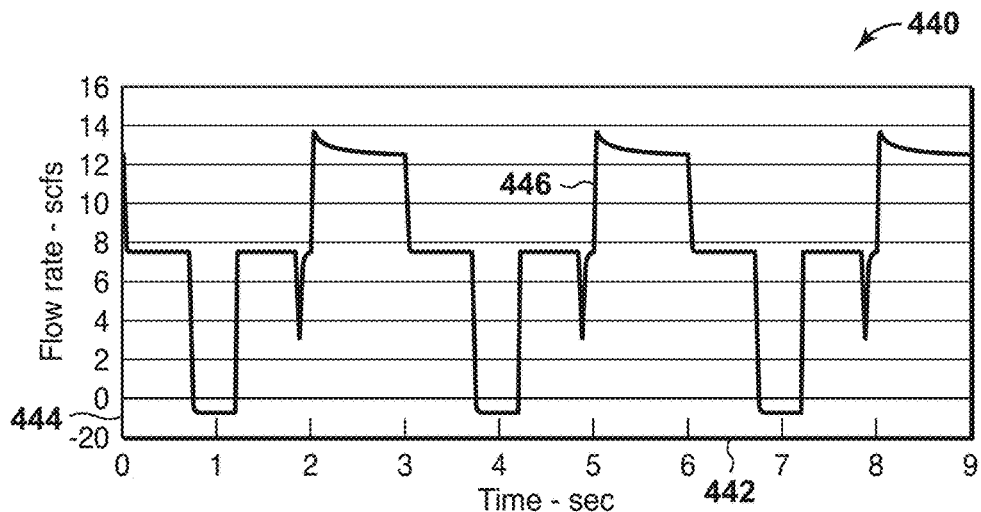

FIGS. 4A to 4C are graphs 400, 420 and 440 of flow rate versus time during a complete cycle of the RCPSA process in accordance with an application of the present techniques. The graphs 400, 420 and 440 illustrate the fluctuation or pulsation of the flow rate in standard cubic feet per second (scfs) in the headers based on constant pressure headers and the operation of an RCPSA process with three adsorption bed units coupled to the manifold, as noted above in FIGS. 2, 3A and 3B. For example, the graph 400 of FIG. 4A is feed flow rate 404 versus time 402 for a feed header. The response 406 is the flow rates predicted based the operation of an RCPSA process with three adsorption bed units coupled to the manifold (e.g., manifold 242). The graph 420 of FIG. 4B is the flow rate 424 versus time 422 for a depressurization header. The response 426 is the flow rates predicted based the operation of an RCPSA process with three adsorption bed units coupled to the header (e.g., manifold 258). The graph 440 of FIG. 4C is product flow rate 444 versus time 442 for a product header. The response 446 is the flow rates predicted based the operation of an RCPSA process with three adsorption bed units coupled to the manifold (e.g., manifold 254). As shown in each of these responses 406, 426 and 446, the different peaks are associated with the valve openings for the different adsorption bed units. For example, the fluctuations in the feed header are from less than 10 scfs to more than 60 scfs, which occurs three times per 9 second per cycle. The pulsation can also cause unwanted mechanical vibrations.

In addition to pulsation from the various flow rates, the lift times of the poppet valve assemblies may also contribute to the pulsation. The lift times (e.g., the rate of valve opening) changes velocity of fluid flow within the adsorbent bed, and these changes impact the bed performance and durability. For example, valve lift times that are fast may result in rapid changes in bed velocity. That is, the lift times for the poppet valve assemblies may cause pulsations that may impact adsorbent bed operations, and bed velocity impacts the mass flow curves. With the system involving various poppet valve assemblies, the pulsation resulting from the poppet valves should also be addressed.

The pulsation associated with the lift time for the poppet valves may vary depending on the specific system and process configuration. For example, the adsorbent bed unit 102 may include different poppet valves, such as poppet valve assembles 222 to 240, associated with different fluid streams. That is, the poppet valves may include different configurations, such as positioning, direction of operation and shape, which may be adjusted for the different fluid streams. For example, the poppet valve may include a poppet valve stem, or rod, extending to a location outside its head and connected to a disk element. The valve stem can be surrounded by a bushing and/or valve guide, which provides support for the valve, while allowing movement along a linear path to guide and, in some cases, seals the valve during operation. In some applications, a valve stem seal is associated with the valve stem, e.g., rod packing as is typically seen in reciprocating compressors. In some instances, a valve stem seal can be the same as a bushing or valve guide, although a separate valve seal is less susceptible to wear in use. The poppet valve disk element typically has a surface facing the proximal adsorbent bed surface. The surface of the disk element can be substantially round, for seating in a substantially round opening. This surface can also be flat or profiled. That is, the poppet valve disk element may have a surface that is profiled inward or outwardly relative to the opening on which it operates. The surface of the poppet valve may be substantially parallel to the proximal adsorbent bed surface.

In certain applications, each valve is associated with an externally accessible valve seat that fits within its respective inlet to the adsorbent body and/or outlet from the adsorbent body and is sealed to the head by any suitable sealing means, e.g., a gasket which is held in place by the flange attaching the valve assembly to its respective inlet. Alternatively, the valve assembly can be attached to its respective inlet via a rotatable locking mechanism, e.g. a turn-to-lock or bayonet mechanism. In other applications, the valve seat can be installed in the head separate from the valve assembly by use of threaded-in or pressed-in seats, or by the machining of the valve seat into the head itself.

In some applications, the poppet valve includes a valve stem engageable configured to open and close via linear motion. In some applications the valve may be moved by a camshaft, in at least one direction. An alternate return mechanism can be used, e.g., a spring, in certain applications, e.g., with a valve closing bias.

Depending on the adsorbent bed unit configuration, the poppet valve configuration may be adjusted to manage the direction the poppet valve opens for operation in the process. For example, certain poppet valves may open toward the adsorbent bed or opens away from the adsorbent bed. As an example, the poppet valve assemblies 222 to 240 of FIG. 2 may include a combination of forward acting poppet valves and reverse acting poppet valves. In particular, poppet valve assemblies 226 and 240 may be forward acting poppet valves, while poppet valve assemblies 222, 224, 228, 230, 232, 234, 236 and 238 may be reverse acting poppet valves.

Figure 5A:
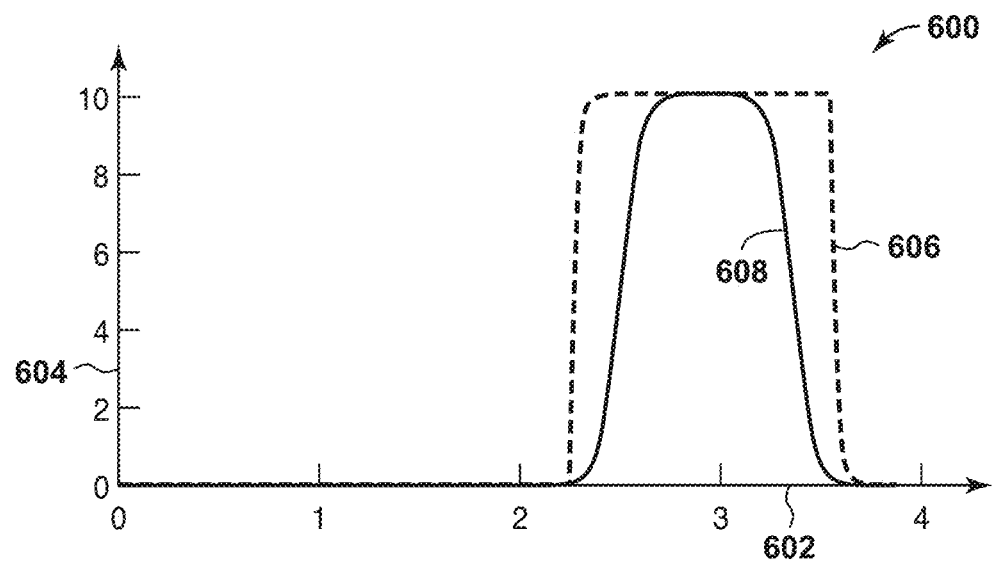
FIGS. 5A to 5B are graphs of lift, pressure and/or mass flow rate versus time during a cycle of the RCPSA process through a feed poppet valve.
Figure 5B:
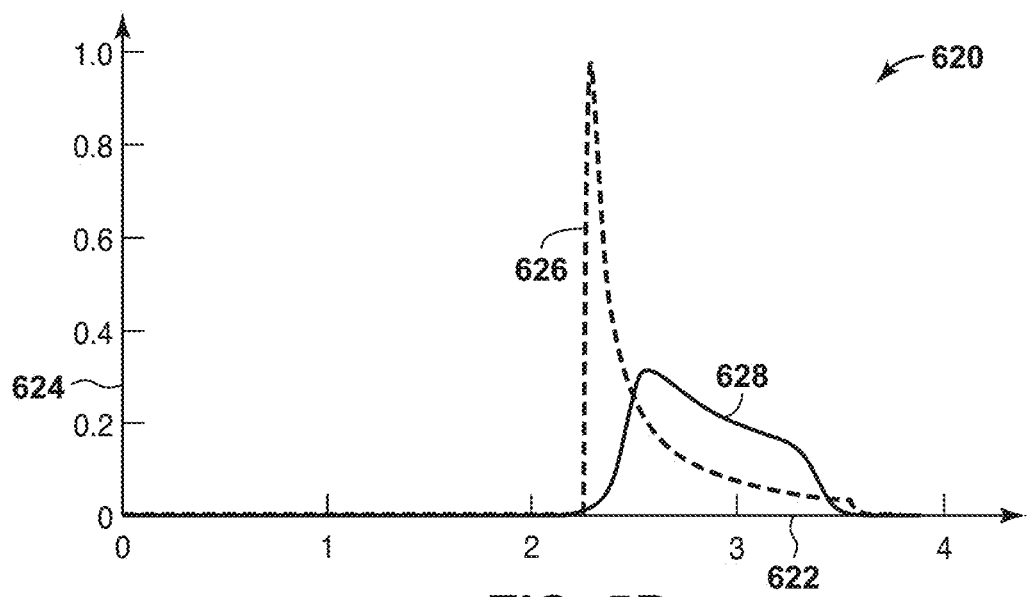

As an example, FIGS. 5A and 5B are graphs of lift and/or mass flow versus time during a cycle of the RCPSA process through one of the poppet valves in accordance with an application of the present techniques. For example, FIG. 5A is a graph 600 of the poppet valve lift 604 in millimeters (mm) versus time 602 in seconds during steps in the swing adsorption process. In this graph 600, the lifting motion of the poppet valve, which may be poppet valve assembly 222 of FIG. 2, is utilized to re-pressurize the adsorption bed (e.g., step 5 in FIG. 3A) and the feed flow through the adsorbent bed (e.g., step 6 in FIG. 3A). The response 606 is the arbitrary valve motion without a ramp, while the response 608 is the valve motion with opening speed (ramp) adjusted to moderate the instantaneous flow rate. In this graph 600, the response 606 (dashed line) shows two times with the poppet valve at a constant lift, which represents steps 5 and 6, respectively. The response 606 is the valve lift used to transfer the mass of gas for step 5. As noted in this graph 600, the response 606 involves sudden acceleration and decelerations, which is not typical for other systems, such as engine operations. As the step in the response 606 is difficult to achieve in a practical valve mechanism, the response 608 is the lift with a gradual ramp rate applied. As such, the response 608 (solid line) represents opening and closing ramps in a sigmoid form. That is, the response 608 is the opening and closing ramp velocities and accelerations.

Lessening the ramp rate may be preferred to manage the fluid flow. For example, the lift of the poppet valves may be dependent on time and poppet diameters. To calculate the ramps, equation (e1), incorporated by reference from U.S. Patent Publication No. 2016/0023155.

FIG. 5B is a graph 620 of the flow rate along the flow rate axis 624 in kilograms per second (kg/sec) versus time along the time axis 622 in seconds during steps in the swing adsorption process. In this graph 620, the mass flow responses 626 and 628 are associated with a poppet valve, which may be poppet valve assembly 222 of FIG. 2 and utilized in steps 5 and 6 in FIG. 3A. The mass flow response 626 (chain-dotted line) is the instantaneous flow rate without the ramp, which represents the mass flow given by the lift motion shown by response 606 in FIG. 5A. This mass flow shows a sharp pulse in the mass flow rate and is the instantaneous flow rate with the ramp. The mass flow response 628 (solid line) represents a revised mass flow determined by the lift motion shown by the response 608 in FIG. 5A. The peak magnitude of the revised mass flow in response 628 is less than half that of the response 626 (e.g., about 30% of the peak magnitude), which provides lessening of pulsation in the feed header. The poppet lift motion required to reduce the pulsation can be obtained by manipulating the ramp rate defined by parameter v0 the equation (e1), which is noted above.

Figure 6:
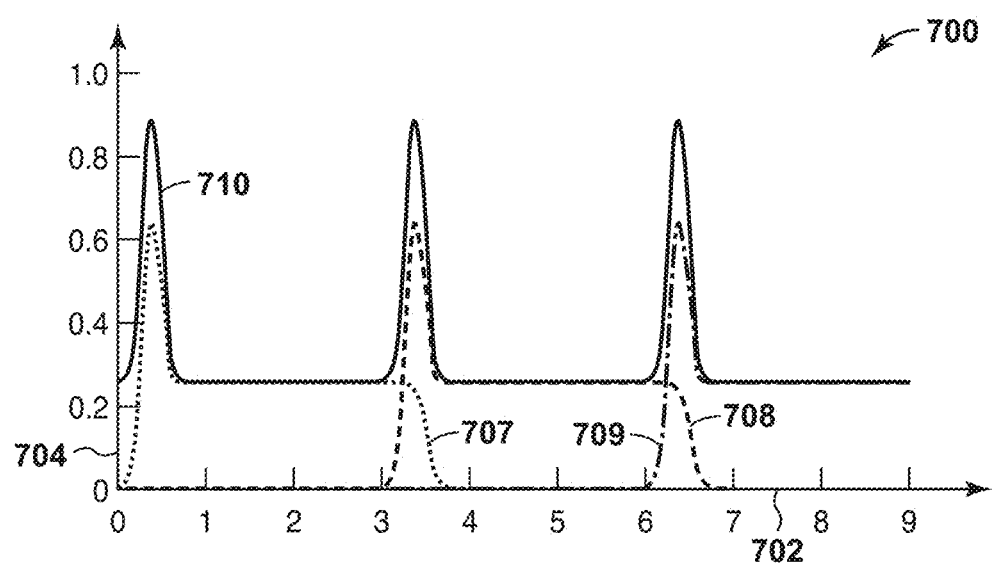
FIG. 6 is a graph of mass flow versus time during a cycle of the RCPSA process in a feed manifold.

Further, FIG. 6 is a graph mass flow versus time during a cycle of the RCPSA process in the feed manifold. In particular, FIG. 6 is a graph 700 of mass flow along a mass flow axis 704 in kilograms per second versus time along a time axis 702 in seconds during steps in the swing adsorption process. In this graph 700, the mass flow responses 707, 708, 709 and 710 are associated with a feed manifold, which may be the feed manifold 242 of FIG. 2. This graph 700 is utilized to represent the mass flow resulting from the separate opening and closing of three feed poppet valves into the three different adsorption units, such as the configuration described in FIG. 3B. The feed flows to the respective adsorption beds are represented by the responses 707 (first valve), 708 (second valve), 709 (third valve), which are the respective dashed lines. The sum of these feed flows is represented by the response 710 (solid line), which is the feed flow in the feed manifold 242 of FIG. 2. If the pressure in the feed manifold is held constant, then the same mass flow has to enter the feed manifold for each instant in time. That is, the instantaneous mass flow rate entering the manifold has to equal the sum of the instantaneous mass flows leaving the feed valves. Because two of the three poppet valves overlap in time (e.g., time between 6 and 7 seconds), the in-rush flow of an opening valve interferes with the steady flow in the adsorption bed, through the open feed valve of that adsorption bed. Steady flow is utilized to optimize the adsorption process, which is referred to as the rush flow problem. To reduce the pulsation in the feed manifold, the techniques utilized include a pulse flow control mechanism, such as the pulse flow controller (PFC) or separate feed headers. The PFC is the controller with an algorithm (e.g., feed forward algorithm) which drives the PCV. Using the sub-sonic compressible-flow equation (e2), incorporated by reference from the '155 Publication, the flow area to produce the required instantaneous mass flow at each instant in time can be calculated.

The '155 Publication provides more detailed descriptions of techniques for mitigating or moderating pulsations generated in the system as a result of flow disturbances, particularly those occurring at transition events and dependent directional valves governing flow of a gaseous streams into or through the adsorbent beds during these events. Reference is made to this previous disclosure for the specifics of the PFCs and other means for reducing the resulting pulsations. It is noted again that the systems, methods, and techniques of the present disclosure may be utilized in conjunction with those means and are applicable to addressing much of the flow and mechanical issues described therein, with or without the means proffered in that disclosure. The present systems, methods, and techniques may also be used in or integrated with the exemplary swing adsorption systems and processes described therein, again with or without the PFC and other means for reducing pulsations in the system.

In one or more applications, the swing adsorption process using the poppet valve assembly is rapidly cycled, in which case the processes are referred to as rapid cycle pressure swing adsorption (RCPSA), rapid cycle temperature swing adsorption (RCTSA), and rapid cycle partial pressure swing or displacement purge adsorption (RCPPSA). For RCPSA the total cycle times are typically less than 90 seconds, preferably less than 60 seconds, preferably less than 30 seconds, preferably less than 20 seconds, more preferably less than 15 seconds, and even more preferably less than 10 seconds. For RCTSA the total cycle times are typically less than 600 seconds, preferably less than 200 seconds, more preferably less than 100 seconds, and even more preferably less than 60 seconds. Conventional PSA cycle times are typically in excess of 2 to 4 minutes.

Valve Dynamics

Certain aspects of the present disclosure include methods, apparatus, and systems for modulating fluid flow (collectively "techniques") so as to mitigate (e.g., reduce or prevent) flow disturbances, including moderating or preventing pulsations and mechanical vibrations. These techniques specifically address directional valve installations governing fluid flow into the adsorbent bed and their operation (i.e., "valve dynamics") in swing adsorption process to address the source of origin of these disturbances. Notably, Applicants have discovered that when flow disturbances resulting from adsorbent bed switching in RCPSA processes, for example, are sufficiently addressed, such as by pulsation control techniques disclosed in the '155 Publication, flow disturbances in the system remain and are caused, at least partially, if not predominately, by valve dynamics within the system. Specifically, the transition of a vessel into the RP step or BD step requires opening of one of the bed's directional valve so as to allow for a large increase of fluid flow across the valve, thereby causing flow disturbances in a swing absorption system with or without a common header or manifold, and, still to some extent, even with or without the PFC devices disclosed in the '155 Publication. In certain aspects, the flow disturbances caused by rapid flow during transitioning steps is mitigated through direct implementation (i.e., at the source) of rapid flow modulation techniques including the following: transitional flow modulation techniques, including step lifting the opening of the valves; transitional flow modulation techniques, including step lifting the opening of the valves including the use of valve installations characterized by a discrete, initial lift range; transitional flow modulation techniques, including the use of valve installations characterized by a discrete, initial lift range correlating with a constant restricted flow area; the use of flow restriction aids, such as a plug, shroud (counterbores, annular restrictions), and serrations; or combinations thereof. In certain aspects, the flow disturbances, such as pulsations, can be maintained within the tolerance criteria of API 618, as set forth by the American Petroleum Institute (API).

The apparatuses, systems and methods disclosed herein are particularly suited for use in or with swing adsorption systems and processes that involve two or more adsorption bed units (vessels) configured for continuous flow operation and each for continuous adsorption process cycling. The apparatuses, systems, and methods are particularly suited for swing adsorption systems and processes including pressure swing adsorption and temperature swing adsorption systems and processes, and, further, to RCPSA systems and processes. Thus, the apparatuses, systems and methods disclosed herein may be used in a PSA system and process that is the same or similar as those described in respect to the systems and processes depicted in FIGS. 1-3B of the '155 Publication. To facilitate illustration of various aspects, the present disclosure will describe applications in or to exemplary PSA systems and processes. Such illustration shall not, however, be construed in a manner which limits the applicability or suitability of the concepts, apparatuses, systems, and methods to the described PSA systems and processes.

Flow Disturbance

During transitions of one of the vessels within a swing adsorption system from a relatively higher-pressure stage to a relatively lower-pressure stage, pressure differentials across that vessel may result in flow disturbances within that vessel, as well flow disturbances within other vessels, piping, manifolds, and headers fluidly coupled with that vessel. For example, in rapid cycle pressure swing adsorption (RCPSA) processes and rapid cycle partial pressure swing adsorption (RCPPSA) processes, valves that regulate flow into and out of the adsorbent bed vessels are selectively opened and closed to control which stage an adsorbent bed vessel is operating within.

One instance where such flow disturbances may occur is when transitioning a vessel from the adsorption stage to the blowdown stage (i.e., the depressurization and purge stage), where a pressure differential is exhibited across the vessel or associated valves undergoing transition. In this example, the pressure differential is exhibited across the vessel or associated valves because the adsorption stage is at a relatively high-pressure and the blowdown stage at a relatively lower, vent pressure. Another instance where such flow disturbances may occur is illustrated by FIGS. 1A and 1B. In FIG. 1A, vessel 113a is operating in the adsorption stage, while vessel 113b is operating in a post-blowdown or purge stage. Inlet valve 133d is closed and the common inlet header or manifold, 135a, is at system pressure, P0. All of the system feed flow, Ft, is, therefore, directed into vessel 113a The pressure, P2, in vessel 113b, after blowdown and after venting is significantly lower than that of the system pressure, P0 (e.g., 60-70 bar versus 20-30 bar). In FIG. 1B, vessel 113b is transitioning from the stage shown in FIG. 1A into re-pressurization stage upon opening of the inlet valve 133d and redirecting a portion of the feed stream into vessel 113b. With such a large pressure differential across the inlet valve 133d and vessel 113b, the feed stream is caused to flow into vessel 113b at relatively high velocities and high flow rates, even if only for a short time, upon opening of the inlet valve 133d Applicants have found that when the ratio between the low and high-pressure stages (i.e., differential pressure across the valve) is sufficiently low, such as 0.53 or less, the feed gas velocities entering (or exiting) the vessel may approach or exceed the speed of sound, which is typically undesirable.

The sudden or rapid flow rate into vessel 113b at transition, and the redirection of a portion of the feed stream to vessel 113b, causes a flow disruption in the system and in vessel 113a; thereby, interrupting the adsorption process in vessel 113a. The flow rate into the vessel 113b may, at least briefly, be larger, even substantially larger, than the otherwise steady state flow rate of feed through the system. This increase in the flow rate can vary depending on, for example, the pressure ratio between the stages involved in the transition (e.g., the pressure ratio between the BD stage and the RP stage during transition from the BD to the RP stage) and depending on the speed at which the valve flow area is opened. As used herein, the "valve flow area" refers to the area across a valve or valve installation that is available for fluid flow.

Two Bed PSA Systems and Processes

Figure 7:
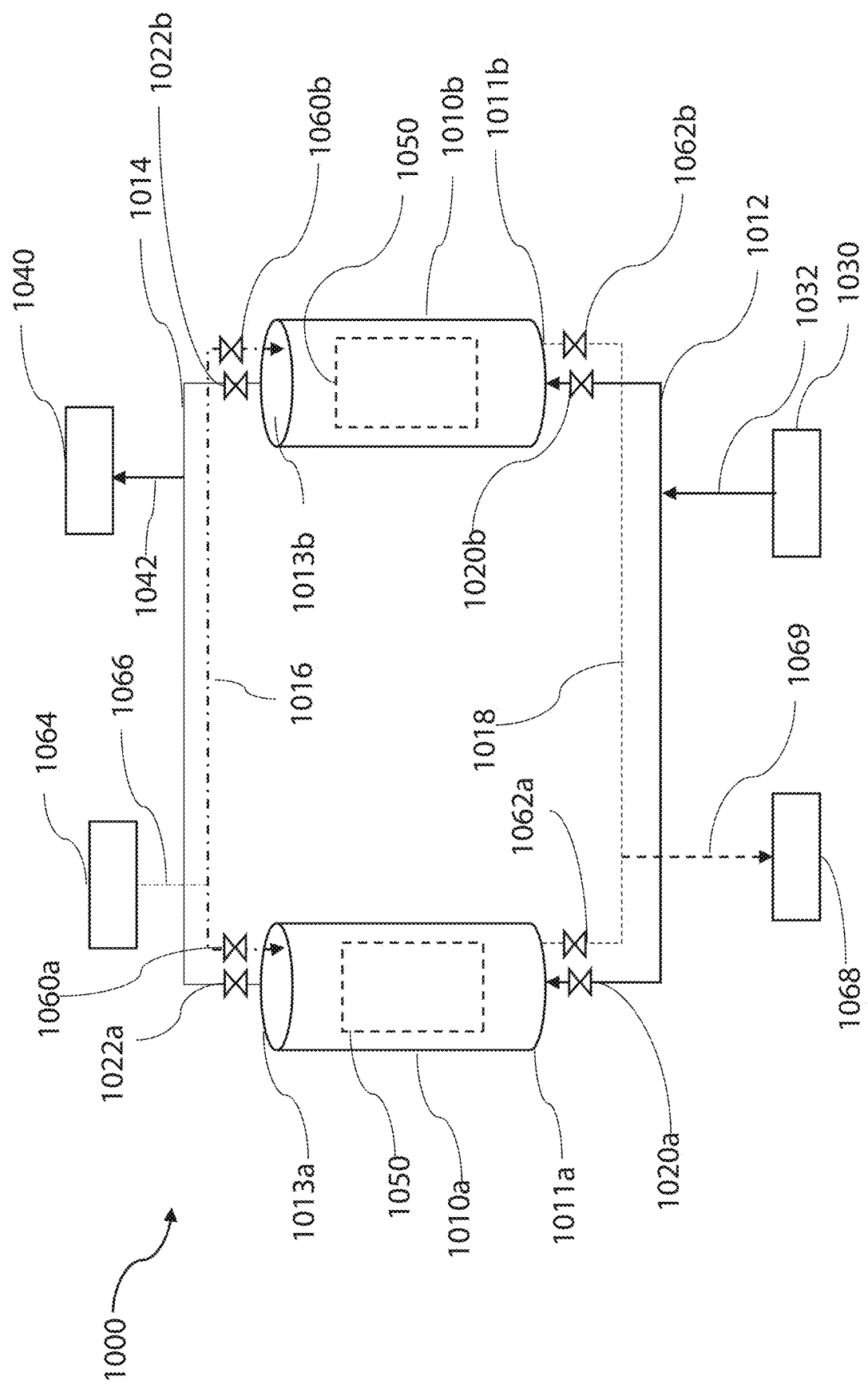
FIG. 7 is a schematic of a two-bed swing adsorption system.

The simplified schematic of FIG. 7 represents a two-bed pressure swing adsorption system 1000 with which the systems, apparatuses, methods, and techniques of the present disclosure may be incorporated, embodied, or implemented. System 1000 includes two adsorbent vessels 1010a and 1010b (also referred to as adsorbent beds or units). Vessels 1010a and 1010b are in fluid communication via a system of piping, including feed manifold 1012, product manifold 1014, purge feed manifold 1016, and purge vent manifold 1018. One skilled in the art would understand that the pressure swing adsorption systems disclosed herein are not limited to the particular arrangements of vessels, piping, manifolds, valves, inlets, and outlets as is shown in FIG. 1A, 1B, 1C, 7, 14A-14C or 22, and that other arrangements of vessels, piping, manifolds, inlets, outlets, valves, and other components of the system are possible without departing from the scope of this disclosure. For example, while system 1000 is shown as including two vessels, 1010a and 1010b, the systems disclosed herein may incorporate an additional number of vessels, such as three or more vessels manifolded together or otherwise arranged in fluid communication with one another.

System 1000 is equipped with an arrangement of directional valve installations (also referred to herein as valves) controlling fluid flow through vessels 1010a and 1010b. System 1000 includes feed inlet valves 1020a and 1020b in direct fluid communication with feed source 1030 (e.g. a pipeline, storage tank) and in selective fluid communication with vessels 1010a and 1010b, respectively. In operation, feed inlet valves 1020a and 1020b may be opened to pass feed 1032 from feed source 1030 and feed manifold 1012, into vessels 1010a and 1010b, respectively. Feed 1032 may be any of a variety of gaseous feed streams including, but not limited to, natural gas. Feed inlet valves 1020a and 1020b may be closed to prevent feed 1032 from passing from feed source 1030, through feed manifold 1012, and into vessels 1010a and 1010b, respectively.

System 1000 includes product outlet valve installations 1022a and 1022b (also referred to herein as valves) in direct fluid communication with product recovery 1040 and in selective fluid communication with vessels 1010a and 1010b, respectively. In operation, product outlet valves 1022a and 1022b may be opened to allow product 1042 to pass from vessels 1010a and 1010b, through product manifold 1014, and to product recovery 1040, respectively. Product recovery 1040 may be any of a variety of locations or applications. For example, product recovery 1040 may be a storage vessel or facility or piping. In some applications, rather than being stored, product 1042 is transported or directly input into another process. Product outlet valves 1022a and 1022b may be closed to prevent product 1042 from passing from vessels 1010a and 1010b, through product manifold 1014, and to product recovery 1040, respectively.

As would be understood by one skilled in the art, vessels 1010a and 1010b contain adsorbent material 1050. When operating in the adsorption stage, gaseous feed 1032 passes through vessels 1010a and 1010b and in contact with adsorbent material 1050. Upon contact with adsorbent material 1050, components within gaseous feed 1032 are adsorbed via adsorbent material 1050. The removal of such components from gaseous feed 1032 via contact with adsorbent material 1050 results in the formation of product 1042.

Intermittently, adsorbent material 1050 must be replaced or regenerated such that the respective vessel may be further used in adsorption processes. In some aspects, to regenerate adsorbent material 1050, the input of feed 1032 to the respective vessel is ceased, and input of a purge feed into the vessel is initiated. Contact with the purge feed results in the removal of components adsorbed via adsorbent material 1050 into the purge feed. As such, the capacity of adsorbent material 1050 to further adsorb additional components from gaseous feed streams is regenerated. System 1000 includes purge feed inlet valve installations 1060a and 1060b (valves) in direct fluid communication with purge feed source 1064 and in selective fluid communication with vessels 1010a and 1010b, respectively. In operation, purge feed inlet valves 1060a and 1060b may be opened to allow purge feed 1066 to pass from purge feed source 1064, through purge feed manifold 1016, and into vessels 1010a and 1010b, respectively. Purge feed 1066 may be any of a variety of gaseous feed streams. For example, in some aspects purge feed 1066 is composed of product stream 1042. For example, a portion of product 1042 may be diverted into the vessel undergoing purging. Purge feed inlet valves 1060a and 1060b may be closed to prevent purge feed 1066 from passing from purge feed source 1064, through purge feed manifold 1016, and into vessels 1010a and 1010b, respectively.

System 1000 includes purge vent outlet valve installations (valves) 1062a and 1062b in direct fluid communication with purge vent 1068 and in selective fluid communication with vessels 1010a and 1010b, respectively. In operation, purge vent outlet valves 1062a and 1062b may be opened to allow purge vent stream 1069 to pass from vessels 1010a and 1010b, through purge vent manifold 1018, and to purge vent 1068, respectively. Purge vent 1068 may be any of a variety of locations or applications. For example, purge vent 1068 may be a storage vessel or facility or piping. In some applications, rather than being stored, purge vent steam 1069 is transported, directly input into another process, disposed of, or recycled back through system 1000. Purge vent outlet valves 1062a and 1062b may be closed to prevent purge vent stream 1069 from passing from vessels 1010a and 1010b, through purge vent manifold 1018, and to purge vent 1068, respectively.

As such, system 1000 is operable as a closed fluid system, including inlets that selectively direct gaseous feed stream 1032 and purge feed 1066 to one or both vessels 1010a and 1010b, and outlets for selectively outputting product 1042 and purge vent 1069 after passing through one or both vessels 1010a and 1010b.

In FIG. 7, vessels 1010a and 1010b are arranged in a parallel configuration, with each vessel 1010a and 1010b having a first end 1011a and 1011b, respectively, and a second end 1013a and 1013b, respectively. The valves (1020, 1022, 1060, 1062) at each end of vessels 1010a and 1010b, and the manifolds or headers (1012, 1014, 1016, and 1018) common to both, allow vessels 1010a and 1010b to selectively fluidically communicate with each other and to selectively connect to high-pressure sources (feed source 1030) and low-pressure sources (purge source 1064). Thus, the piping system (i.e., manifolds or headers, and associated piping and valves) allows for management of the fluid flow into, out of, and between the vessels 1010a and 1010b.

In some aspects, the pressure swing adsorption (PSA) process includes coordinated cycling of vessels 1010a and 1010b between different stages of the PSA process. For example, the PSA process may include, generally, the following stages through which vessels 1010a and 1010b cycle: (1) a re-pressurization stage, where the vessel is pressurized from a vent pressure to a adsorption pressure (also referred to as production pressure) via input of feed; (2) an adsorption stage (also referred to a production stage), where feed is directed through the vessel for production of a product stream via adsorption of component(s) of the feed; and (3) a depressurization and purge stage (blowdown stage), where the vessel pressure is reduced from the adsorption pressure to the vent pressure and the adsorbent material is regenerated. Vessels are continuously or continually cycled through stage (1), followed by stage (2), followed by stage (3), followed by stage (1), and so forth. Typically, the adsorption pressure is the highest pressure in the cycle, and the vent pressure is the lowest cycle in the process. One skilled in the art would understand that the processes disclosed herein are not limited to this particular sequence of stages, which is discussed for exemplary purposes.

Vessels 1010a and 1010b are manifolded (e.g., 1012, 1014, 1016, and 1018) together and the operational stages (e.g., re-pressurization stage, adsorption stage, blowdown stage) for vessels 1010a and 1010b are staggered and overlaid to provide continuous flow of product 1042 from system 1000. That is, at least one of vessels 1010a and 1010b are operating within the adsorption stage at all times during normal operation of system 1000.

In operation of system 1000, during the overlap of the re-pressurization (RP) stage or the blowdown (BD) stage of vessel 1010a, the sudden flow of gas into or out of vessel 1010a can cause a variety of flow and mechanical disturbances within vessel 1010b, and any fluidically coupled piping, such as manifolds 1012, 1014, 1016, and/or 1018. If vessel 1010b is operating m the adsorption stage during such flow disturbances, the flow disturbances can interrupt the otherwise steady state flow through vessel 1010b during adsorption. Such flow interruptions can interfere with the adsorption process, which can result in a less efficient process and a product stream 1042 of lower purity and/or quality. Furthermore, such flow disturbances can case vibrations through the mechanically coupled and fluidically coupled portions of the system, such as vibrations in the piping, manifolds (e.g., 1012, 1014, 1016, and/or 1018), and valves (e.g., 1020, 1022, 1060, and 1062), disturbing internal components within the vessel (e.g., the adsorbent material 1050) and mal-distributing the flow of feed therethrough.

Applicants have proposed techniques that entail controlling the flow area available across the valves directing gas flow in such stage transitions (e.g., valves 1020, 1022, 1060, and 1062). In doing so, the pressure differential across the valve is maintained relatively high initially; thereby, modulating fluid flow to avoid sudden rapid flow increase. More particularly, Applicants propose implementing a "step lift"

of the valve at initiation of flow increase, rather than a sudden or steady opening of the flow area. Step lifting the valve, according to the present disclosure, ensures that the flow area across that valve is maintained at a sufficient minimum. As used herein, a "step lift" of a valve is a discrete movement of the valve stem or disk from its seat (0% lift) (or other sealing element), the terminus of which corresponds with a specific flow area across the valve that is less than that corresponding with the valve when fully open (which could be 100% lift) but is greater than that corresponding with the valve when fully closed (which could be 0% lift). In the context of opening the inlet valve during the transition stage, this means, at least, that the valve is first opened to provide a less than fully open flow area (i.e., the step lift), before being opened further to provide a more open flow area. In accordance with the present disclosure, the valve may be held at the step lift for a specified time; thereby, maintaining the flow area at a less than fully open condition.

Flow Restriction Aid—Plug

With reference to FIGS. 8A and 8B, flow modulation utilizing a reverse acting poppet valve installation having a restricted flow area will be described. FIG. 8A depicts poppet valve 1800, which includes valve body 1810 and valve stem 1812 or shaft. Reverse-acting poppet valve 1800 may be installed in a pipeline or housing (e.g., of the absorbent bed vessel) that defines fluid bore 1830 extending therethrough. Opening orifice 1832 (also referred to as hole) defines the upstream end of valve 1800 and is integrated with the bore 1830. The circular disk element of valve formed at the end of stem 1812 presents a valve face 1814 (having a circular area), which, in the case of the conventional poppet valve is movable in a direction parallel to the bore and engageable with a seat defined about the inside of the housing or piping to seal the bore and shut off fluid flow therethrough. As a reverse-acting poppet valve feeding into the vessel, the valve stem is moved toward the seat (e.g., downstream) to engage the seat and moved away from the seat (e.g., upstream) to reveal or open the flow orifice 1832.

Valve body 1810 includes chamber 1817 defined by chamber wall 1816, which has a greater diameter than the remainder of bore 1832. Valve stem 1812 is supported within bore 1830 and is movable there-along. In operation, the portion of valve body 1810 (or housing or piping external of the valve) that defines orifice 1832 and meets with valve face 1814 is valve seat 1820. To close poppet valve 1800, valve shaft 1812 guides valve face 1814 by sliding through a valve guide and in and along bore 1830 to engage the valve face 1814 with or onto seat 1820, thereby closing hole or orifice 1832. When orifice 1832 is closed, fluid flow through hole 1832, valve 1800, and bore 1830 is prevented.

Valve face 1814 and includes tapered portion 1818 that tapers from the diameter of valve stem 1812 to the diameter of valve face 1814, valve face diameter 1813. In operation, valve stem 1812 and valve face 1814 form the moving, dynamic portion of poppet valve 1800, and valve body 1810 forms the non-moving, static portion of poppet valve 1800. Poppet valve 1800 opens along direction 1803 and closes along direction 1802. Poppet valve 1800 may be used as any of the valves at the inlet and outlet of the vessels disclosed herein. While shown and described as poppet valves, one skilled in the art would understand that the present disclosure is not limited to use with poppet valves, and the concepts of flow modulation disclosed herein may be applied to other types of valves and flow regulators.

Plug 1899, which has a plug height 1860, is coupled with or integral with valve face 1814, and thus forms a portion of the dynamic portion of valve 1800. In some aspects, plug 1899 is an extension of valve face 1814 and is made of the same material as valve face 1814. In other aspects, plug 1899 is a separate component that is attached to valve face 1814 and is made of the same or a different material than valve face 1814.

When valve 1800 is fully opened and/or when plug 1899 is lifted sufficiently away from hole 1832 and seat 1820 such that plug 1899 does not significantly alter or affect flow through hole 1832 and bore 1830, the flow area is defined as 100% open. The flow area is defined as being at 100% at a poppet lift of 100% or 100% of the total lift of the disc (i.e., the valve face and tapered portion 1818). That is, when the disk (valve face 1814 and tapered portion 1818) and valve shaft 1812 are lifted to full height, away from seat 1820 (i.e., the position of dynamic portions of valve 1800 that is furthest from the seat 1820), the lift is defined as 100% lift, which coincides with hole or orifice 1832 being 100% open. Any flow area through valve that is less than the flow area provided when hole or orifice 1832 is 100% open or which coincides with a lift of less than 100% is defined as restricted flow area (also referred to as a restricted area).

FIG. 8C depicts a poppet valve installation 8000 without a plug. As shown in FIG. 8C, the clearance or gap 8010 between the disk 8012 and the seat 8014, when the disk 8012 is lifted off the seat 8014, directly correlates with the available flow area through the valve 8000 and through the connected piping or housing. As the stem 8016 is moved (i e, lifted) further away from the seat 8014, the available flow area increases; thereby, reducing the pressure loss across the valve 8000 and, during, service, generally causing an increase in fluid flow through the piping or housing connected therewith.

The available flow area provided by lifting of the valve may vary depending on the shape of disk 8012 and seat 8014. For some shapes and configurations of valve installations, the available flow area may be defined by the circumferential area residing between the disk 8012 and seat 8014 when the gap 8010 is formed (e.g., a linear function twice the radius(radii) and clearance/gap)). That is the flow area increases generally linearly but steeply as the lift increases, as illustrated in FIG. 13. Thus, in applying the step lift technique of the present disclosure, it sometimes become necessary to apply a step lift near the very start of the valve opening, where the terminus of the lift still corresponds to a relatively small or still controllable available flow area. In this way, the flow rate corresponding to the step lift, which relates to the degree of fluid bore opening, is desirably small and controllable.

While shown and described as poppet valves, one skilled in the art would understand that the present disclosure is not limited to use with poppet valves, and the concepts of flow modulation disclosed herein may be applied to other types of valves and flow regulators.

Step Lifting with a Plug

As illustrated by FIG. 8C, the flow area response (and thus, the flow rate modulating response) of the poppet valve features a relatively narrow "lift (range) window" in which the flow area, and corresponding target flow rate, rapidly increase from a relatively small and manageable flow rate to larger and undesirable flow rate. For this reason, the step lift is configured to define a narrow lift or range and is applied upon initiation of the transition event and required valve opening.

FIG. 13 graphically illustrates the relationship between the flow area and percent lift of the valve for both conventional valve (shown in dashed line), such as valve 8000 of FIG. 8C, and a valve including a plug (shown in solid line), such as valve 1800 of FIGS. 8A and 8B. The slope of the flow area response curve and the corresponding flow rate or flow rate change are governed, at least partly, by the magnitude of the pressure differential across the valve and geometry and shape of the valve disk-seat interface (the valve installation). In one aspect, the present disclosure provides a valve installation characterized by flow area vs. percent lift that is more manageable than that of the conventional valve. In a further aspect, the present disclosure provides a response curve (and flow area and flow rate response) that is less sensitive to the % lift of the valve near the initiation of the valve opening. More preferably, the valve installation is characterized by a response curve featuring a constant or reduced slope flow area section (from point B to point C, as shown in FIG. 13) for a given discrete % lift range, and, most preferably, presents this reduced slope flow area section to correspond to the % lift range near the initiation of valve opening. Further yet, the present disclosure provides for a flow modulation technique including using a step lift, where the step lift or the terminus of the step lift coincides with the constant flow area response section (from point B to point C).

As is evident from FIG. 13, restricting the flow area using the step lift and flow restriction aid (also referred to as a flow restrictor) dampens flow area available to a gaseous feed for the time frame within which the step lift and flow restriction aid provide a flow area through the valve that is less than the flow area than would be provided by the valve if fully opened (i.e. from point B to point C). Both valves start, at point A, with a valve flow area of 0% and a valve lift of 0% (i.e., the valves are closed). The valve having the plug (solid line) is step lifted to a 5% valve lift, having a restricted valve flow area (as shown in FIGS. 8A and 8B), at point B, that is restrained to an amount that is greater than 0%, but less than 100% flow area, as defined by the valve flow area provided by the step lift and flow restriction aid (plug 1899). The valve flow area may increase, e.g., between point A and point B, until the valve 1800 is lifted sufficiently high such that restricted flow area 1870 is larger than gap 1831. The valve flow area defined by the restricted flow area 1870 is maintained through the step lift, until point C, where the valve is fully opened to provide a valve flow area of 100%, at point D. While the valve flow area is shown as being maintained constant from point B to point C, the valve flow area may vary (e.g., increase) during this step lifted stage, so long as the valve flow area is reduced relative to what it would be in the absence of a flow restriction aid. The second valve (dashed line) is not step lifted, thus, the valve flow area from point A to point B rises is on the same or similar curve as for the first valve (solid line) but continues to rapidly rise to 100% flow area at point D. As such, the use of a step lift and a flow restriction aid (plug) provides a discrete lift range (here shown as ranging between 5 and 25% lift) where the flow area does not increase as the valve is lifted, or at least does not increase as much as in the absence of the flow restriction aid. This modulating of the opening of the flow area of the valve correspondingly modulates the flow through the valve, which, in-turn, modulates the flow disturbances caused by such flow through the valve (into or out of an associated vessel).

The reduced available flow area through the valve provided by the flow modulation techniques disclosed herein is also referred to as a minimum restricted flow area, minimum flow restriction area, or flow restricted area. In describing the available flow area associated with a valve installation, it is contemplated that the flow restricted area may be defined by: the clearance between the movable disk or face of the valve and the seat of the valve, or other such minimum clearances between the dynamic and static portions of the valve installation at different points in the valve lift range. For example, the minimal clearance may, during a period of valve lift, shift from being defined by the relative distance between the seat and the disk to being defined by the relative distance between the disk and another physical, non-seat feature about the internal walls of the bore, valve body, or housing of the absorbent bed vessel.

Thus, in one aspect of the present disclosure, a valve installation is equipped with a physical valve interface with a minimum clearance and minimum flow area that is not, or at least not entirely, dependent on the clearance between the seat and the valve face portion that engages the seat at the closed position. Noting that the seating interface or flow area (between the seat and the valve face portion that engages the seat) must increase linearly with linear valve moment in the bore and valve body (e.g., dashed line in FIG. 13), the present valve installation (e.g., FIGS. 8A and 8B) provides a physical feature (e.g., plug 1899) that defines the restricted flow area provided by the valve, at least at certain, discrete sections of valve lift; thereby, modulating the linearity of the increase in flow area with valve lift. In the exemplary valve installation 1800 shown in FIGS. 8A and 8B, the restricted flow area is defined by the seat 1820 or valve body 1810 and plug 1899 on the dynamic portion of the valve 1800. In some aspects, the plug is a rod-shaped, longitudinally extending extension to the disk element of the valve, extending from the disk and valve face 1814 toward the direction of the seat 1820. As shown in FIGS. 8A and 8B, the diameter of the plug 1899 is less than that of the disk element which creates gap 1831 between the outside circumferential area or face of the plug 1899 and the internal walls of the plug body 1810.

At the seated position of the valve 1800 (not shown), the plug 1899 extends forwardly past the seat 1820. At the seated position and forward of the seated position, the plug 1899 does not define the minimum clearance of the flow-restricted area. With reference to FIGS. 8A, 8B, and 13, when valve 1800 is closed (not shown), the valve is at a 0% lift position, with valve face 1814 engaged with seat 1820, and the available flow area is shut off (i.e., at 0%). As the valve disk is lifted off the seat 1820, gap 1831 (clearance) between valve face 1814 and valve threshold 1811 or seat 1820 is formed. The clearance defined by gap 1831 is narrower than the spacing of the restricted flow area 1870 between the plug 1899 and the valve body 1810. Thus, gap 1831 defines the available flow area or restricted flow area for an initial period of the valve lift (from point A to point B) and continues to define the restricted flow area until the disk is lifted through the lift range indicated between points B and C, while the gap 1831 is less than or equal to the spacing defined by the restricted flow area 1870. As the valve lift increases and the disk is moved further away from the seat, the spacing defined by the restricted flow area 1870 becomes less than that of gap 1831, such that the restricted flow area 1870 defines the available flow area through the valve. The spacing of the restricted flow area 1870 may be maintained constant for at least as long as the bottom of plug 1899 is at the same horizontal level as the seat 1820. The longer the plug extension, Pe, is, the longer the restricted flow area 1870 is maintained at a value that is less than gap 1831. The valve lift travel in which the restricted flow area 1870 is maintained is represented by the curve section from point B to point C, which provides a plateau corresponding to a discrete valve lift range. As would be understood by one skilled in the art, if the plug 1899 had a different shape, such as a tapered shape, the curve section from point B to point C may provide a slope rather than a plateau. At point C in the valve lift, the spacing between the plug 1899 and the valve body 1810 (i.e., the seat 1820) starts to exceed the restricted flow area 1870. The minimum clearance and restricted flow again increases at a steep rate with further valve lift as shown by the curve section after point C.

In some aspects, the plug length or height is around 25% of the full lift of the valve, or from 5% to 50%, or from 10% to 40%, or from 15% to 30% of the full lift of the valve. The plug length (also referred to as the plug extension, Pe) determines the length or the lift range corresponding to the constant flow area (section B-C in the curve).

In one RCPSA application, a step lift is employed in opening a conventional inlet poppet valve upon initiation of an absorbent bed vessel transition event (e.g., a re-pressurization with a gas feed stream). The poppet valve installation is equipped with a longitudinally extending plug having a certain diameter less than that of the disk, which determines the spacing between the plug and the valve seat and determines the % valve lift at which this spacing provides the minimum flow restriction. The plug is also designed with sufficient length to dictate the range of lift at which the plug spacing from the seat provides the minimum flow area. For example, the plug spacing may provide a restricted flow area between a 10% and 15% valve lift, such that that the valve installation is characterized by a constant flow area between a 10% to 15% valve lift.

For the differential pressure values expected at the inlet valve for a swing adsorption process and the associated feed flow rates, the desired flow restriction area may be determined for modulating flow rates to manageable levels. The plug design, including the clearance between the plug and the valve body, provides the desired flow restriction area. Thus, for example, movement of the poppet valve need only to affect a step lift to within a relatively wide valve lift range (e.g., 10%-15% valve lift range). The "valve lift range" refers to the range of degree (e.g., percent) of valve lift where the restricted flow area is provided by the flow restriction aid (e.g., plug) and step lift. Within the valve lift range, the desired restricted flow area across the valve is achieved and the inlet flow rates may be maintained at more manageable levels. In many applications, the rapid acting poppet valve in the RCPSA process will be held at the step lift position only momentarily before the valve is opened further (e.g., fully) to provide for increased flow into or out of the associated vessel.

It should be noted that the plug may shapes and configurations other than the ones depicted herein, as necessary to achieve the desired flow areas relative to % valve lift. For example, the longitudinal length of the plug may be extended to provide a wider valve lift range at the step lift position of the valve. Also, the width or diameter of the plug may be increased to provide a smaller restricted flow area at the step lifted position of the valve. Furthermore, the shape of the plug may be modified (e.g., with a non-uniform width or diameter) such that the flow area relative and % valve lift vs. time features a reduced or reverse slope response over discrete lift ranges.

Conventional Poppet Valve Installation with Plug

FIGS. 9A-9F provide illustrations of a conventional poppet valve and valve installation, which are equally suitable for use with the systems, methods, and techniques of the present disclosure. The valve and valve installation include the same elements or components as the reverse-acting poppet valve described and operates in much the same way, except for a few distinctions. Accordingly, for FIGS. 9A-9F, like elements are indicated using like reference numerals. As a conventional acting poppet valve, the disk is moved to engage the seat and to shut off the flow orifice. In this way, the poppet valve acts like a check valve and utilizes differential pressure to positively seal.

FIGS. 9A and 9B show poppet valve 1900 in a closed position, FIGS. 9C and 9D show poppet valve 1900 in a step lifted position, and FIGS. 9E and 9F show poppet valve 1900 in a fully open position. In the conventional poppet valve 1900, when flowing out of the vessel, the valve face 1914 is unseated from valve seat 1920 when valve 1900 is open and, to close, moves to engage seat 1920 and close the flow orifice. Flow restriction aid, plug 1999, is positioned between valve stem 1912 and valve face 1914 and may be coupled or integral therewith. Plug 1999 is movable to open and increase the flow area. Bore 1930 is of a larger diameter than hole 1932. In the closed position, valve face 1914 engages valve seat 1920 to prevent flow through valve 1900.

When moving valve 1900 to the open position during transition of a vessel into the blowdown or re-pressurization steps (i.e., a transition event), the valve may be step lifted, as shown in FIGS. 9C and 9D, before being fully lifted, as shown in FIGS. 9E and 9F. Thus, structural and operational features of poppet valve 1900 provide for restriction of the flow area upon opening of poppet valve 1900 for transition into the re-pressurization or blowdown stage (i.e., restricted flow area 1970). As with poppet valve 1800, the "flow area" is a function of the clearance between the dynamic portion of poppet valve 1900 (i.e., the valve face 1914 and/or plug 1999) and the static portion of poppet valve 1900 (i.e., the valve body 1910, in particular the seat 1920). Plug 1999 may be a tapered portion between stem 1912 and valve end 1915. For example, from end 1915, the dynamic portion of valve 1900 may taper, forming valve face 1914. After valve face 1914, moving toward stem 1912, dynamic portion of valve 1900 may further taper, forming plug 1999. After plug 1999, moving toward stem 1912, dynamic portion of valve 1900 may further taper, forming stem 1912.

When valve 1900 is closed (FIGS. 9A and 9B), valve face 1914 is engaged with seat 1920, such that flow is not allowed there-through, and the flow area is defined as 0% open. In FIGS. 9C and 9D, valve 1900 is step lifted, such that the clearance between plug 1999 and valve body 1910 (e.g., seat 1920) define restricted flow area 1970 through which flow is allowed. Restricted flow area 1970 is less than the flow area through valve 1900 when valve 1900 is fully opened. When valve 1900 is fully opened (FIGS. 9E and 9F) and/or when plug 1999 is moved sufficiently away from hole 1932 and seat 1920 that plug 1999 does not significantly alter or affect flow through hole 1932 and bore 1930, the flow area is defined as 100% open. Thus, plug 1999, in combination with the use of a step lift, provides for a modulated opening of valve 1900 which, in-turn, provides for modulating the flow through valve 1900 upon opening thereof.

Flow Restriction Aid—Counterbore

Referring to FIGS. 10A-10F, operation of a reverse acting poppet valve in accordance with certain aspects of the present disclosure will now be described. In FIGS. 10A-10F, rather than a plug, the geometry relative to the valve installations including a plug is inverted such that the restricted flow area 2070 is provided by a flow restriction aid in the form of recessed counterbore 2097 in the valve seat 2020, also referred to as a shroud, annulus, or annular restriction. Counterbore 2097 restricts the flow area around the periphery of the poppet valve disc. Valve 2000 is provided with a disc (valve face 2014 and tapered portion 2018) but is not equipped with a plug. The valve stem 2012 and the valve face 2015 are also shown. Counterbore 2097 is provided in valve body 2010 immediately adjacent to the valve seat 2020.

Counterbore 2097 provides a ledge against which valve face 2014 abuts and seats when valve 2000 is in a closed position, at 0% lift of valve 2000. The ledge of counterbore 2097 has a horizontal width (generally normal to the flow) and height that extends parallel to the flow. When valve face 2014 is lifted out of engagement with valve seat 2020 and within the height of counterbore 2021, restricted flow area 2070 is formed. Initially, the minimum restricted flow area is formed by the clearance between the disc and seat 2020 (or valve body 2010). Then, the disc is moved further away from the seat and the minimum clearance is provided between the disc and counterbore wall 2097. The clearance between the disc and the counterbore wall 2097 defines the restricted flow area (annulus restriction). This clearance is constant until after the disk clears the vicinity of the counterbore and moves further away, as previously described in respect to the valve of FIGS. 8A and 8B. In operation, as the disc moves further away from seat 2020, the restricted flow area 2070 provides the minimum clearance between one side of seat 2020 and the other side of seat 2020 and restricts and governs the flow therebetween.

Figure 10F:
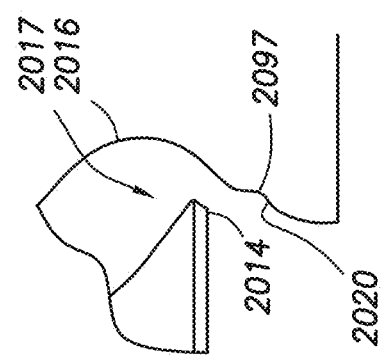
FIGS. 10E and 10F depict the valve of FIGS. 10A and 10B in a fully opened position.
Figure 10D:
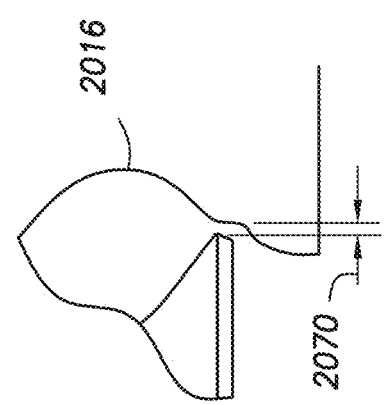
FIGS. 10C and 10D depict the valve of FIGS. 10A and 10B in a step lifted position.
Figure 10B:
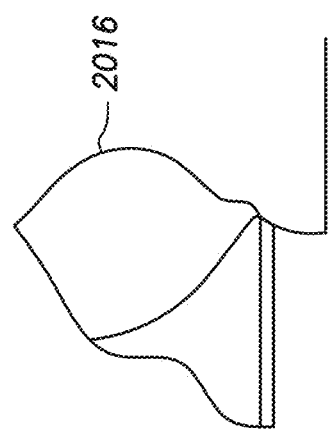
FIGS. 10A and 10B depict a reverse acting poppet valve with an annulus restriction in the closed position.
Figure 10E:
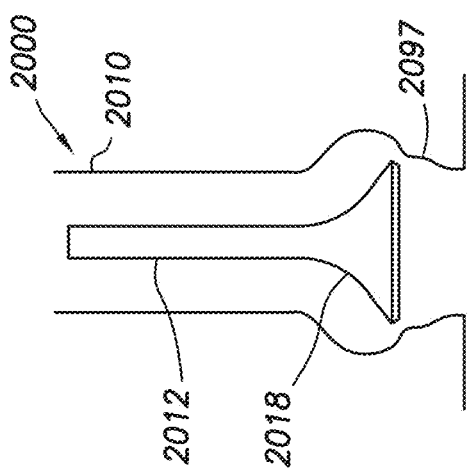
Figure 10C:
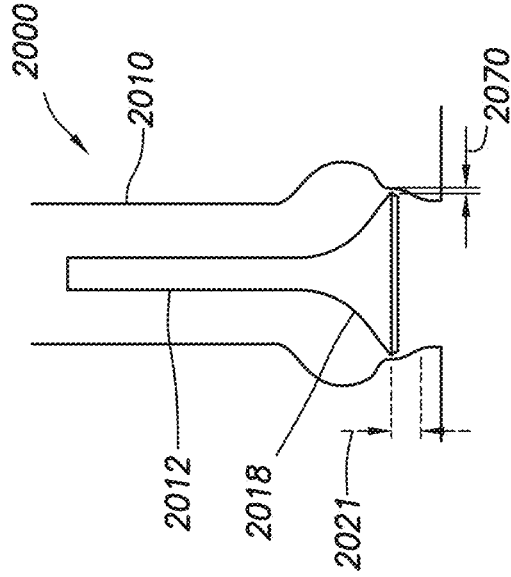
Figure 10A:
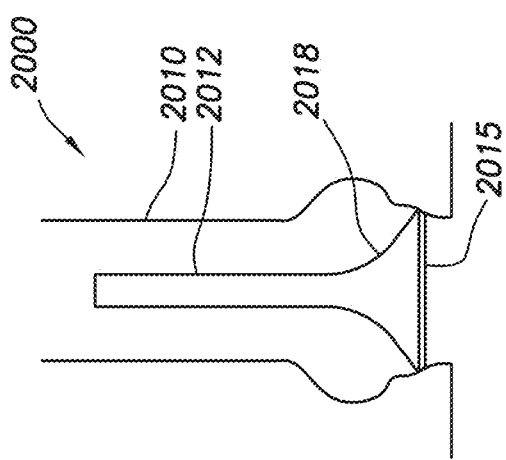

When moving valve 2000 to the open position during transition of a vessel into the blowdown or re-pressurization steps, valve 2000 may be step lifted, as shown in FIGS. 10C and 10D, before being fully lifted, as shown in FIGS. 10E and 10F. Thus, structural and operational features of poppet valve 2000 provide for restriction of the flow area upon opening of poppet valve 2000 for transition into the re-pressurization or blowdown stage (i.e., restricted flow area 2070). As with poppet valves 1800 and 1900, the "flow area" is the clearance between the dynamic portion of poppet valve 2000 (i.e., the valve face 2014 and/or tapered portion 2018) and the static portion of poppet valve 2000 (i.e., the valve body 2010 and counterbore wall 2097). After counterbore 2097, body 2010 may further taper, forming cavity 2017 defined by cavity wall 2016. Counterbore 2097, in combination with the use of a step lift, provides for a modulated opening of valve 2000 which, in-turn, provides for modulating the flow through valve 2000 upon opening thereof.

Conventional Poppet Valve with Counterbore

With reference to FIGS. 11A-11D, operation of a conventional poppet valve 2100 having a counterbore 2197 or annular restriction is described. Counterbore 2197 is positioned, when flowing into the vessel, adjacent seat 2120 (e.g., downstream of and immediately adjacent of seat 2120). When valve 2100 is in the closed position, valve face 2114 near valve end 2115 of valve stem 2112 is engaged with seat 2120 of valve body 2110, preventing flow from passing there through. When valve is in the step lifted position, restricted area 2170 is formed by the clearance between the disc (i.e., valve face 2114 and tapered portion 2118) and the valve seat 2120 and counterbore 2197. Upon the disengagement between the disc and seat 2120, and for the period of the step lift, valve face 2114 is positioned, when flowing out of the vessel, upstream of counterbore 2197, restricted flow area 2170 is maintained. As shown, counterbore 2197 provides a chamfered ledge upon which the disc seats (seat 2120). As the disc of valve 2100 is disengaged through the initial lift, the disc surface breaks with the surface of this chamfered ledge of seat 2120 and counterbore 2197, and the annulus restriction provides the initial flow area (restricted flow area 2170). Also shown are bore 2130, orifice 2132, and height of disc 2117.

With the conventional poppet valve, the disc may include a base which increases the depth (or height) of the disc at the upstream end of the valve stem. An annulus restriction, therefore, is formed by the clearance between the side of the base and the valve seat upon the disengagement between the disc and the valve seat, and for the period of the initial step lift, before the height of the base is below the valve seat. In some such aspects, a chamfered ledge is created on the valve seat upon which the disc seats when the valve is closed. Such a chamfered ledge forms a part of the valve seat. As the disc is disengaged via the initial step lift, the disc surface breaks with the surface of the chamfered ledge and the annulus restriction provides the initial, restricted flow area, at least through the initial step lift that coincides with the height or depth of the base of the disc.

Chamfering and Hardening

In some aspects, the plug, valve seat, or both are chamfered, hardened, or combinations thereof. Chamfering, hardening, or combinations thereof of the plug and/or valve seat may ensure that the restricted flow area does not prevent the plug from reliably entering the valve seat as a result of valve body distortion (e.g., due to header piping forces) and moments applied to the valve stem (e.g., deflection). In some such aspects, to mitigate against lateral vibration of the valve stem and plug, a close clearance guide surface (the annulus restriction) may be provided between the chamfering and the seating surfaces. In some aspects, chamfering increases the area of engagement between the plug and/or the disc, and the valve seat.

Slots and Flats

Figure 12A:
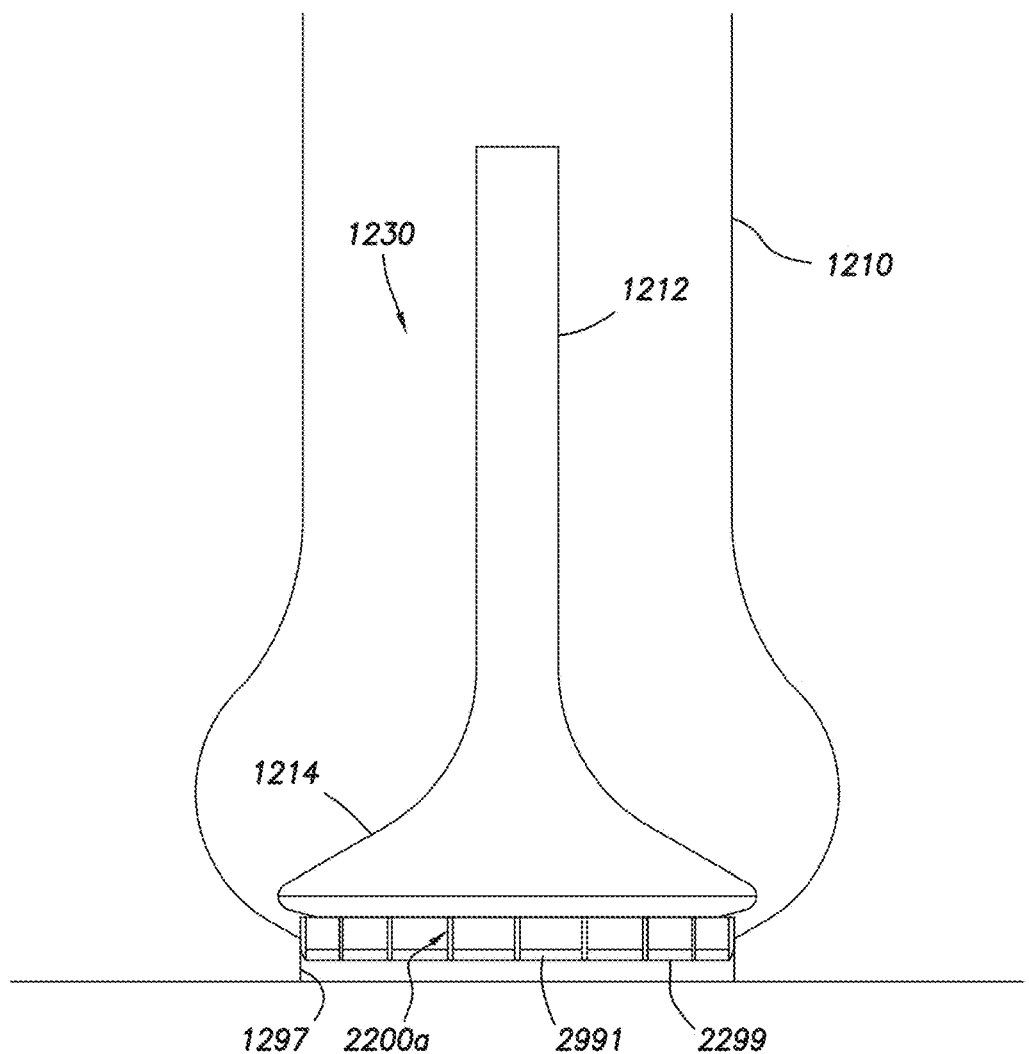
FIGS. 12A and 12B depict a plug and a counterbore, respectively, having serrations or slots thereon.
Figure 12B:
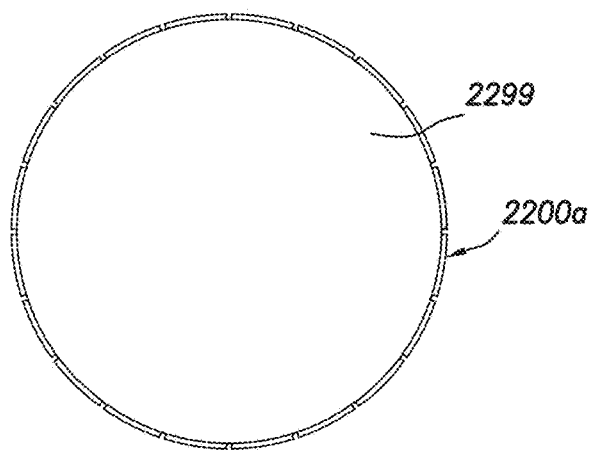

In some aspects, non-linear flow through the valve installations is reduced. For example, the valve installations may be provided with slots or serrations on the plug, on the counterbore or valve seat or other portion of the valve body, on the valve face or other portion of the valve stem, or combinations thereof. With reference to FIGS. 12A and 12B, slots 2200a and 2200b are shown on plug 2299. While shown on plug 2299, such slots may instead, or in addition, be formed on counterbore 2297. Plug 2299 may have chamfer 2991 at the edge thereof to facilitate more reliable entry of plug 2299 into engagement with counterbore 2297. Such slots reduce the kinetic energy in the fluid via viscous damping. The slots provide a straightening of the flow and reduction of swirling currents in the flow. In some configurations, slots are provided as a series of radial notches or ribs positioned immediately upstream of the non-contacting seal. In some aspects, the addition of slots provides for additional modulation of flow through the valve without requiring a further reduction in the clearance between the flow restriction aid and the valve (e.g., between the valve stem or disc and the counterbore, or between the plug and the valve body). In some aspects, fluid flow through the tight clearances between the flow restriction aid and the valve results in high pressure forces acting on the valve stem, which may cause the valve stem to oscillate and impact with the valve body. In some such aspects, the addition of a close running fit between the slots reduces or eliminates such occurrences of impact of the valve stem with the valve body by modulating the flow of fluid past the valve stem through. FIG. 12A also illustrates elements 1210, 121, 1214 and 1230 which will be described further with respect to FIGS. 12C and 12D.

Figure 12C:
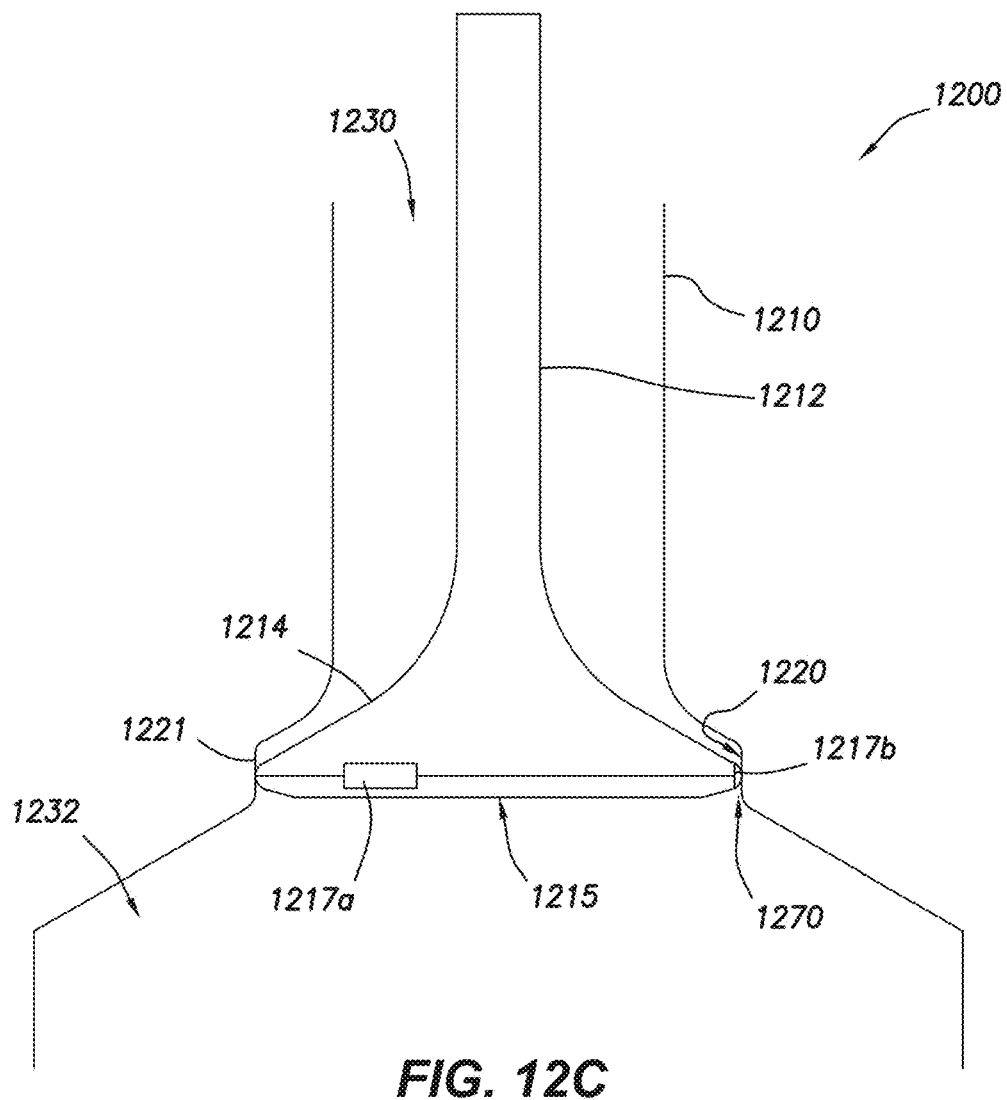
FIGS. 12C and 12D depict a poppet valve with a counterbore and flat surfaces on the valve end.
Figure 12D:
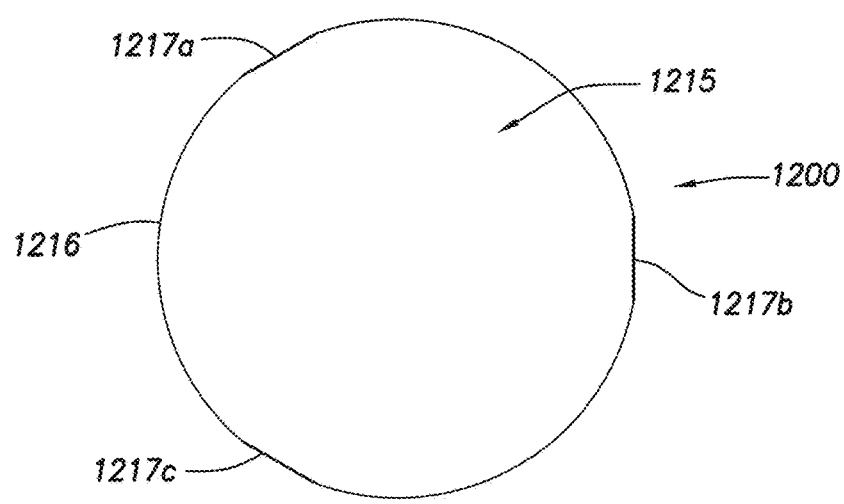

FIGS. 12C and 12D depict poppet valve 1200, a conventional action poppet valve with shroud 1221 formed in valve body 1210. Poppet valve 1200 may be configured for BD operation, to purge vent. Poppet valve 1200 includes stem 1212 positioned within bore 1230. When in the closed position, valve face 1214 is engaged with valve seat 1220, closing off bore 1230 from orifice 1232. However, poppet valve 1200 is shown partially open, with valve face 1214 disengaged from valve seat 1220 and bore 1230 in fluid communication with orifice 1232 via restricted flow area 1270. Poppet valve 1200 includes flat surfaces, also referred to as flats 1217a-1217c, formed on outer perimeter 1216 or circumference of valve end 1215. Flats 1217a-1217c may provide the same or substantially the same function as the serrations described herein, providing restricted flow area 1270. In some such aspects, without the presence of flats, perimeter 1216 of valve end 1215 would be sufficiently sized to maintain poppet valve 1200 in closed at least until valve end 1215 clears shroud 1221. However, flats 1217a-1217c provide space between perimeter 1216 of valve end 1215 and shroud 1221, with such space defined restricted flow area 1270. For example, in some aspects, poppet valve 1200 includes a 100 mm poppet, and a step lift of such a poppet is a 4 mm lift thereof, while a full lift of such a poppet is a 24 mm lift. As shown in FIG. 12C, poppet valve 1200 is step lifted. While shown as having three flats, the plugs disclosed herein may have other numbers of flats, such as from three to sixteen flats, allowing for a maximum of from 96 degrees of arc per flat to 18 degrees of arc per flat The slots and flats may function to avoid lateral vibrations of the poppet valve during high pressure drops across the valve. In some aspects, the plug, whether or not it includes slots or flats, is a separate construction that is attached to the poppet valve, such as with a cap screw on the stem centerline. Thus, in some aspects, an existing poppet valve may be retrofitted with a plug.

Step Lifting Parameters

The methods of modulating the flow across a valve disclosed herein include restricting the flow area through the valve by partially opening the valve (i.e., step lifting the valve), such as during the RP and BD steps. In some such aspects, the valve is opened by an amount that is 5% of the total lift of the valve. For example, if fully opening the valve requires lifting the valve by 100 mm, then a 5% step lift of the valve would include lifting the valve by 5 mm. In certain aspects, the valve is lifted by an amount that is less than a 100% lift of the valve, less than a 90% lift of the valve, less than a 80% lift of the valve, less than a 70% lift of the valve, less than a 60% lift of the valve, less than a 50% lift of the valve, less than a 40% lift of the valve, less than a 30% lift of the valve, less than a 20% lift of the valve, less than a 10% lift of the valve, less than a 9% lift of the valve, less than a 8% lift of the valve, less than a 7% lift of the valve, less than a 6% lift of the valve, or at least about 5% lift of the valve. For example, in some particular applications, a 5% step lift of the valve may be an about 1 to 2 mm lift of the valve, where the full lift of the vale is about 20 mm to 40 mm, respectively. As another example, in some aspects, a step lift of a poppet valve with a 100 mm poppet is a 4 mm lift, and a full lift of such a valve is a 24 mm lift.

Once step lifted, the valve may be maintained step lifted for a period of time before the valve is subsequently fully opened. In some aspects, the valve is maintained step lifted until the pressure in the vessel is at or near the steady state pressure of the system (i.e., the pressure in the headers and in vessels undergoing adsorption at a steady state). In other aspects, after step lifting, the valve is fully lifted prior to the pressure in the vessel being at or near the steady state pressure of the system. While described as including a single step lift, one skilled in the art would understand that more than one step lift may be implemented prior to fully lifting the valve. Valve lifts at such increments (e.g., 5% lift) and smaller are generally difficult to accurately accomplish with a hydraulic lift mechanism or at high pressure differences, where the valve stem deflection may be of the same magnitude.

Three Bed PSA Systems and Processes

Figure 14A:
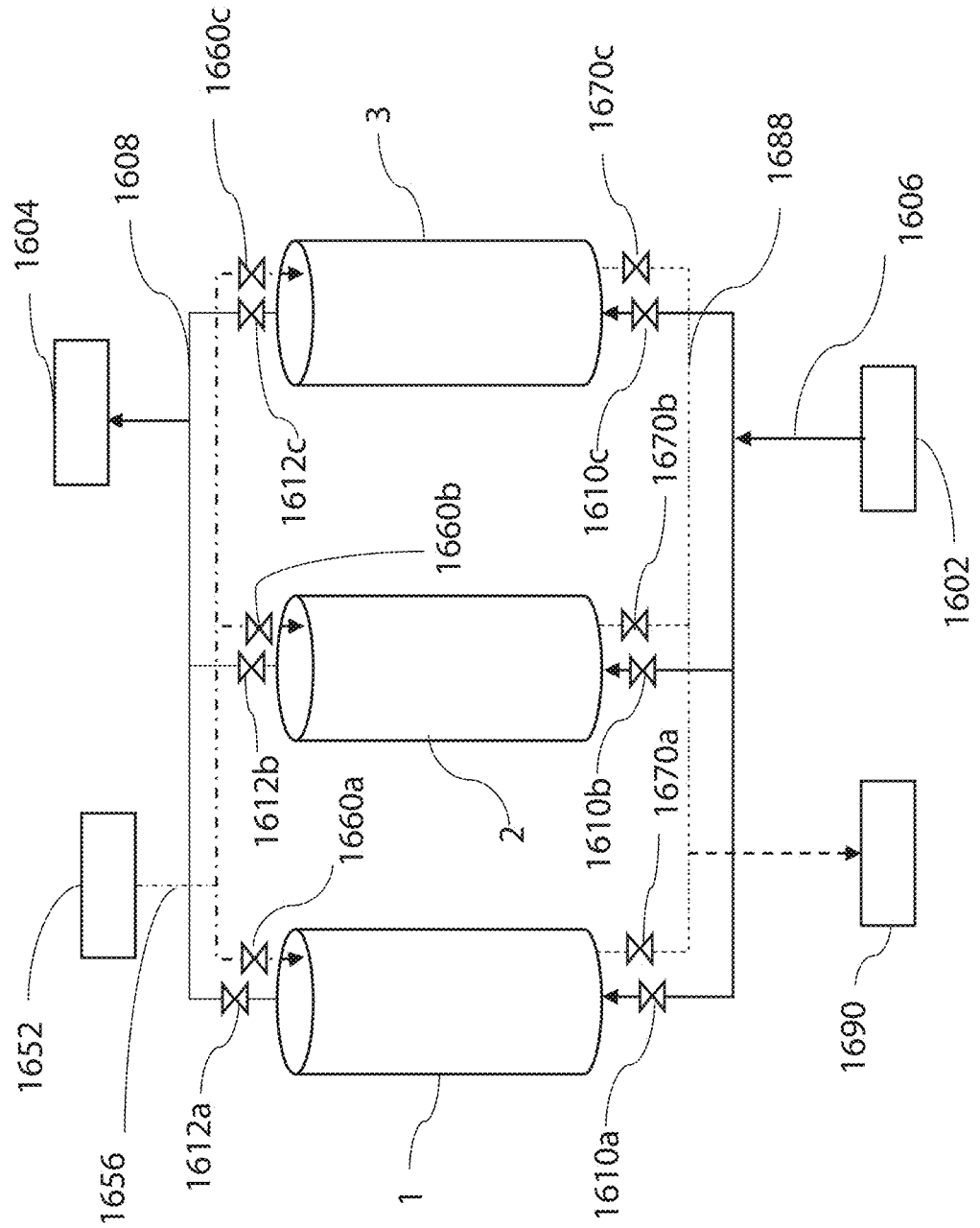
FIGS. 14A-14C are schematics of a system for pressure swing adsorption.
Figure 14B:
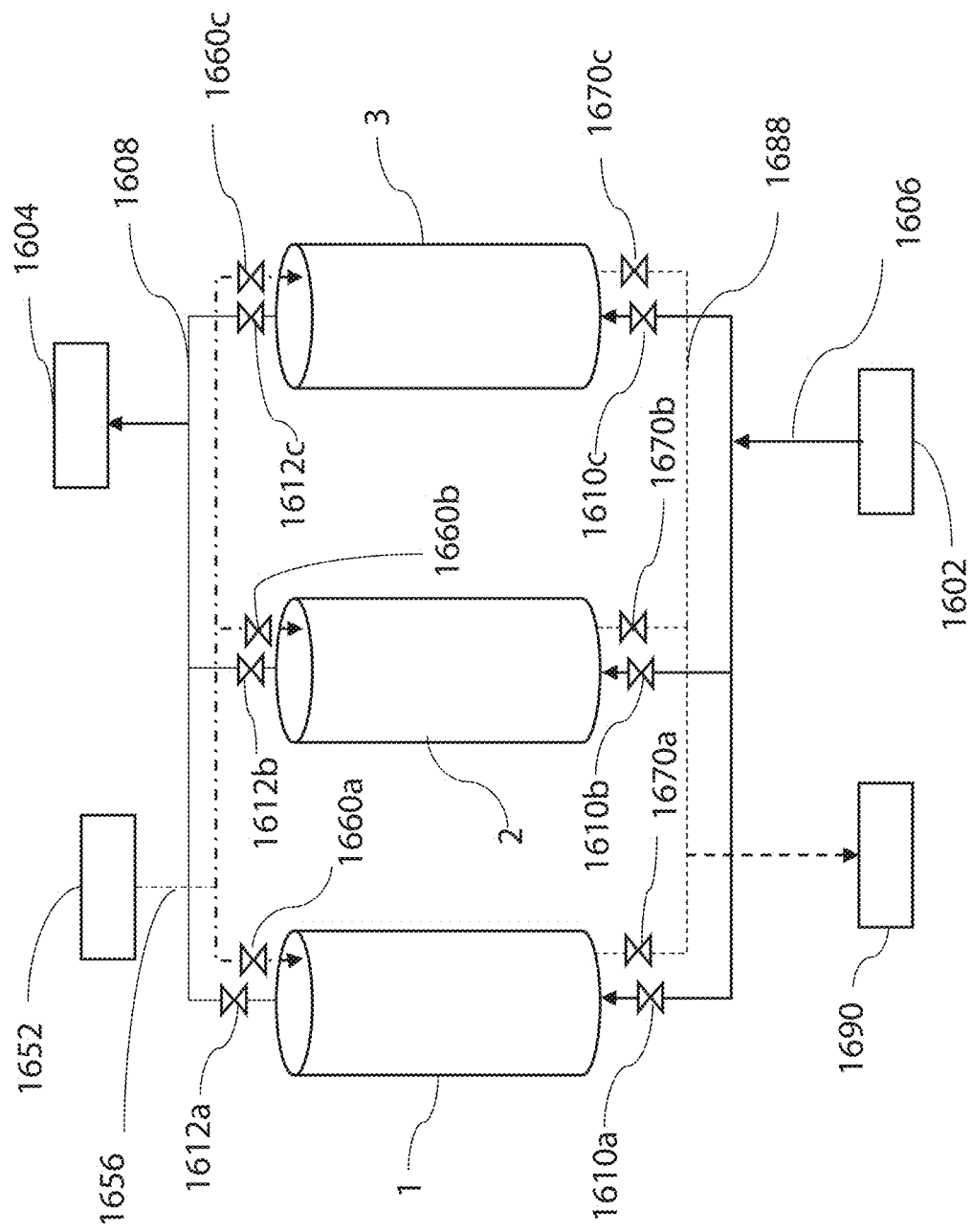
Figure 14C:
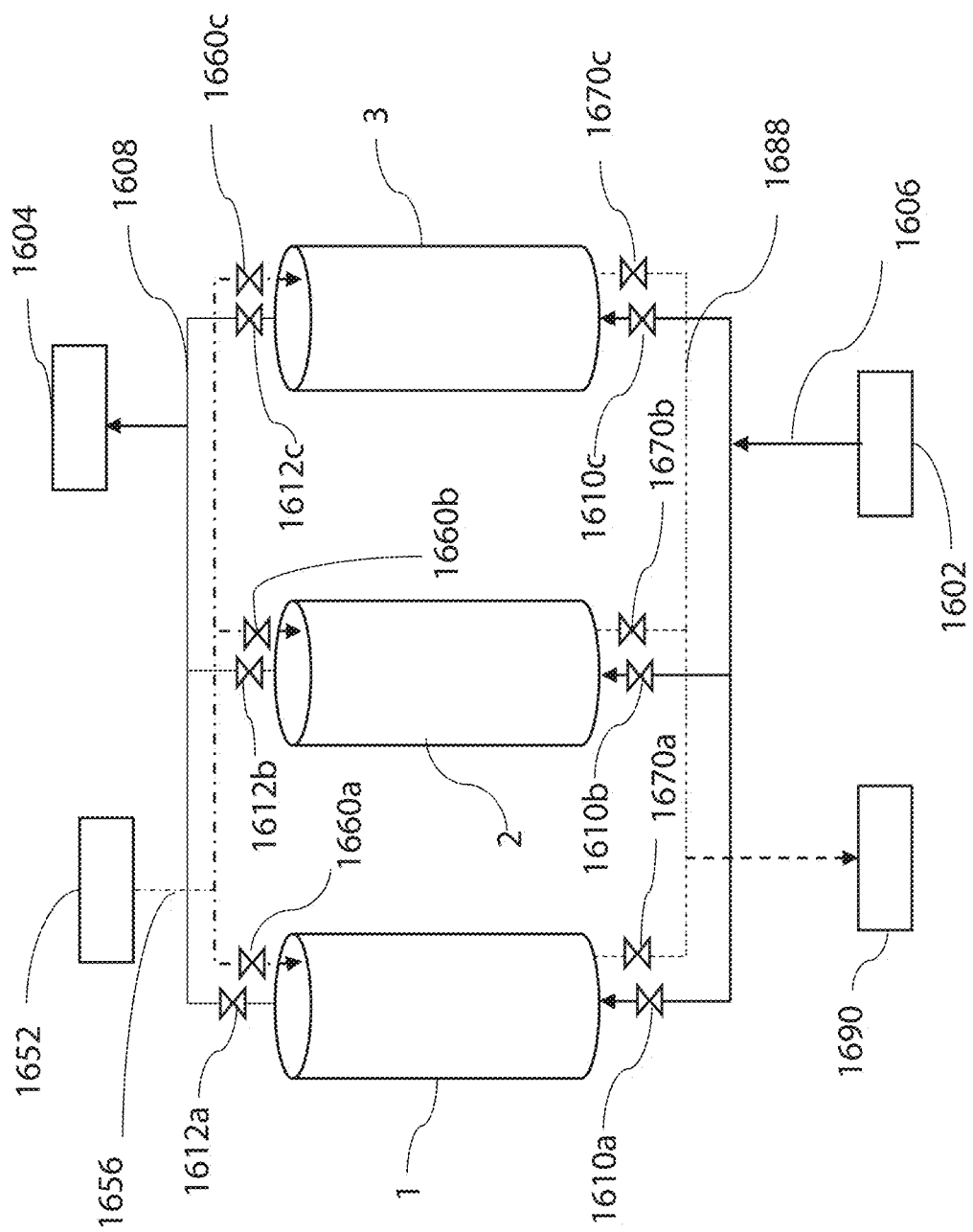

With reference to FIGS. 14A-14C, flow modulation in a pressure swing adsorption system including three adsorbent bed vessels will be described. The process includes modulating the flow into each absorbent bed vessel upon transitioning of that vessel into the re-pressurization (RP) stage and into the blow-down (BD) stage. FIGS. 14A-14C depict a PSA system 1600 at three different stages of operation. One skilled in the art would understand that FIGS. 14A-14C are simplified, exemplary PSA systems, and that such systems may include additional valves and components typically used PSA systems, such as the valves and components shown in FIGS. 1A, 1B, 1C, 7, and 22. Also, one skilled in the art would understand that, while the PSA systems shown in FIGS. 14A-14C include three absorbent bed vessels, the PSA system disclosed herein is not limited to such a configuration and may include more or less than three absorbent bed units.

System 1600 includes Bed 1, Bed 2, and Bed 3, which are configured in fluid communication, and for continuous flow and operation. Gaseous feed stream 1602 is continuously passed, via input manifold 1606, to and through at least one of Beds 1-3, and a product stream 1604 is continuously output via output manifold 1608. The Beds 1-3 operate out of phase, with overlap of the stages of operation that allows for continuous operation of system 1600 (i.e., continuous flow of feed 1602 into system 1600 and of product 1604 out of system 1600).

When one of Beds 1-3 is undergoing blowdown, purge feed stream 1652 is continuously passed, via purge input manifold 1656, to and through at least one of Beds 1-3, and a purge vent stream 1690 is continuously output via output manifold 1688.

In the discussion of FIGS. 14A-14C, "Step 1" refers to an initial or first depressurization or blowdown step or stage, "Step 2" refers to a second depressurization or blowdown step or stage, "Step 3" refers to a third depressurization or blowdown step or stage, "Step 4" refers to an initial or first product re-pressurization step or stage, "Step 5" refers to a feed re-pressurization step or stage, "Step 6" refers to an adsorption or production step or stage, and "Step 7" refers to a purge step or stage. One skilled in the art would understand that the systems and processes disclosed herein are not limited to this precise sequence of steps, which are exemplary only. In general, each bed of the system is operated in a cycle, with the sequence of steps or stages including: (1) a pressurization (or re-pressurization) step or stage; (2) an adsorption or production step or stage; (3) a purge step or stage; and (4) a depressurization or blowdown step or stage. Collectively, the re-pressurization and adsorption stages may be referred to as adsorption, while the purge and depressurization stages may be referred together as regeneration or blowdown.

With reference to FIG. 14A, system 1600 is shown with Bed 1 entering into Step 1, the initial blowdown stage. When Bed 1 is entering into the blowdown stage, Bed 2 is operating within the adsorption stage (Stage 6) and Bed 3 is operating within the final stage of blowdown (Stage 3). Each of Beds 1-3 includes a feed inlet valve 1610a-1610c, respectively, by which the input of feed stream 1602 into Beds 1-3 is regulated. Each of Beds 1-3 includes a product outlet valve 1612a-1612c, respectively, by which the output of product stream 1604 out of Beds 1-3 is regulated. Each of Beds 1-3 includes a purge feed inlet valve 1660a-1660c, respectively, by which the input of purge feed stream 1652 into Beds 1-3 is regulated. Each of Beds 1-3 includes a purge vent outlet valve 1670a-1670c, respectively, by which the output of purge vent stream 1690 out of Beds 1-3 is regulated.

As Bed 2 is operating with the adsorption stage, both valves 1610b and 1612b are open, and valves 1660b and 1670b are maintained closed. Bed 3 is operating in the blowdown stage, such that valve 1660c and 1670 are opened, and valves 1610c and 1612c are closed.

In FIG. 14A, Bed 1 is transitioning into the blowdown stage (Stages 1-3). To transition into the blowdown stage, valves 1610a and 1612a are closed, and valve 1670a is step lifted, and the fully lifted. Valve 1660a is fully lifted either simultaneously with fully opening valve 1670a or subsequent thereto.

With reference to FIG. 14B, system 1600 is shown with Bed 1 entering into Step 4, the initial re-pressurization stage. When Bed 1 is entering into the re-pressurization stage, Bed 2 is operating within the blowdown stage (Stage 1) and Bed 3 is operating within the adsorption (Stage 6). For Bed 1 to enter into the re-pressurization stage (Stages 1-3), valves 1660a and 1670a are closed, valve 1610a is step lifted open prior to being fully open, and valve 1612a is initially closed and is subsequently fully opened simultaneously with of after fully opening valve 1610a to re-pressurize Bed 1. As Bed 2 is operating with the blowdown stage, valve 1610b and 1612b are closed, and valves 1660b and 1670b are opened in the same manner as described with the respect to Bed 1. Bed 3 is operating in the adsorption stage, such that valves 1610c and 1612c are open, and valves 1660c and 1670c are closed.

With reference to FIG. 14C, system 1600 is shown with Bed 1 entering into Step 6, the adsorption stage. When Bed 1 is entering into the adsorption stage, Bed 2 is operating within the blowdown stage (Stage 2) and Bed 3 is transitioning from the adsorption (Stage 6) to the purge stage (Stage 7). For Bed 1 to enter into the adsorption stage (Stage 6), valves 1610a and 1612a is open to allow continuous flow through Bed 1, and valves 1660a and 1670a are maintained closed. As Bed 2 is operating with the blowdown stage, valves 1610b and 1612b are closed, and valves 1660b and 1670b are opened in the manner described with respect to Bed 1. Bed 3 is operating in the purge stage, such that valves 1610c and 1612c are closed, and vales 1660c and 1670c are opened.

When any of the adsorption bed vessels of system 1600 initially transitions into either the re-pressurization stage or the blowdown stage, flow disturbances can occur, which can affect the flow of feed 1602 throughout system 1600. For example, with reference to FIG. 8B, when Bed 1 initially transitions from the blowdown stage (Stage 3) and enters the re-pressurization stage (Stages 5 and 6), such flow disturbances can occur. Without being bound by theory, at the end of the depressurization stages (Stages 1-3) Bed 1 is in a lowest-pressure state relative to Beds 2 and 3 and relative to other pressures states of Bed 1 throughout the cycle of the PSA process (cycle of Stages 1-7). The flow rate into the transitioning adsorption bed may be significantly larger than the steady-state flow rate of the system, depending on the pressure differential between the steps or stages involved in the transition, and depending on the opening speed of the valve flow area. Upon opening of valve 1610a to enter the re-pressurization stages (Stages 4 and 5), the pressure differential between the flow of feed 1602 within input manifold 1606 and the low-pressure within Bed 1 is sufficient to cause a sudden flow of feed 1602 into the relatively evacuated Bed 1 at a relatively high gas velocity. If this pressure differential is of sufficient magnitude, flow disturbances are caused within system 1600, including interruption of the steady state flow within other beds, such as interruption of the steady state flow of Bed 3 undergoing adsorption; pulsations; vibration of components of system 1600, such as vibration of input manifold 1606 and output manifold 1608; or combinations thereof. For example, and without limitation, if the ratio of the pressure within the bed entering re-pressurization (in this example Bed 1) and the pressure of the adsorption step (Stage 6) is 0.53 or less, the gas velocity of gas entering into Bed 1 upon opening of valve 1610a can reach or exceed the speed of sound. Flow disturbances caused by such valve dynamics may disturb flow through the adsorption matrix of other vessels, including those operating in the adsorption stage, that are connected to the same header as the transitioning vessel.

In some aspects, the present disclosure provides for apparatus, methods, and systems to modulate the flow of feed of such vessels entering re-pressurization or blowdown. In some such aspects, the apparatus, methods, and systems disclosed herein prevent the gas velocity of gas entering into the bed transitioning to re-pressurization or blowdown (Bed 1 in this example) from reaching or exceeding the speed of sound. Thus, in some such aspects, the present disclosure provides for PSA systems and processes in which the gas velocity is maintained below the speed of sound.

To modulate the occurrence of such flow disturbances, one or more flow modulating techniques are used. The flow modulating techniques disclosed herein include regulation of the valve flow area provided upon opening of the valve to the vessel transitioning into re-pressurization or blowdown. In some such aspects, the flow modulation is achieved via operation of one or more valves regulating flow into and out of the absorbent bed units, such as valves 1610a-1610c, 1612a-1612c, 1660a-1660c, and 1670a-1670c. In some such aspects, each valve is a poppet valve (conventional or reverse acting). In particular, the flow modulating techniques disclosed herein include, but not limited to, control of valve movements and use of flow restriction aids, including: (1) the use of plugs on the valves to restrict the valve flow area; (2) the use of shrouds (counterbores) in valves to restrict the valve flow area; (3) the use of serrations on valves to restrict valve flow area; (4) the use of step lifting to open the valves and regulate the valve flow area; and (5) combinations thereof. Modulation of such valve dynamics, in-turn, modulates pressure and/or flow disturbances (e.g., pulsations) caused by the valve dynamics.

One skilled in the art would understand that the present disclosure is not limited to the particular arrangement and placement shown in FIGS. 14A-14C, and that the point of flow modulation (i.e., the location of the valves 1610a-1610c, 1612a-1612c, 1660a-1660c, and 1670a-1670c) may be varied and may be anywhere on the inlets and outlets of the vessels (Beds 1-3). As would be understood by one skilled in the art, the systems disclosed herein are not limited to the particular arrangements, as shown, and may include other conduits to control other fluid steams as part of the process; equalization vessels; or other components, such as those described in incorporated '155 Publication.

Figure 15:
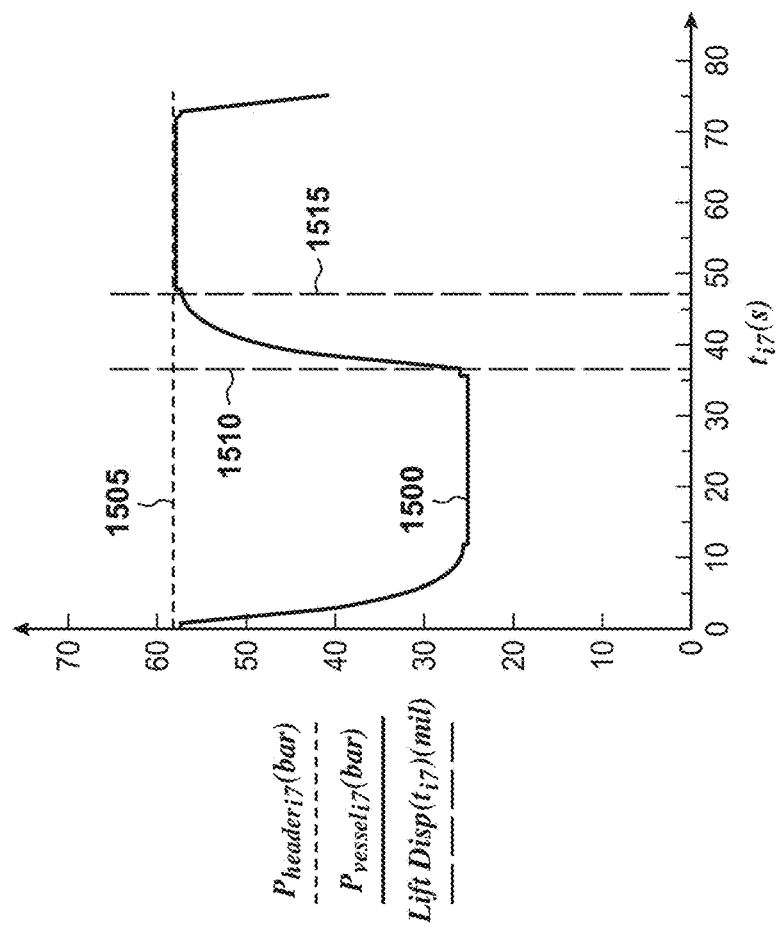
FIG. 15 is a graph of pressure versus time for a vessel in a PSA cycle.

FIG. 15 is an exemplary graph plotting pressure (bar) versus time (s) for a vessel as the vessel transitions from production, through depressurization (blowdown), through re-pressurization, through adsorption, and back into depressurization. The line 1500 plots the pressure in the vessel, line 1505 plots the pressure in the feed header, and lines 1510 and 1515 indicate the lift displacement. From t=0 until line 1500 intersects line 1510, where the vessel enters re-pressurization, the vessel is undergoing blowdown and then is purging at vent pressure. Upon intersecting with line 1510 moving forward in time from t=0, the vessel enters re-pressurization and operates in re-pressurization until the intersection of line 1500 with line 1515. After line 1515, the vessel is operating in the adsorption stage until about t=75 seconds where, once again, the vessel undergoes depressurization. Line 1510 coincides with the opening of the feed valve into the vessel, and line 1515 coincides with the opening of the product valve out of the vessel.

Figure 16:
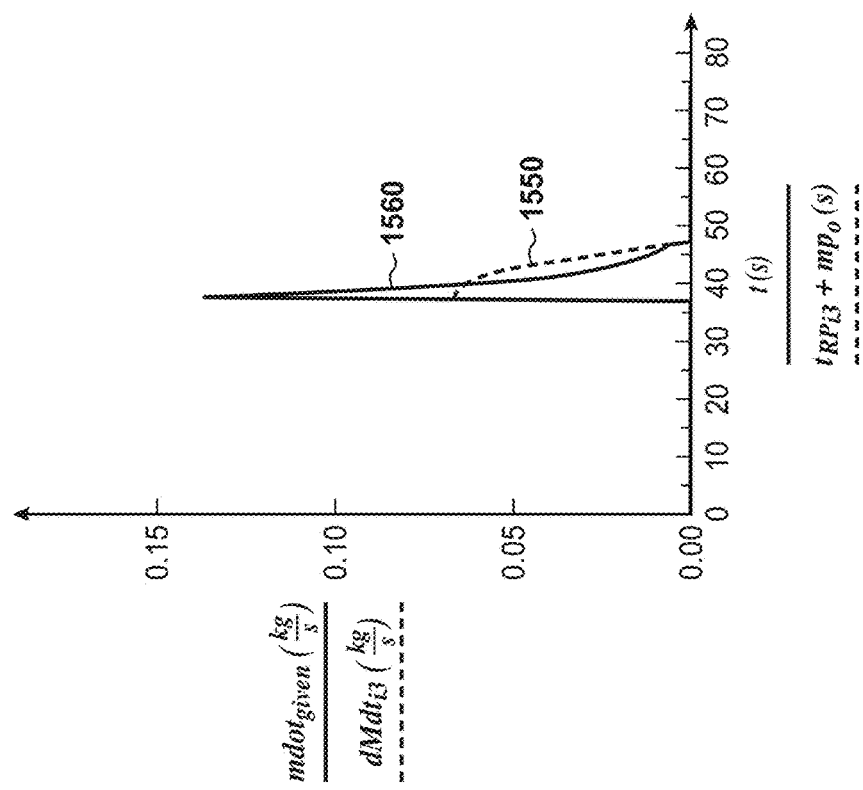
FIGS. 16 and 17 are graphs of flow rate versus time for a vessel.

FIG. 16 is a graph plotting flow rate (kg/s) versus time (s) for a vessel transitioning into the RP stage with a valve including a plug and using a step lift of the valve (line 1550), and for a vessel that does not include a plug and is not step lifted (line 1560). In this example, the vessel volume to be re-pressurized was 20.1968 L, and the mass of gas flow during the pulse to re-pressurization was 0.3591 kg. The areas under each curve give the mass (kg) of gas that was required to enter the vessel to reach adsorption pressure (i.e., feed header pressure).

Figure 17:
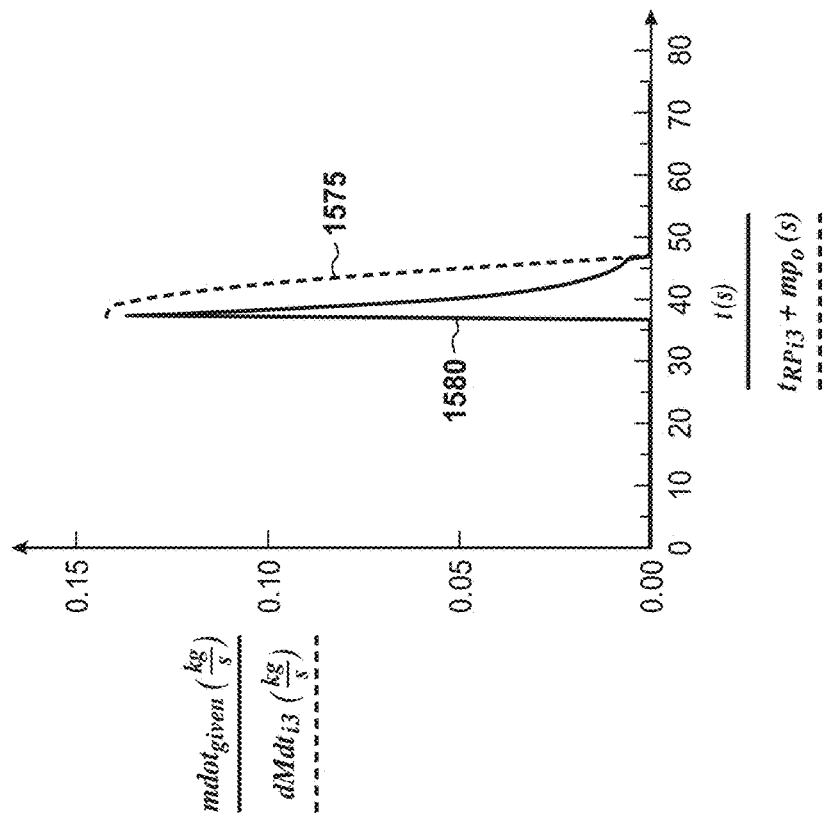

Similar to FIG. 16, FIG. 17 is a graph plotting flow rate (kg/s) versus time (s) for a vessel transitioning into the RP stage with a valve including a plug and using a step lift of the valve (line 1575), and for a vessel that does not include a plug and is not step lifted (line 1580). FIG. 17 shows the maximum free volume case, where additional piping is included between the valves and the vessel. With the larger volume, a larger mass of gas is required to reach full pressure. In this example, the vessel volume to be re-pressurized was 47.7823 L, and the mass of gas flow during the pulse to re-pressurization was 0.8496 kg.

Figure 18:
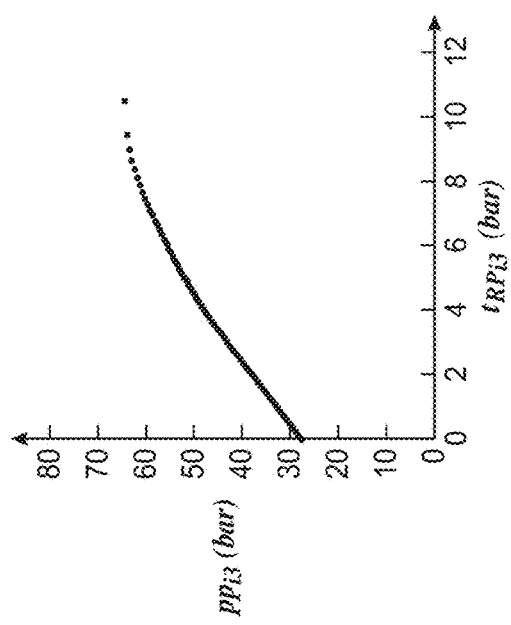
FIG. 18 is a graph of pressure versus time flowing for a vessel during re-pressurization.
Figure 19:
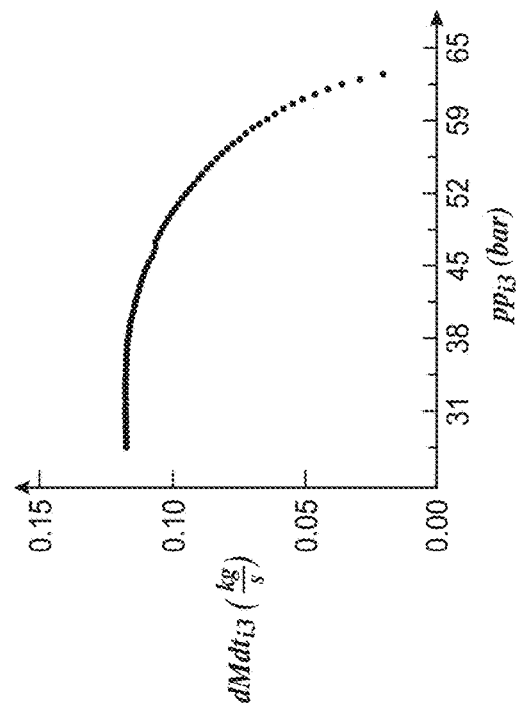
FIG. 19 is a graph of pressure versus flow rate for a vessel during re-pressurization.

FIG. 18 is an exemplary graph plotting pressure versus time flowing, and FIG. 19 is an exemplary graph plotting pressure versus flow rate, both during re-pressurization of a vessel.

Figure 20:
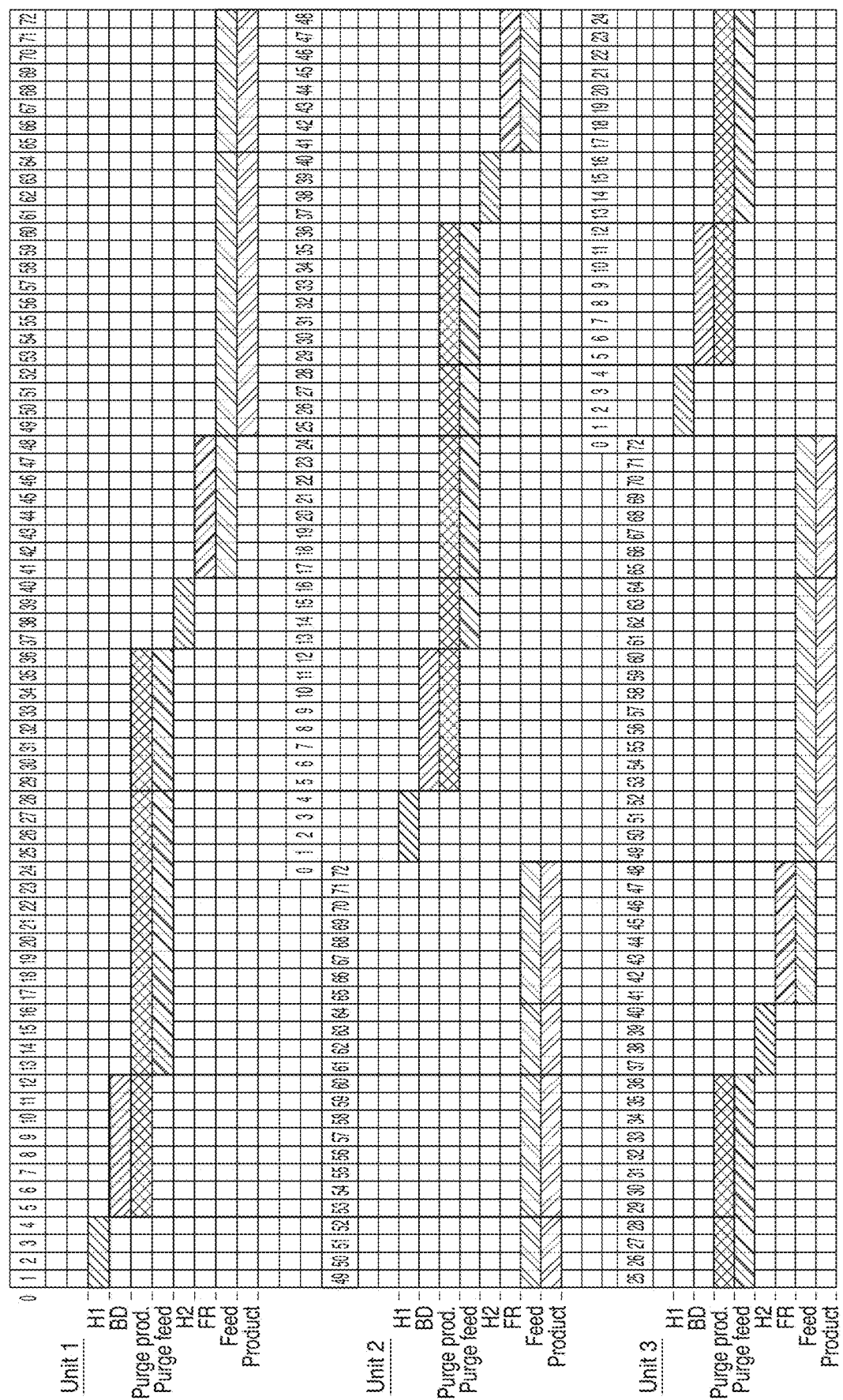
FIG. 20 is a chart showing the overlay between multiple, connected vessels in a system.
Figure 26:
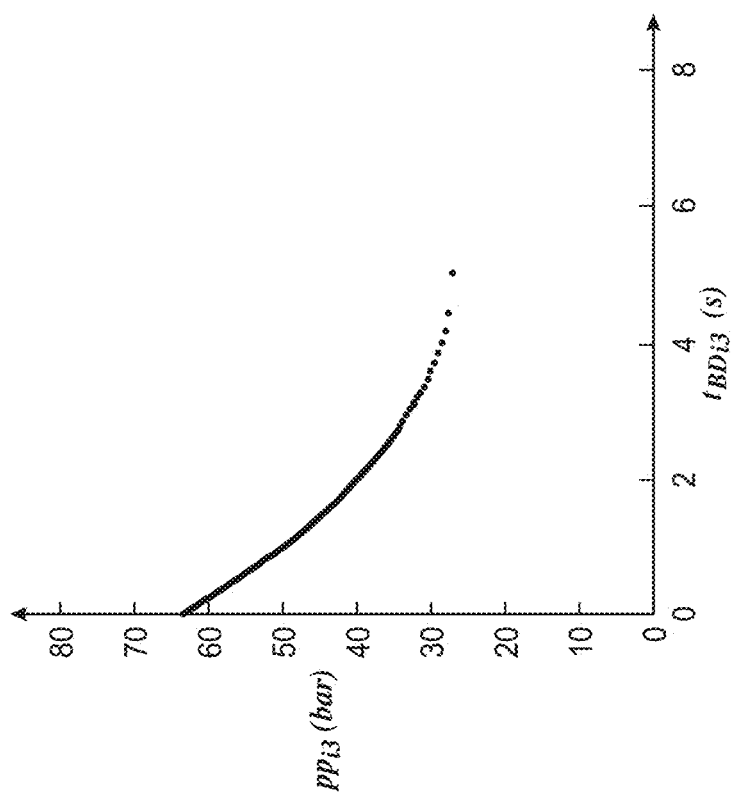
FIG. 26 is a graph of pressure versus time for a vessel during blow down.

FIG. 20 is an exemplary chart showing the overlap influence between the connected vessels (units 1-3). In the chart, valves of the same legend are on the same process flow header. The "FR" (feed re-pressurization) and "BD" (blow down) indicate step openings of the "Feed" and "Purge Product" valves, respectively. As is evident from FIG. 20, in some aspects there is a delay between the opening of the "Feed" valve for re-pressurization and the opening of the "Product" valve. That is, the "Feed" valve is opened to introduce feed into the vessel while the "Product" valve remains closed, and a period of time (dwell time) passes after opening the "Feed" valve and prior to opening the "Product" valve. The delay between opening the "Feed" valve and opening the "Product" valve is referred to as "dwell". In some aspects, when dwell is used in combination with a poppet valve having a plug, in accordance with the present disclosure, the plug and/or restricted flow area provides time for a relatively slow re-pressurization during the dwell, without affecting the remainder of the cycle. The dwell also prevents any re-pressurization pulse from affecting the associated product header. For example, when the "Product" valve opens, there may be a pressure bump, such as a one bar bump (increase) in pressure, but the flow rate through the adsorbent may be maintained constant or substantially constant; remaining unaffected by the re-pressurization. In some aspects, the plugs of the poppet valves disclosed herein may be designed to have dimensions of suitable for use with the particular dwell time used. For example, FIGS. 18 and 19 are graphs resulting from calculations to size plug restrictions to suit dwell times for re-pressurization. Dwell may also be used during the purge cycle, where the purge vent valve is opened first, then the purge feed valve opens after a "dwell time". FIG. 26 is a graph where a 5 second dwell is used during purge. In some aspects, the dwell time used is from about 4 seconds to about 10 seconds, or from about 5 seconds to about 9 seconds, or from about 6 seconds to about 8 seconds. Use of the dwell time allows for the poppet valve, with plug, to throttle the flow, smoothing out the variations in flow rate that occur. For example, during re-pressurization the dwell time is the time period that begins after the feed valve is opened and until the time that the product valve is opened. After the RP is completed, but before the produce valve is opened, there is no flow. The dwell time provides time to slow the RP step, and thus lower pulsation, while avoiding mass flow rates that vary significantly during the adsorption cycle. In some aspects, the dwell time is sufficiently long such that the RP is complete before the product valve is opened.

Poppet Valves

The methods, systems and apparatus disclosed herein may be applied to any of various valves utilized to manage the flow of fluid within PSA processes and systems. For example, the valves may be poppet-type valves, such as those shown and described in FIGS. 5A and 5B of the incorporated '155 Publication. Poppet-type valves may include a poppet valve assemble that opens toward the adsorbent bed vessel (i.e. a forward acting or conventional valve), or one that operates as a "reverse acting valve" that opens away from the adsorbent bed vessel. For example, a reverse acting valve may lessen the void space (e.g., minimize dead volume in the adsorption bed vessel). When used with a high-pressure feed, reverse acting valves may use the feed pressure to assist with the sealing force when the poppet valve is closed and the vessel is at low pressure. Forward acting valves may be used for other steps, when the adsorption bed vessel is at a higher pressure than the associated conduit (e.g., a low-pressure blow-down valves). Accordingly, use of poppet valves may be beneficial for rapid swing adsorption processes (e.g., RCPSA processes). Such processes may involve pressures between about 0.1 bar and 100 bara, for example.

The poppet valves disclosed herein may have different configurations, such as different positioning, direction of operation and shape, which may be adjusted for different fluid streams. For example, the poppet valves may include a poppet valve stem, or rod, extending to a location outside its head and connected to a disk element. The valve stem can be surrounded by a bushing and/or valve guide, which provides support for the valve, while allowing movement along a linear path to guide and, in some cases, seals the valve during operation. In some applications, a valve stem seal is associated with the valve stem, e.g., rod packing as is typically seen in reciprocating compressors. In some instances, a valve stem seal can be the same as a bushing or valve guide, although a separate valve seal is less susceptible to wear in use. The poppet valve disk element typically has a surface facing the proximal adsorbent bed surface. The surface of the disk element can be substantially round, for seating in a substantially round opening. This surface can also be flat or profiled. That is, the poppet valve disk element may have a surface that is profiled inward or outwardly relative to the opening on which it operates. The surface of the poppet valve may be substantially parallel to the proximal adsorbent bed surface.

In certain applications, each valve is associated with an externally accessible valve seat that fits within its respective inlet to the adsorbent body and/or outlet from the adsorbent body and is sealed to the head by any suitable sealing means, e.g., a gasket which is held in place by the flange attaching the valve assembly to its respective inlet. Alternatively, the valve assembly can be attached to its respective inlet via a rotatable locking mechanism, e.g. a turn-to-lock or bayonet mechanism. In other applications, the valve seat can be installed in the head separate from the valve assembly by use of threaded-in or pressed-in seats, or by the machining of the valve seat into the head itself.

Depending on the adsorbent bed unit configuration, the poppet valve configuration may be adjusted to manage the direction the poppet valve opens for operation in the process. For example, certain poppet valves may open toward the adsorbent bed or opens away from the adsorbent bed. For example, a poppet valve opening toward the adsorbent bed vessel may useful to manage the flow of fluids when the pressure is higher in the adsorbent bed vessel as compared to the conduit or the manifold. Alternatively, a poppet valve opening away from the adsorbent bed vessel may be preferred when the pressure is lower in the adsorbent bed vessel as compared to the conduit or the manifold. The configuration for the valve may obviate the need for separate pressure relief valves and can be useful where an adsorbent bed is susceptible to rapid pressure buildup. Further, the reverse acting poppet valve may provide less dead or void space in the adsorbent bed unit having poppet valves that open away from the adsorbent bed than those where the poppet valve opens towards the adsorbent bed. Vessels may include a combination of forward acting poppet valves and reverse acting poppet valves. In some aspect's, all poppet valves in a vessel are conventional acting poppet valves. In other aspects, all poppet valves in a vessel are reverse acting poppet valves.

Adsorbent Material

The adsorbent materials used herein may include solid adsorbent material capable of adsorbing one or more components from the feed stream. Such solid adsorbent materials may be selected to be durable against the physical and chemical conditions within the adsorbent bed vessels, and may include metallic, ceramic, or other materials, depending on the adsorption process.

In one or more applications, the adsorption material may be used for the separation of a target gas from a gaseous mixture. The adsorption material may be supported on a non-adsorbent support, or contactor. Non-limiting examples of the form of the adsorbent material include beds of beaded or pelletized adsorbent particles or an adsorbent material on a structured contactor, such as a parallel channel contactor. Such contactors contain substantially parallel flow channels where 20 volume percent, preferably 15 volume percent or less of the open pore volume of the contactor, excluding the flow channels, is in pores greater than about 20 angstroms. A flow channel is that portion of the contactor in which gas flows, if a steady state pressure difference is applied between the point or place at which a feed stream enters the contactor and the point or place at which a product stream leaves the contactor. In a parallel channel contactor, the adsorbent is incorporated into the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors including structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the method and system include high surface area (>10 $m^2$/gm and preferably >75 $m^2$/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

Applications

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology may be useful for gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In one or more application, the streams provided to the adsorbent bed and removed from an adsorbent bed may have different compositions. For example, the hydrocarbon containing stream may have greater than 0.005 volume percent $CO_2$ based on the total volume of the gaseous feed stream and an adsorbent material in the adsorbent bed has a higher selectivity to $CO_2$ as compared to hydrocarbons. Also, the product stream may have greater than 98 volume percent hydrocarbons based on the total volume of the product stream. Further, the gaseous feed stream may be a hydrocarbon containing stream having greater than 20 volume percent $CO_2$ based on the total volume of the gaseous containing stream.

Examples—Pulsation Evaluation

The following example was performed to evaluate certain aspects of the methods, apparatus, and systems disclosed herein. One skilled in the art would understand that the methods, apparatus, and systems disclosed herein are not limited to the example set forth herein.

Figure 21:
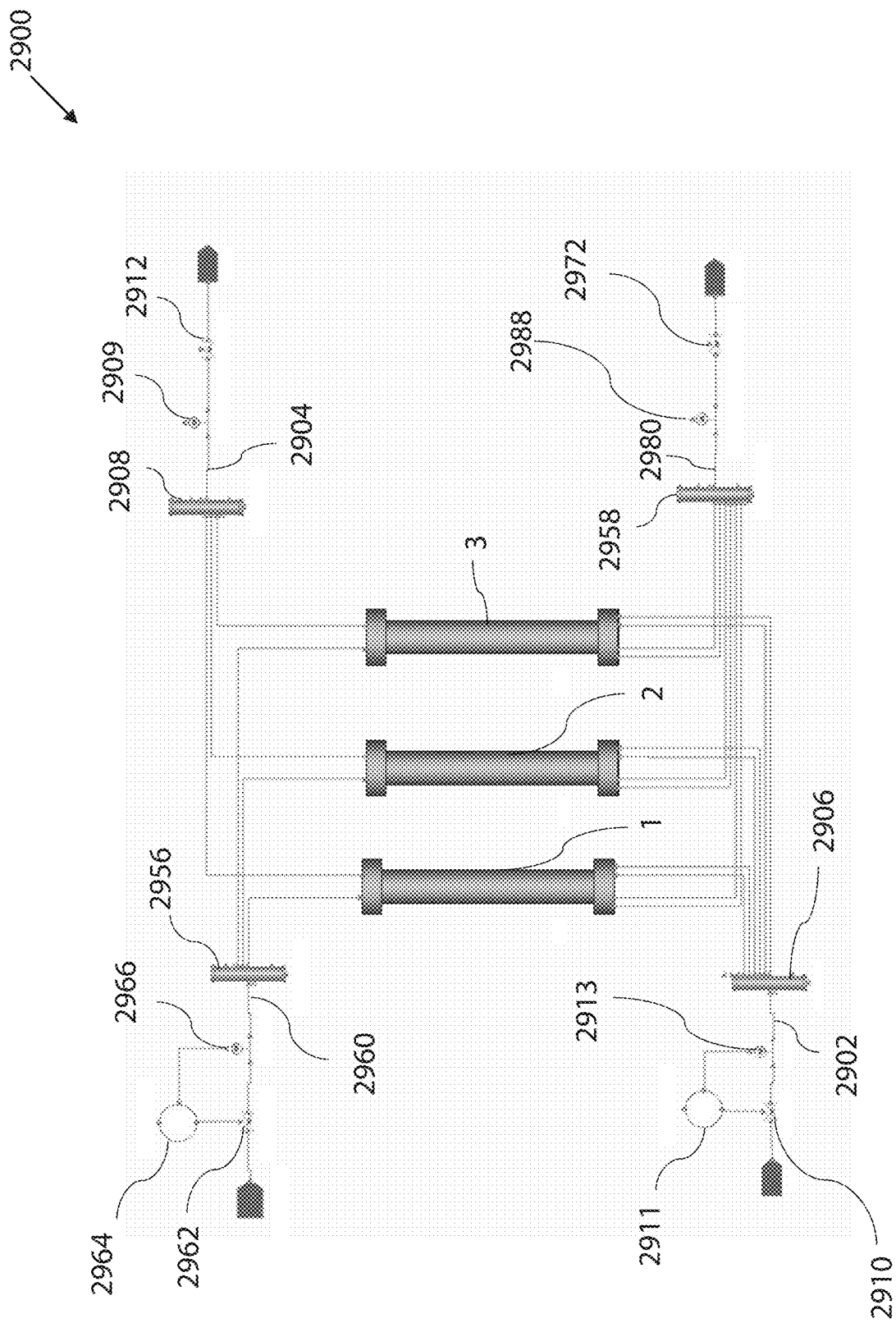
FIG. 21 is a schematic of a PSA system.

In this example, pulsation was evaluated using a dynamic general process modelling system (gPROMS) of a swing absorption bed system test unit, as exemplified by the schematic shown in FIG. 21. The evaluation of pulsation included evaluating the effects of valve design and timing on both flow and pressure pulsations. The test unit included three (3) absorbent bed units, each having two upstream headers, including a feed header and a purge feed header, and two downstream headers, including a product header and a purge vent header. Flow controllers were operatively positioned upstream of each upstream header. Pressure controllers were operatively positioned adjacent each of product header.

With reference to FIG. 21, a schematic of an exemplary RCPSA system 2900 is depicted. System 2900 includes Beds 1-3. Each of Beds 1-3 are in fluid communication with a feed header 2906 and a product header 2908. When a vessel (bed) is operating in the adsorption stage, feed 2902 is provided to that vessel through feed header 2906. Passage of feed 2902 into feed header 2906 and Beds 1-3 is controlled via feed valve 2910, which may be a poppet valve as describe herein. The lifting, including step lifting, and closing of feed valve 2910 is controlled via feed controller 2911, which may be a proportional integral derivative (PID) controller. Flow rate of feed 2902 may be monitored via flow meter 2913. Product 2904 produced by Beds 1-3, when operating in the adsorption stage, passes out of Beds 1-3, through product header 2908, and through product valve 2912. Flow rate of product 2904 may be monitored via flow meter 2909. When operating in the adsorption stage, purge feed valve 2962 and purge vent valve 2972 are closed.

Each of Beds 1-3 are in fluid communication with purge feed header 2956 and a purge vent header 2958. When a vessel (bed) is operating in the blowdown stage, feed 2902 is not provided to that vessel through feed header 2906. Passage of feed 2902 into feed header 2906 and Beds 1-3 is prevented via closing feed valve 2910 and closing product flow valve 2909. Purge feed 2960 is provided to the vessel undergoing blowdown via the purge feed header 2956 by opening purge feed valve 2962, which is controlled via valve controller 2964, such as a PID controller. The flow rate of purge feed 2960 is monitored via flow meter 2966. Purge feed 2960 flows through the vessels that are operating in the blowdown stage, flows through the purge vent header 2958, and through the purge vent valve 2972 as purge vent 2980. Flow rate of the purge vent 2980 may be monitored via flow meter 2988.

When transitioning one of Beds 1-3 into the re-pressurization stage, valves 2956 and 2958 are closed, and valve 2910 is opened. As the bed transitioning into the re-pressurization stage is at a low pressure relative to the pressure of the feed 2902 in the header 2906, the flow modulation techniques described herein are utilized to modulate flow disturbances through system 2900. Feed valve 2910 is first step lifted, while product valve 2912 is maintained closed. Feed valve 2910 is then fully lifted, either before or simultaneously with the full opening of product valve 2912.

When transitioning one of Beds 1-3 into the blowdown stage, valves 2910 and 2912 are closed, and valve 2988 is opened. As the bed transitioning into the blowdown stage is, at first, at a high pressure relative to the pressure in purge header 2958, the flow modulation techniques described herein are utilized to modulate flow disturbances through system 2900. Valve 2988 is first step lifted, while valve 2962 is maintained closed. Valve 2988 is then fully lifted, either before or simultaneously with the full opening of valve 2962.

In system 2900, feed valve 2910 may be a reverse acting poppet valve that includes a plug and/or counterbore, as described herein; product valve 2912 may be a reverse acting poppet valve; purge fed valve 2962 may be a conventional acting poppet valve with a plug and/or counterbore as described herein; and purge vent valve 2972 may be a conventional acting poppet valve with a plug and/or counterbore as described herein.

Thus, the flow modulation techniques, including step lifting and the use of flow restriction aids, are applicable to both the blowdown stage and the re-pressurization stage.

Four case studies were examined in the example, including: Case 1, where no pulsation control methods were implemented (base case); Case 2, where increased header volume was utilized relative to Case 1; Case 3, where a step lift was utilized; and Case 4, where a step lift controlled was utilized and a poppet including a plug was utilized.

In the example, the valve opening speed was maintained between 100 and 700 ms, and the smallest opening step was a 1 mm step lift. The allowable criteria, per the American Petroleum Institute (API) standard, API 618, is set forth in Table A, below.

TABLE A

| Allowable Criteria from API 618 | Feed Gas | Purge Gas |
| --- | --- | --- |
| Pressure (psia) | 1000 | 300 |
| % peak-to-peak pulsation | 1 | 1.50 |
| Pressure peak-to-peak pulsation (psi) | 10 | 4.5 |

In the gPROMS model, the following parameters/criteria were modeled: no adsorption, perfectly mixed headers, real poppet valve behavior, RP and BD step modeled with separate valves, and PI controllers for flow (not tuned to control for pulsations). Three complete cycles were simulated using the gPROMS model for a total of 265 seconds with the ABUs at a 24 second offset, feed controlled at 20 thousand standard cubic feet per day (MSCFD), and the purge feed controlled at 18 MSCFD.

In the simulation, the valve offset was tuned to minimize pulsations due to bed switching. The offset was required due to bed-to-bed differential pressure, which reflected the differential pressure driving force, was different for the feed and purge, and resulted in less than 24 s step times. The resulting pressure pulsations were well within the API 618 tolerances. The flow pulsations were slightly elevated with: $\frac{1}{24}s = 0.04$ Hz frequency. The valve and timing summary are set forth in Table B, below.

TABLE B

| Service | Lift Name | Lift (mm) | MP_open (s) | MP_close (s) | Duration (s) | V0 (1/s) | Width (s) |
|---|---|---|---|---|---|---|---|
| Hold | — | | | | | | |
| Blowdown | VBD | 24.5 | 3.5 | 6.5 | 3 | 3 | 0.981 |
| Hold | — | | | | | | |
| Purge | V1b | 24.5 | 12.125 | 36 | 23.875 | 3 | 0.981 |
| Purge vent | V2b | 24.5 | 12.125 | 36 | 23.875 | 3 | 0.981 |
| Hold | — | | | | | | |
| Re-Pressure | VRP | 18.585 | 39.5 | 42.5 | 3 | 3 | 0.981 |
| Hold | — | | | | | | |
| Feed | V1a | 18.585 | 48.1 | 72 | 23.9 | 3 | 0.981 |
| Product | V2a | 18.585 | 48.1 | 72 | 23.9 | 3 | 0.981 |

Table C sets forth results of the simulation.

TABLE C

| Pressure Pulsation | |
|---|---|
| Feed | 0.13% |
| Product | 0.00% |
| Purge Feed | 0.03% |
| Purge Vent | 0.01% |
| Flow Pulsation | |
| Feed | 1.95% |
| Product | 3.07% |
| Purge Feed | 0.28% |
| Purge Vent | 4.79% |

Figure 22:
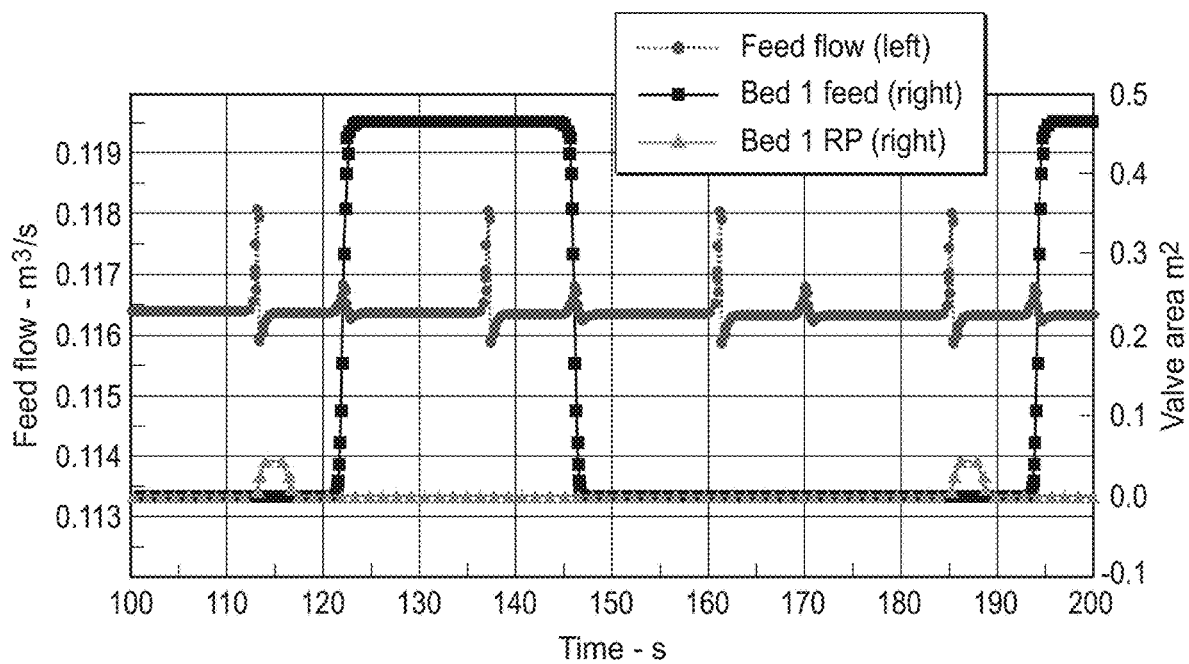
FIGS. 22-25 are plots of flow rate and valve area versus time from the Examples disclosed herein.
Figure 23:
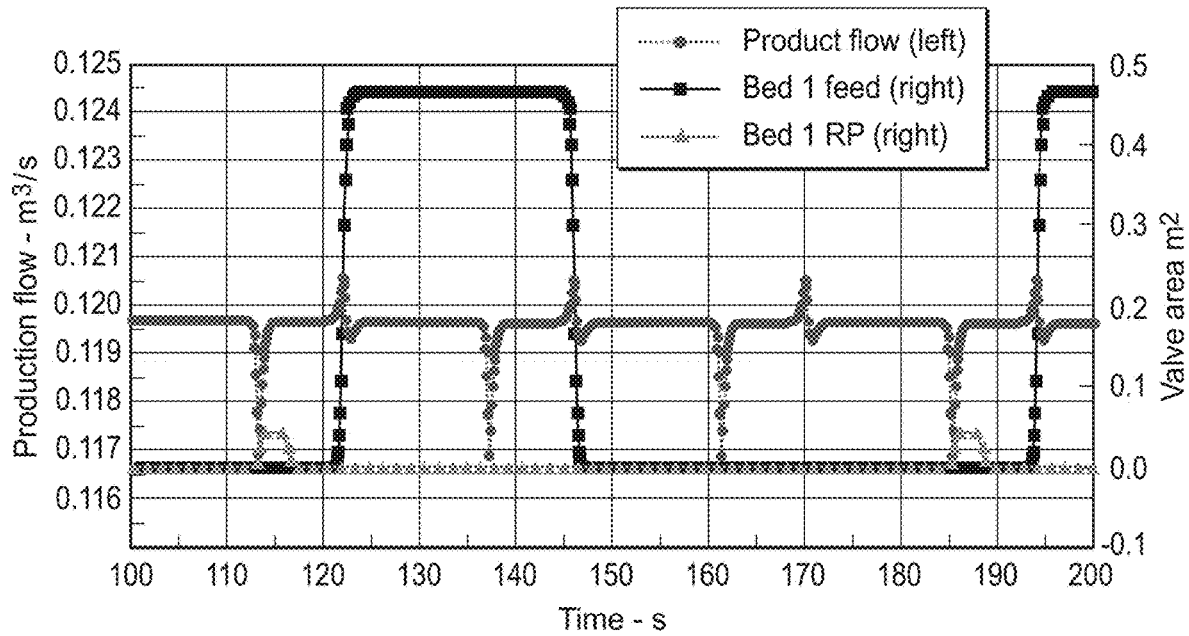

The graph shown in FIG. 22 shows the feed header flow pulsation, plotting time (s) vs. both feed flow (m³/s) and valve area (m²) for feed flow, bed 1 feed, and bed 1 RP. The graph shown in FIG. 23 shows the product header flow pulsation, plotting time (s) vs. both product flow (m³/s) and valve area (m²) for product flow, bed 1 feed, and bed 1 RP. With reference to FIGS. 22 and 23, the pulsations in the feed and product headers were dominated by the RP step.

Figure 24:
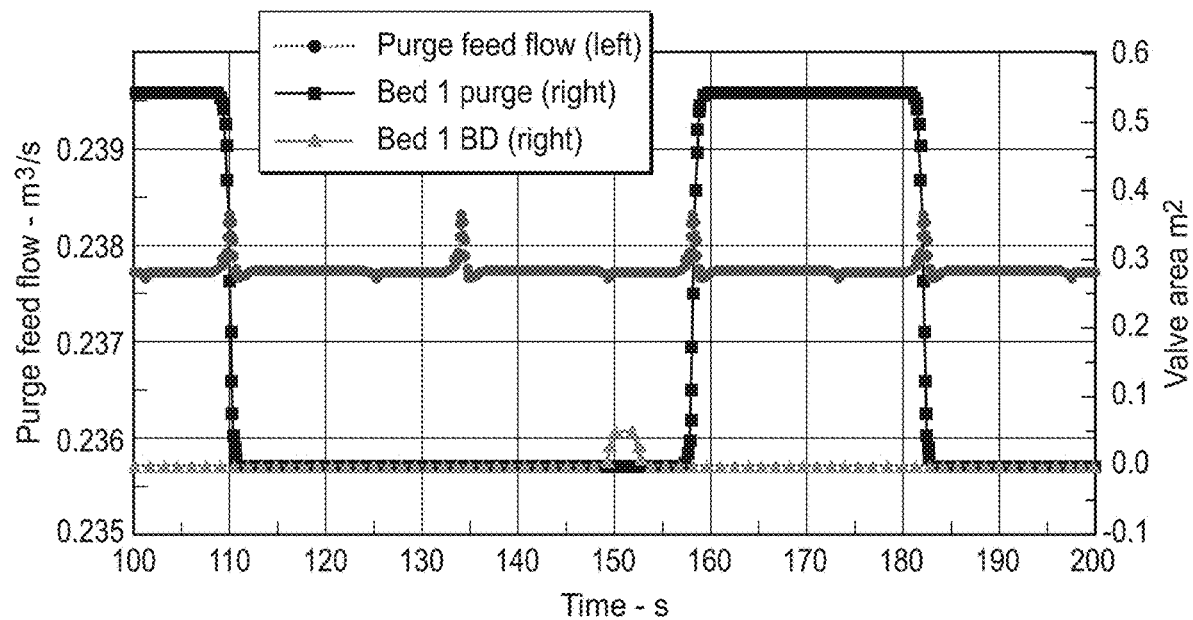
Figure 25:
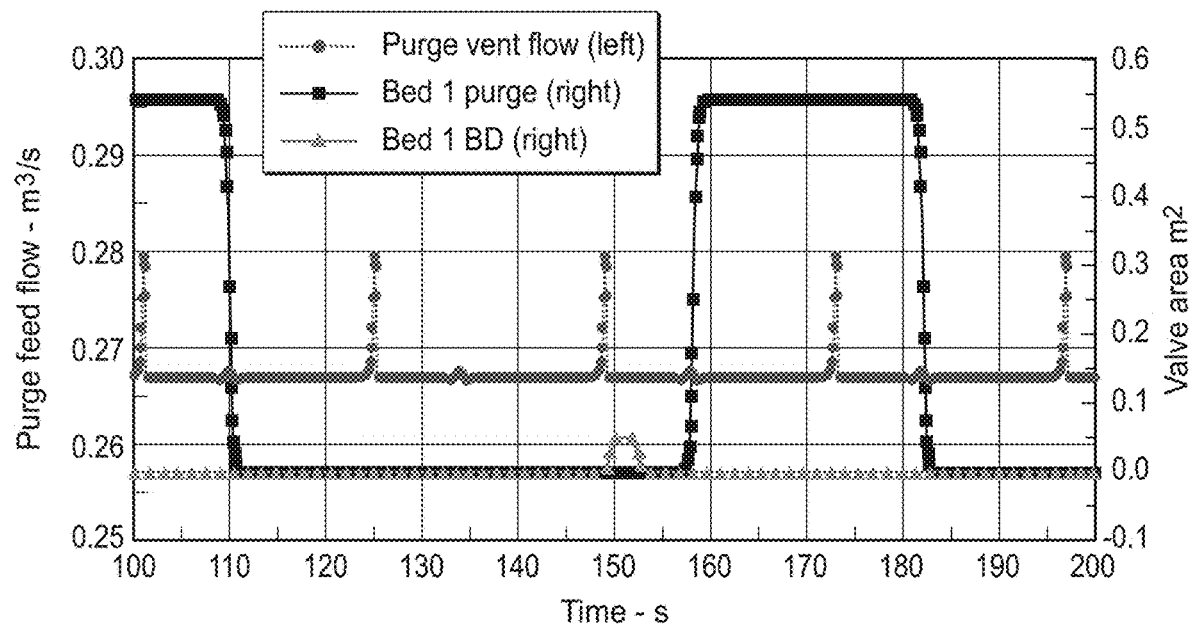

The graph shown in FIG. 24 shows the purge feed header flow pulsation, plotting time (s) vs. both purge feed flow (m³/s) and valve area (m²) for purge feed flow, bed 1 purge, and bed 1 BD. The graph shown in FIG. 25 shows the purge vent header flow pulsation, plotting time (s) vs. both purge vent flow (m³/s) and valve area (m²) for purge vent flow, bed 1 purge, and bed 1 BD. With reference to FIGS. 24 and 25, the pulsations in the purge vent header were dominated by the BD step.

Tables D, E, F, and G set forth results of the simulations for Case 1, Case 2, Case 3, and Case 4, respectively, showing relative pulsations data.

TABLE D

Case 1—No Control

| | Base V0 = 3 | Base V0 = 6 |
|---|---|---|
| Pressure Pulsation | | |
| Feed | 0.13% | 0.45% |

TABLE D-continued

Case 1—No Control

| | Base V0 = 3 | Base V0 = 6 |
|---|---|---|
| Product | 0.00% | 0.01% |
| Purge Feed | 0.03% | 0.57% |
| Purge Vent | 0.01% | 0.04% |
| Flow Pulsation | | |
| Feed | 1.95% | 9.06% |
| Product | 3.07% | 13.34% |
| Purge Feed | 0.28% | 16.29% |
| Purge Vent | 4.79% | 24.94% |

TABLE E

Case 2—Header Volume Control

| | Option 4 | Option 1 | 2X Option 1 |
|---|---|---|---|
| Pressure Pulsation | | | |
| Feed | 0.16% | 0.13% | 0.10% |
| Product | 0.00% | 0.00% | 0.00% |
| Purge Feed | 0.04% | 0.03% | 0.03% |
| Purge Vent | 0.01% | 0.01% | 0.01% |
| Flow Pulsation | | | |
| Feed | 2.95% | 1.95% | 1.37% |
| Product | 3.58% | 3.07% | 2.58% |
| Purge Feed | 0.34% | 0.28% | 0.37% |
| Purge Vent | 4.80% | 4.79% | 5.08% |

TABLE F

Case 3—Step Lift Control

| | Base | 1 mm lift |
|---|---|---|
| Pressure Pulsation | | |
| Feed | 0.13% | 0.12% |
| Product | 0.00% | 0.00% |
| Purge Feed | 0.03% | 0.03% |
| Purge Vent | 0.01% | 0.01% |
| Flow Pulsation | | |
| Feed | 1.95% | 2.05% |
| Product | 3.07% | 3.05% |
| Purge Feed | 0.28% | 0.28% |
| Purge Vent | 4.79% | 4.41% |

TABLE G

Case 4—Step Lift and Plug Poppet Control

| | Base | Step Lift and Plug Poppet Control |
|---|---|---|
| Pressure Pulsation | | |
| Feed | 0.13% | 0.07% |
| Product | 0.00% | 0.00% |
| Purge Feed | 0.03% | 0.03% |
| Purge Vent | 0.01% | 0.00% |
| Flow Pulsation | | |
| Feed | 1.95% | 0.81% |
| Product | 3.07% | 2.08% |
| Purge Feed | 0.28% | 0.28% |
| Purge Vent | 4.79% | 2.13% |

Tables H, I, J, and K set forth results of the simulations for Case 1, Case 2, Case 3, and Case 4, respectively, showing absolute pulsations data.

TABLE H

Case 1—No Control

|  | Base V0 = 3 | Base V0-6 |
|---|---|---|
| Pressure Pulsation (psi) | | |
| Feed | 1.18 | 4.20 |
| Product | 0.02 | 0.09 |
| Purge Feed | 0.14 | 2.55 |
| Purge Vent | 0.03 | 0.17 |
| Flow Pulsation (ACFM) | | |
| Feed | 4.82 | 22.34 |
| Product | 7.79 | 33.81 |
| Purge Feed | 1.40 | 82.06 |
| Purge Vent | 27.16 | 141.48 |

TABLE I

Case 2—Header Volume Control

|  | Option 4 | Option 1 | 2X Option 1 |
|---|---|---|---|
| Pressure Pulsation (psi) | | | |
| Feed | 1.48 | 1.18 | 0.90 |
| Product | 0.03 | 0.02 | 0.02 |
| Purge Feed | 0.16 | 0.14 | 0.14 |
| Purge Vent | 0.03 | 0.03 | 0.03 |
| Flow Pulsation (ACFM) | | | |
| Feed | 7.27 | 4.82 | 3.39 |
| Product | 9.07 | 7.79 | 6.54 |
| Purge Feed | 1.69 | 1.40 | 1.85 |
| Purge Vent | 27.19 | 27.16 | 28.77 |

TABLE J

Case 3—Step Lift Control

|  | Base | 1 mm lift |
|---|---|---|
| Pressure Pulsation (psi) | | |
| Feed | 1.18 | 1.16 |
| Product | 0.02 | 0.02 |
| Purge Feed | 0.14 | 0.14 |
| Purge Vent | 0.03 | 0.03 |
| Flow Pulsation (ACFM) | | |
| Feed | 4.82 | 5.05 |
| Product | 7.79 | 7.72 |
| Purge Feed | 1.40 | 1.40 |
| Purge Vent | 27.16 | 24.98 |

TABLE K

Case 4—Step Lift and Plug Poppet Control

|  | Base | Step Lift and Plug Poppet Control |
|---|---|---|
| Pressure Pulsation (psi) | | |
| Feed | 1.18 | 0.69 |
| Product | 0.02 | 0.01 |
| Purge Feed | 0.14 | 0.14 |
| Purge Vent | 0.03 | 0.01 |
| Flow Pulsation (ACFM) | | |
| Feed | 4.82 | 2.00 |
| Product | 7.79 | 5.28 |
| Purge Feed | 1.40 | 1.40 |
| Purge Vent | 27.16 | 12.08 |

In Tables A through K the parameters $v_o$ and $v_c$ set the duration of the opening and closing ramps as shown in the following formula for the dimensionless displacement of the poppet as a function of time, T.

$$Disp(T) := \sqrt{\left(\frac{1 + \tanh\left(v_o \cdot mp_o \cdot \left(\frac{T-\phi}{mp_o} - 1\right)\right)}{2} \cdot \frac{1 + \tanh\left(v_c \cdot mp_c \cdot \left(1 - \frac{T-\phi}{mp_c}\right)\right)}{2}\right)}$$

The constants $mp_o$ and $mp_c$ are the mid-points of the opening and closing ramps of a vessel respectively, while the constant $\phi$ is the time offset between movement of a valve in the same service in each vessel in turn. The displacement, Disp(T) varies from 0=closed, to 1=fully open. Tan h is the hyperbolic tangent, which gives smooth ramps, but other parameterizations are possible.

Summary of Results

The data produced in this example demonstrates that pulsations formed by adsorbent bed switching can be reduced or eliminated by adjusting the valve offset, attaining pressure pulsations within the API 618 specifications. Flow pulsations of up to about 5% were exhibited, but at a low frequency (e.g., about 0.04 Hz).

After tuning out the adsorbent bed switching effect, pulsations were dominated by valve dynamics during the RP and BD steps.

Without being bound by theory, it is believed that minimum achievable valve movement velocity will facilitate dampening of these valve-associated pulsations. It was found that addition of a plug to the poppet valve achieved greater pulsation dampening in comparison to use of a minimum lift of 1 mm without use of the plug. The pulsations were found to be relatively unaffected by header volume. Thus, the addition of a plug to the poppet valve was found to significantly dampen pulsations due to the RP and BD steps.

Conclusions

In conclusion, during the RP and BD steps of a PSA method, use of a slow valve movement within a dwell time of 1 to 20 seconds will facilitate dampening of pulsations caused by such valve movements. If V0=3 l/s is achieved, then additional control may not be necessary. With regards to the pulsation control strategies analyzed, the use of a plug on the poppet was found to have a greater effect in comparison to both header volume variations and the use of a step lift without the plug. Pulsations due to bed switching can be reduced or eliminated by fine tuning the valve timing offsets.

One skilled in the art would understand that the methods, systems, and apparatus described with respect to FIGS. 1-26 described herein may be used in combination with the methods, systems, and apparatus described with respect to FIGS. 1-15E of the incorporated '155 Publication.

EMBODIMENTS

Below, various embodiments and combinations thereof are described.

Embodiment 1

A cyclical swing adsorption process for removing contaminants from a gaseous feed stream, said process comprising: operating a system having at least two adsorption bed vessels sharing a common inlet header and operable in fluid communication, whereby the absorbent bed vessels are operated simultaneously, with each vessel being cyclically operable through swing adsorption process cycles to produce a product stream from the feed stream; during simultaneous operation of the at least two adsorption bed vessels through respective adsorption process cycles, transitioning a first adsorption bed vessel of the at least two adsorption bed vessels from a first stage in the adsorption process cycle to a second stage in the adsorption process cycle, wherein, in said first stage said first adsorption bed vessel is fluidly isolated from the second adsorption bed vessel and the common inlet header by at least one inlet valve installation disposed in a closed position and operating under a working pressure difference of P0-P1, while the gaseous feed stream is directed to the second adsorption bed vessel from the common inlet header; wherein said transitioning includes opening the inlet valve installation of the first adsorption bed vessel to direct at least a portion of the feed stream from the common inlet header into the first adsorption bed vessel, wherein, before said opening, a working pressure, P1, in the first adsorption bed vessel is less than 50% of a system pressure, P0, upstream of the inlet valve installation; wherein said opening the inlet valve installation of the first adsorption bed vessel includes lifting the inlet valve installation of the first adsorption bed vessel from the closed position to a partially lifted position; after lifting the inlet valve installation, maintaining the inlet valve installation in the partially lifted position for a period of time; and after maintaining the inlet valve installation in the partially lifted position for the period of time, further lifting the inlet valve installation of the first adsorption bed vessel from the partially lifted position to a more open position at which position the feed stream continues to be directed to the first adsorption bed vessel prior to completion of the second stage.

Embodiment 2

The process of embodiment 1, wherein, prior to said opening of said inlet valve installation of the first adsorption bed vessel, said system pressure, P0, is more than twice said working pressure, P1.

Embodiment 3

The process of embodiment 2, wherein P1/P0 is 0.53 or less.

Embodiment 4

The process of any of embodiments 1-3, wherein said transitioning includes transitioning the first adsorption bed vessel to a re-pressurization stage, while said second adsorption bed vessel is operated in an adsorption stage and the product stream is directed therefrom.

Embodiment 5

The process of any of embodiments 1-4, wherein: said transitioning includes transitioning the first adsorption bed vessel to a re-pressurization stage, while said second adsorption bed vessel is operated in an adsorption stage and a product stream is directed therefrom; wherein transitioning the first adsorption bed vessel to the re-pressurization stage includes opening the inlet valve installation of the first adsorption bed vessel to introduce the feed stream into the first adsorption bed vessel and opening an outlet valve installation of the first adsorption bed vessel to produce the product feed stream from the first adsorption bed vessel, wherein a dwell time occurs between the opening of the inlet valve installation of the first adsorption bed vessel and the outlet valve installation of the first adsorption bed vessel, such that the inlet valve installation is opened prior to the outlet valve installation; or wherein said transitioning includes transitioning the first adsorption bed vessel to a blowdown stage, while said second adsorption bed vessel is operated in an adsorption stage and the product stream is directed therefrom; wherein transitioning the first adsorption bed vessel to the blowdown stage includes opening a purge product valve of the first adsorption bed vessel to vent a purge product stream from the first adsorption bed vessel and opening a purge feed valve of the first adsorption bed vessel to introduce a purge feed stream to the first adsorption bed vessel, wherein a dwell time occurs between the opening of the purge product valve of the first adsorption bed vessel and the purge feed valve of the first adsorption bed vessel, such that the purge product valve is opened prior to the purge feed valve.

Embodiment 6

The process of any of embodiments 1-5, wherein said opening of said inlet valve installation of the first adsorption bed vessel includes lifting the inlet valve installation by at least 5% and less than 100% of a full valve lift of the inlet valve installation, wherein the at least 5% valve lift corresponds to a valve flow area that is less than a valve flow area of the inlet valve installation when fully opened to a 100% valve lift.

Embodiment 7

The process of any of embodiments 1-6, wherein said opening of the inlet valve installation includes lifting the inlet valve installation through a lift range that includes a discrete lift range, wherein the discrete lift range corresponds to a flow area response characterized by a constant available flow area through the inlet valve installation.

Embodiment 8

The process of embodiment 7, wherein said opening of the inlet valve installation includes lifting the inlet valve installation to a partially lift position that falls within said discrete lift range.

Embodiment 9

The process of embodiment 8, wherein said partially lifted position is greater than 5% of a full lift of the inlet valve installation and less than 100% of the full lift.

Embodiment 10

The process of embodiment 8, wherein said opening of the inlet valve installation includes lifting the inlet valve installation to said partially lift position and holding said inlet valve installation at said partially lifted position for a discrete period of time.

Embodiment 11

The process of any of embodiments 1-10, wherein said simultaneous operation includes operating each adsorption bed vessel through a cycle comprising a sequence of, at least, an adsorption stage, a blowdown stage, a purge stage, and a re-pressurization stage.

Embodiment 12

The process of any of embodiments 1-11, wherein said transitioning includes transitioning the first adsorption bed vessel to a blowdown stage, while said second adsorption bed vessel is operated in an adsorption stage and the product stream is directed therefrom.

Embodiment 13

The process of any of embodiments 1-12, further comprising providing a flow restriction aid on the inlet valve installation, wherein, within the discrete lift range, the flow area through the inlet valve installation is defined by a clearance between the flow restriction aid and a portion of the inlet valve installation.

Embodiment 14

The process of embodiment 13, wherein the inlet valve installation is a poppet valve including a valve body having a bore therethrough and a valve stem positioned within the bore, the valve stem including a disc, and wherein the flow restriction aid includes a plug coupled with or integral with the valve stem or an annular restriction of the bore.

Embodiment 15

The process of embodiment 14, further comprising wherein the plug comprises serrations or slots.

Embodiment 16

The process of embodiment 13, wherein the inlet valve installation is a poppet valve including a valve body having a bore therethrough and a valve stem positioned within the bore, the valve stem including a disc, wherein the flow restriction aid further comprises a series of discrete flat surfaces on the outer circumference of the disc.

Embodiment 17

In a cyclical swing adsorption process, a method of modulating introduction of fluid flow into a first absorbent bed vessel, wherein the first absorbent bed vessel is part of an adsorption process system including at least two adsorption bed vessels sharing a common inlet header and configured in fluid communication, said method comprising: during transitioning of the first adsorbent bed vessel from a first stage in a swing adsorption cycle to a second stage in the cycle, opening an inlet valve installation into the first adsorption bed vessel to direct a feed stream from the common inlet header into the first adsorbent bed vessel, wherein, prior to said opening, a system pressure, P0, upstream of the inlet valve installation is more than a working pressure, P1, said transitioning occurring while a second adsorbent bed vessel is simultaneously operating in an adsorption stage of the cycle; wherein said opening the inlet valve installation includes lifting the inlet valve installation through a lift range from a closed position to a second, partially open position, whereby in lifting through said lift range, the inlet valve installation passes through at least an initial lift range wherein an available flow area through the inlet valve installation, in response to the percent lift of the inlet valve installation, is characterized by an initial slope and a second subsequent lift range wherein the available flow area through the inlet valve installation, in response to the percent lift of the inlet valve installation, is characterized by a reduced slope.

Embodiment 18

The method of embodiment 17, wherein said second subsequent lift range is characterized by a constant available flow area through the inlet valve installation, in response to the percent lift of the inlet valve installation.

Embodiment 19

The method of any of embodiments 17 and 18, wherein said opening the inlet valve installation includes lifting the inlet valve installation from the closed position to the partially open position, and then further lifting the inlet valve installation from the partially open position to a second open position.

Embodiment 20

The method of embodiment 19, wherein said second open position corresponds to a full opening of the inlet valve installation and a full, 100%, lift of the inlet valve installation.

Embodiment 21

The method of any of embodiments 17-20, wherein P1/P0 is 0.53 or less.

Embodiment 22

The method of any of embodiments 17-21, wherein said opening of said inlet valve installation occurs while transitioning the first adsorption bed vessel to a re-pressurization stage in the cycle, while said second adsorption bed vessel is operated in an adsorption stage in the cycle and a product stream is directed therefrom.

Embodiment 23

The method of any of embodiments 17-22, wherein: said transitioning includes transitioning the first adsorption bed vessel to a re-pressurization stage, while said second adsorption bed vessel is operated in an adsorption stage and a product stream is directed therefrom; wherein transitioning the first adsorption bed vessel to the re-pressurization stage includes opening the inlet valve installation of the first adsorption bed vessel to introduce the feed stream into the first adsorption bed vessel and opening an outlet valve installation of the first adsorption bed vessel to produce the product feed stream from the first adsorption bed vessel, wherein a dwell time occurs between the opening of the inlet valve installation of the first adsorption bed vessel and the outlet valve installation of the first adsorption bed vessel, such that the inlet valve installation is opened prior to the outlet valve installation; or said transitioning includes transitioning the first adsorption bed vessel to a blowdown stage, while said second adsorption bed vessel is operated in an adsorption stage and the product stream is directed therefrom; wherein transitioning the first adsorption bed vessel to the blowdown stage includes opening a purge product valve of the first adsorption bed vessel to vent a purge product stream from the first adsorption bed vessel and opening a purge feed valve of the first adsorption bed vessel to introduce a purge feed stream to the first adsorption bed vessel, wherein a dwell time occurs between the opening of the purge product valve of the first adsorption bed vessel and the purge feed valve of the first adsorption bed vessel, such that the purge product valve is opened prior to the purge feed valve.

Embodiment 24

The method of any of embodiments 17-23, wherein said opening of the inlet valve installation includes lifting the inlet valve installation from the closed position to the partially open position, and then further lifting the inlet valve installation from the partially open position to a second open position, wherein said partially open position falls within a discrete lift range of the inlet valve installation wherethrough an available flow area through the inlet valve installation is maintained constant.

Embodiment 25

The method of embodiment 24, wherein said discrete lift range has an upper limit of from 15% to 25% of a total lift of the inlet valve installation, and wherein the available flow area through the inlet valve installation that corresponds to the discrete lift range is less than the available flow area corresponding to a 100% lift of the inlet valve installation.

Embodiment 26

The method of any of embodiments 17-25, wherein said opening the inlet valve installation includes lifting the inlet valve installation to said partially open position and holding said inlet valve installation at said partially open position for a discrete period of time.

Embodiment 27

The method of any of embodiments 17-26, wherein said transitioning includes transitioning the first adsorption bed vessel to a blowdown stage, while said second adsorption bed vessel is operated in an adsorption stage and the product stream is directed therefrom.

Embodiment 28

The method of embodiment 24, further comprising providing a flow restriction aid on the inlet valve installation, wherein, within the discrete lift range, the flow area through the inlet valve installation is defined by a clearance between the flow restriction aid and a portion of the inlet valve installation.

Embodiment 29

The method of embodiment 28, wherein the inlet valve installation is a poppet valve including a valve body having a bore therethrough and a valve stem positioned within the bore, the valve stem including a disc, and wherein the flow restriction aid includes a plug coupled with or integral with the valve stem or an annular restriction of the bore.

Embodiment 30

The process of embodiment 29, further comprising wherein the plug comprises serrations or slots.

Embodiment 31

The process of embodiment 28, wherein the inlet valve installation is a poppet valve including a valve body having a bore therethrough and a valve stem positioned within the bore, the valve stem including a disc, wherein the flow restriction aid further comprises a series of discrete flat surfaces on the outer circumference of the disc.

Embodiment 32

In a system for simultaneously operating at least two absorbent bed vessels through respective cycles of a cyclical swing adsorption process for removing contaminants from a gaseous feed stream, wherein the two adsorption bed vessels share a common inlet header and are configured in fluid communication, a valve installation including a valve, for introducing fluid flow into one of said vessels, said valve installation comprising: a valve body having a flow through orifice and defining, at least partly, a fluid bore for communicating fluid flow through the valve; a valve stem supporting a disc movable in the fluid bore through a valve lift range between 0% lift and 100% lift; and a seat situated to receive the disc to seal the orifice at a valve position corresponding to 0% lift, wherein the disc is movable to disengage from the seat and to a second lift position to reveal an available flow area through which fluid flow passes from an upstream side of the valve to a downstream side; wherein the valve installation is characterized by a flow area response to valve lift over a range of valve lift; and wherein the valve installation further comprises a flow restriction aid disposed to define a restricted flow area over a discrete lift range of the valve, the restricted flow area being less than a restricted flow area defined, at least partly, by the disc over the discrete lift range.

Embodiment 33

The valve installation of embodiment 32, wherein said flow area response is constant over the discrete lift range.

Embodiment 34

The valve installation of any of embodiments 32 and 33, wherein said flow area response over the discrete lift range is characterized by a reduced slope that is less than a slope of the flow area response preceding the discrete lift range, said preceding the discrete lift range commencing at 0% lift and terminating at commencement of the discrete lift range.

Embodiment 35

The valve installation of any of embodiments 32-34, wherein the discrete lift range is from a 4% to 25% lift of the valve.

Embodiment 36

The valve installation of any of embodiments 32-35, wherein said flow restriction aid includes an obstruction extending longitudinally from the disc, the obstruction having a width or diameter less than that of the disc.

Embodiment 37

The valve installation of any of embodiments 32-36, wherein said disc is movable from the seat to provide flow area through the valve, the provided flow area defined, at least partly, by a clearance between the disc and the seat, wherein said restricted flow area over said discrete lift range is defined by clearance between said seat and said flow restriction aid over the discrete lift range.

Embodiment 38

The valve installation of any of embodiments 32-37, wherein a span of said discrete lift range corresponds, at least for a portion of the discrete lift range, to a longitudinal extension of the flow restriction aid.

Embodiment 39

The valve installation of any of embodiments 32-38, wherein said flow restriction aid is spaced from said disc and defines an internal wall of the fluid bore, such that said disc is movable from the flow restrictor through a lift range, and wherein clearance between said disc and said flow restriction aid defines, at least partly, the flow restricted area over said discrete lift range.

Embodiment 40

The valve installation of any of embodiments 32-39, wherein said flow restriction aid includes a ledge with which the disc is seatable at 0% lift to close the orifice.

Embodiment 41

The valve installation of any of embodiments 32-40, wherein the valve is poppet valve, wherein said disc is movable in the fluid bore to seat and close the orifice.

Embodiment 42

The valve installation of any of embodiments 32-41, wherein the flow restriction aid comprises a plug coupled with or integral with the valve stem, and wherein a clearance between the plug and the valve body defines the restricted flow area over the discrete lift range.

Embodiment 43

The valve installation of any of embodiments 32-42, wherein the flow restriction aid comprises an annular restriction of the fluid bore, and wherein a clearance between the disc and the annular restriction defines the restricted flow area over the discrete lift range.

Embodiment 44

The valve installation of any of embodiments 42-43, further comprising wherein the plug comprises serrations or slots.

Embodiment 45

The valve installation of any of embodiments 32-41, wherein the flow restriction aid further comprises wherein the disc comprises a series of discrete flat surfaces on the outer circumference of the disc.

For present purposes of description and, so as to highlight the contributions to the art of the present disclosure, certain terms are used herein and provided with special meaning. For example, a "valve" according to the disclosure may be described, in short, as having a certain restricted or available flow area or, further, flow rate or flow modulation response (noting that a change in available flow area for given conditions effect a flow modulation response). This flow modulation response refers to the change in available flow area or restricted flow are for a given valve lift (i.e., the movement of the disc, with or without a flow restricting aid such as a plug or a counterbore shrouding the poppet head). Exemplary valve responses are illustrated by FIG. 13, and the accompanying description and related FIGS. 8A-8C. In some instances, reference may be made to "flow area response to lift" or "flow area response" of a valve. It should be noted that the flow area, available flow area, and restricted flow area are used interchangeably, as these terms refer to the same flow conditions (perhaps, from, different perspectives), that is, the degree to which the flow orifice or bore associated with the valve is physically obstructed.

In view of the many possible applications to which the principles discussed herein may be applied, it should be recognized that the illustrative applications are only suitable examples and should not be taken as limiting the scope of the present disclosure.

What is claimed is:

1. A cyclical swing adsorption process for removing contaminants from a gaseous feed stream, said process comprising:
    operating a system having at least two adsorption bed vessels sharing a common inlet header and operable in fluid communication, whereby the absorbent bed vessels are operated simultaneously, with each vessel being cyclically operable through swing adsorption process cycles to produce a product stream from the feed stream;
    during simultaneous operation of the at least two adsorption bed vessels through respective adsorption process cycles, transitioning a first adsorption bed vessel of the at least two adsorption bed vessels from a first stage in the adsorption process cycle to a second stage in the adsorption process cycle, wherein, in said first stage said first adsorption bed vessel is fluidly isolated from the second adsorption bed vessel and the common inlet header by at least one inlet valve installation disposed in a closed position and operating under a working pressure difference of $P_0-P_1$, while the gaseous feed stream is directed to the second adsorption bed vessel from the common inlet header;
    wherein said transitioning includes opening the inlet valve installation of the first adsorption bed vessel to direct at least a portion of the feed stream from the common inlet header into the first adsorption bed vessel, wherein, before said opening, a system pressure, $P_0$, upstream of the inlet valve installation of the first adsorption bed vessel is less than 50% of the working pressure, $P_1$; and wherein said opening the inlet valve installation of the first adsorption bed vessel includes lifting the inlet valve installation of the first adsorption bed vessel from the closed position to a partially lifted position; after lifting the inlet valve installation, maintaining the inlet valve installation in the partially lifted position for a period of time; and after maintaining the inlet valve installation in the partially lifted position for the period of time, further lifting the inlet valve installation of the first adsorption bed vessel from the partially lifted position to a more open position at which position the feed stream continues to be directed to the first adsorption bed vessel prior to completion of the second stage.

2. The process of claim 1, wherein $P_1/P_0$ is 0.53 or less.

3. The process of claim 1, wherein said transitioning includes transitioning the first adsorption bed vessel to a re-pressurization stage, while said second adsorption bed vessel is operated in an adsorption stage and the product stream is directed therefrom.

4. The process of claim 1, wherein:
said transitioning includes transitioning the first adsorption bed vessel to a re-pressurization stage, while said second adsorption bed vessel is operated in an adsorption stage and a product stream is directed therefrom; wherein transitioning the first adsorption bed vessel to the re-pressurization stage includes opening the inlet valve installation of the first adsorption bed vessel to introduce the feed stream into the first adsorption bed vessel and opening an outlet valve installation of the first adsorption bed vessel to produce the product feed stream from the first adsorption bed vessel, wherein a dwell time occurs between the opening of the inlet valve installation of the first adsorption bed vessel and the outlet valve installation of the first adsorption bed vessel, such that the inlet valve installation is opened prior to the outlet valve installation; or
said transitioning includes transitioning the first adsorption bed vessel to a blowdown stage, while said second adsorption bed vessel is operated in an adsorption stage and the product stream is directed therefrom; wherein transitioning the first adsorption bed vessel to the blowdown stage includes opening a purge product valve of the first adsorption bed vessel to vent a purge product stream from the first adsorption bed vessel and opening a purge feed valve of the first adsorption bed vessel to introduce a purge feed stream to the first adsorption bed vessel, wherein a dwell time occurs between the opening of the purge product valve of the first adsorption bed vessel and the purge feed valve of the first adsorption bed vessel, such that the purge product valve is opened prior to the purge feed valve.

5. The process of claim 1, wherein said opening of said inlet valve installation of the first adsorption bed vessel includes lifting the inlet valve installation by at least 5% and less than 100% of a full valve lift of the inlet valve installation, wherein the at least 5% valve lift corresponds to a valve flow area that is less than a valve flow area of the inlet valve installation when fully opened to a 100% valve lift.

6. The process of claim 1, wherein said opening of the inlet valve installation includes lifting the inlet valve installation through a lift range that includes a discrete lift range, wherein the discrete lift range corresponds to a flow area response characterized by a constant available flow area through the inlet valve installation, wherein inlet valve installation is lifted to a partially lift position that falls within said discrete lift range and is held at said partially lifted position for a discrete period of time.

7. The process of claim 1, wherein said transitioning includes transitioning the first adsorption bed vessel to a blowdown stage, while said second adsorption bed vessel is operated in an adsorption stage and the product stream is directed therefrom.

8. The process of claim 6, further comprising providing a flow restriction aid on the inlet valve installation, wherein, within the discrete lift range, the flow area through the inlet valve installation is defined by a clearance between the flow restriction aid and a portion of the inlet valve installation.

9. The process of claim 8, wherein the inlet valve installation is a poppet valve including a valve body having a bore therethrough and a valve stem positioned within the bore, the valve stem including a disc, and wherein the flow restriction aid includes a plug coupled with or integral with the valve stem or an annular restriction of the bore.

10. The process of claim 9, further comprising wherein the plug comprises serrations or slots.

11. The process of claim 8, wherein the inlet valve installation is a poppet valve including a valve body having a bore therethrough and a valve stem positioned within the bore, the valve stem including a disc, wherein the flow restriction aid further comprises a series of discrete flat surfaces on the outer circumference of the disc.

12. In a cyclical swing adsorption process, a method of modulating introduction of fluid flow into a first absorbent bed vessel, wherein the first absorbent bed vessel is part of an adsorption process system including at least two adsorption bed vessels sharing a common inlet header and configured in fluid communication, said method comprising:
during transitioning of the first adsorbent bed vessel from a first stage in a swing adsorption cycle to a second stage in the cycle, opening an inlet valve installation into the first adsorption bed vessel to direct a feed stream from the common inlet header into the first adsorbent bed vessel, wherein, prior to said opening, a system pressure, $P_0$, upstream of the inlet valve installation is more than a working pressure, $P_1$, said transitioning occurring while a second adsorbent bed vessel is simultaneously operating in an adsorption stage of the cycle;
wherein said opening the inlet valve installation includes lifting the inlet valve installation through a lift range from a closed position to a second, partially open position, whereby in lifting through said lift range, the inlet valve installation passes through at least an initial lift range wherein an available flow area through the inlet valve installation, in response to the percent lift of the inlet valve installation, is characterized by an initial slope and a second subsequent lift range wherein the available flow area through the inlet valve installation, in response to the percent lift of the inlet valve installation, is characterized by a reduced slope.

13. The method of claim 12, wherein said opening the inlet valve installation includes lifting the inlet valve installation from the closed position to the partially open position, and then further lifting the inlet valve installation from the partially open position to a second open position.

14. The method of claim 13, wherein said opening of said inlet valve installation occurs while transitioning the first adsorption bed vessel to a re-pressurization stage in the cycle, while said second adsorption bed vessel is operated in an adsorption stage in the cycle and a product stream is directed therefrom.

15. The method of claim 14, wherein:
said transitioning includes transitioning the first adsorption bed vessel to a re-pressurization stage, while said second adsorption bed vessel is operated in an adsorption stage and a product stream is directed therefrom; wherein transitioning the first adsorption bed vessel to the re-pressurization stage includes opening the inlet valve installation of the first adsorption bed vessel to introduce the feed stream into the first adsorption bed vessel and opening an outlet valve installation of the first adsorption bed vessel to produce the product feed stream from the first adsorption bed vessel, wherein a dwell time occurs between the opening of the inlet valve installation of the first adsorption bed vessel and the outlet valve installation of the first adsorption bed vessel, such that the inlet valve installation is opened prior to the outlet valve installation; or
said transitioning includes transitioning the first adsorption bed vessel to a blowdown stage, while said second adsorption bed vessel is operated in an adsorption stage and the product stream is directed therefrom; wherein transitioning the first adsorption bed vessel to the blowdown stage includes opening a purge product valve of the first adsorption bed vessel to vent a purge product stream from the first adsorption bed vessel and opening a purge feed valve of the first adsorption bed vessel to introduce a purge feed stream to the first adsorption bed vessel, wherein a dwell time occurs between the opening of the purge product valve of the first adsorption bed vessel and the purge feed valve of the first adsorption bed vessel, such that the purge product valve is opened prior to the purge feed valve.

16. In a system for simultaneously operating at least two absorbent bed vessels through respective cycles of a cyclical swing adsorption process for removing contaminants from a gaseous feed stream, wherein the two adsorption bed vessels share a common inlet header and are configured in fluid communication, a valve installation including a valve, for introducing fluid flow into one of said vessels, said valve installation comprising:
a valve body having a flow through orifice and defining, at least partly, a fluid bore for communicating fluid flow through the valve;
a valve stem supporting a disc movable in the fluid bore through a valve lift range between 0% lift and 100% lift; and
a seat situated to receive the disc to seal the orifice at a valve position corresponding to 0% lift, wherein the disc is movable to disengage from the seat and to a second lift position to reveal an available flow area through which fluid flow passes from an upstream side of the valve to a downstream side;
wherein the valve installation is characterized by a flow area response to valve lift over a range of valve lift; and
wherein the valve installation further comprises a flow restriction aid disposed to define a restricted flow area over a discrete lift range of the valve, the restricted flow area being less than a restricted flow area defined, at least partly, by the disc over the discrete lift range.

17. The valve installation of claim 16, wherein said flow area response over the discrete lift range is characterized by a reduced slope that is less than a slope of the flow area response preceding the discrete lift range, said preceding the discrete lift range commencing at 0% lift and terminating at commencement of the discrete lift range.

18. The valve installation of claim 16, wherein said flow restriction aid includes an obstruction extending longitudinally from the disc, the obstruction having a width or diameter less than that of the disc.

19. The valve installation of claim 16, wherein said disc is movable from the seat to provide flow area through the valve, the provided flow area defined, at least partly, by a clearance between the disc and the seat, wherein said restricted flow area over said discrete lift range is defined by clearance between said seat and said flow restriction aid over the discrete lift range.

20. The valve installation of claim 16, wherein a span of said discrete lift range corresponds, at least for a portion of the discrete lift range, to a longitudinal extension of the flow restriction aid.

21. The valve installation of claim 16, wherein said flow restriction aid is spaced from said disc and defines an internal wall of the fluid bore, such that said disc is movable from the flow restrictor through a lift range, and wherein clearance between said disc and said flow restriction aid defines, at least partly, the flow restricted area over said discrete lift range.

22. The valve installation of claim 16, wherein said flow restriction aid includes a ledge with which the disc is seatable at 0% lift to close the orifice.

23. The valve installation of claim 16, wherein the valve is poppet valve, wherein said disc is movable in the fluid bore to seat and close the orifice.

24. The valve installation of claim 16, wherein the flow restriction aid comprises a plug coupled with or integral with the valve stem, and wherein a clearance between the plug and the valve body defines the restricted flow area over the discrete lift range.

25. The valve installation of claim 16, wherein the flow restriction aid comprises an annular restriction of the fluid bore, and wherein a clearance between the disc and the annular restriction defines the restricted flow area over the discrete lift range.

26. The valve installation of claim 16, wherein the flow restriction aid further comprises serrations, slots, or flat surfaces on the flow restriction aid.

27. The valve installation of claim 16, wherein the flow restriction aid further comprises wherein the disc comprises a series of discrete flat surfaces on the outer circumference of the disc.

* * * * *